United States Patent [19]

Baker et al.

[11] Patent Number: 5,442,789
[45] Date of Patent: Aug. 15, 1995

[54] SYSTEM AND METHOD FOR EFFICIENTLY LOADING AND REMOVING SELECTED FUNCTIONS ON DIGITAL SIGNAL PROCESSORS WITHOUT INTERRUPTING EXECUTION OF OTHER FUNCTIONS ON THE DIGITAL SIGNAL PROCESSORS

[75] Inventors: Robert G. Baker, Delray Beach; Jose A. Eduartez, Miami Beach; Duy Q. Huynh, Boca Raton; Paul R. Swingle, Delray Beach; Suksoon Yong, Boca Raton, all of Fla.

[73] Assignee: International Business Machines Corporation, Armonk, N.Y.

[21] Appl. No.: 220,959

[22] Filed: Mar. 31, 1994

[51] Int. Cl.[6] .......................... G06F 9/28; G06F 9/312
[52] U.S. Cl. ..................................... 395/650; 395/800; 364/230.3; 364/281.4; 364/281.8; 364/DIG. 1
[58] Field of Search ................ 395/800, 775, 725, 650, 395/425, 250, 275, 200

[56] References Cited

U.S. PATENT DOCUMENTS

| 4,413,318 | 11/1983 | Herrington | 395/650 |
|---|---|---|---|
| 4,748,558 | 5/1988 | Hirosawa et al. | 395/650 |
| 4,794,517 | 12/1988 | Jones et al. | 395/725 |
| 4,800,521 | 1/1989 | Carter et al. | 395/650 |
| 4,862,452 | 8/1989 | Milton et al. | 370/62 |
| 4,955,054 | 9/1990 | Boyd, Jr. et al. | 379/269 |
| 4,991,169 | 2/1991 | Davis et al. | 370/77 |
| 5,081,574 | 1/1992 | Larsen et al. | 395/375 |
| 5,274,809 | 12/1993 | Iwasaki et al. | 395/650 |
| 5,291,614 | 3/1994 | Baker et al. | 395/800 |
| 5,303,369 | 4/1994 | Borcherding et al. | 395/650 |
| 5,325,526 | 6/1994 | Cameron et al. | 395/650 |
| 5,349,682 | 9/1994 | Rosenberry | 395/800 |

OTHER PUBLICATIONS

Skinner, Toby, "Harness Multiprocessing Power for DSP Systems", Electronic Design, Feb. 7, 1994, pp. 55–72.

Warren Andrews, Senior Editor, "Search Continures For A single, Best Approach To DSP Interfacing", Jul. 1993, pp. 55–64.

Primary Examiner—Alyssa H. Bowler
Assistant Examiner—Alpesh M. Shah
Attorney, Agent, or Firm—Bernard D. Bogdon; Andrew J. Dillon

[57] ABSTRACT

A DSP manager acquires through software techniques configuration and related data for multimedia hardware devices from BIOS device drivers interposed to functionally insulate the resource manager from hardware device specific information. The DSP manager manages tasks executing on hardware devices in a multiple DSP environment. The DSP manager optimally assigns tasks, loads tasks, and removes tasks for a function without interrupting execution of tasks making up other functions.

8 Claims, 35 Drawing Sheets

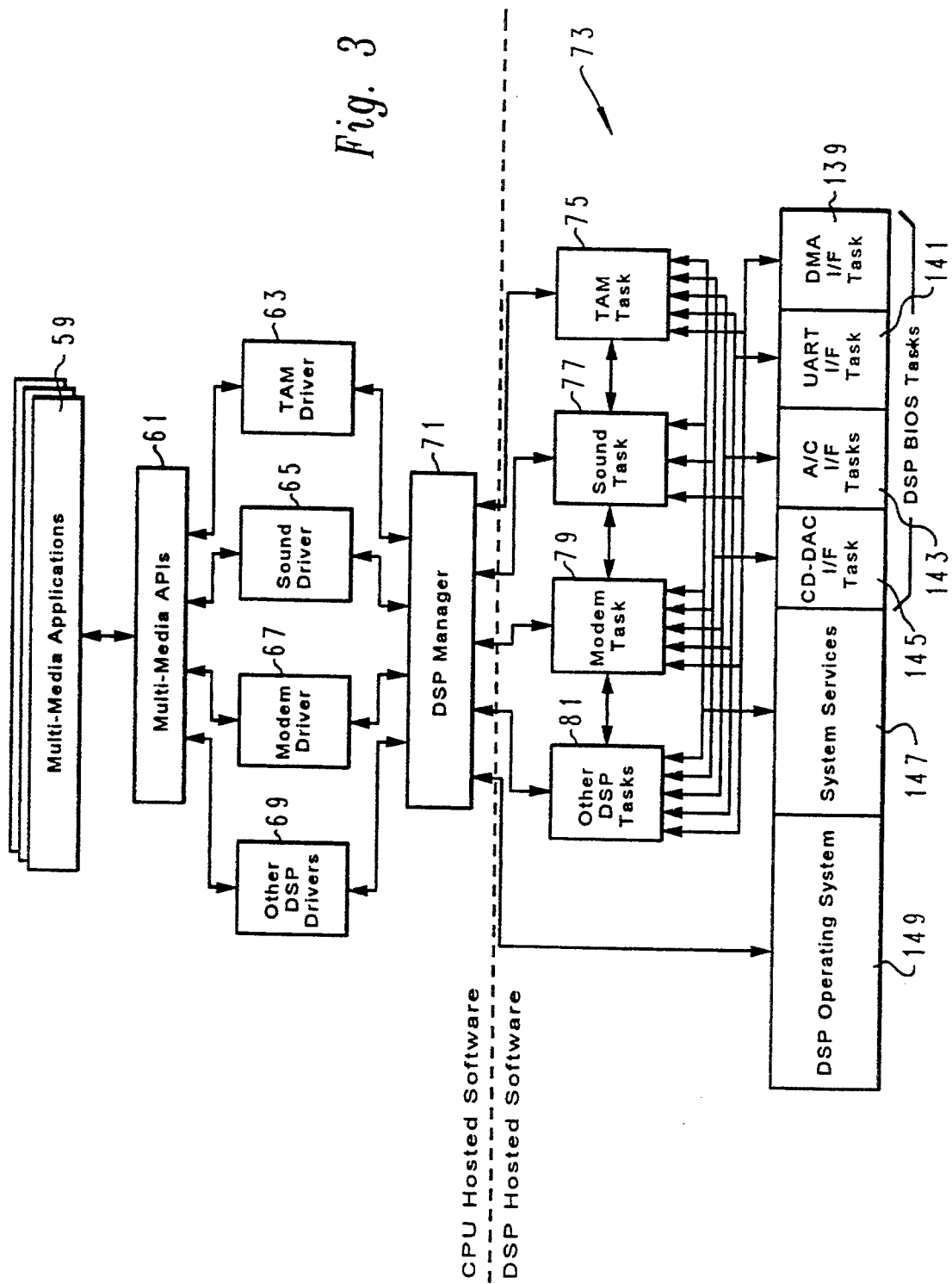

DSP BIOS Driver Initialization

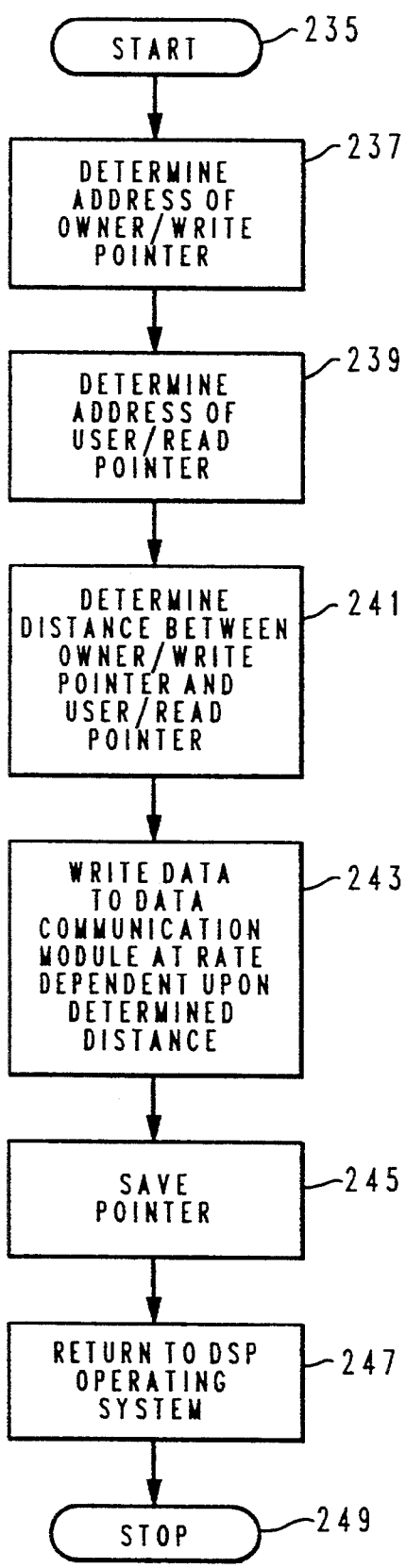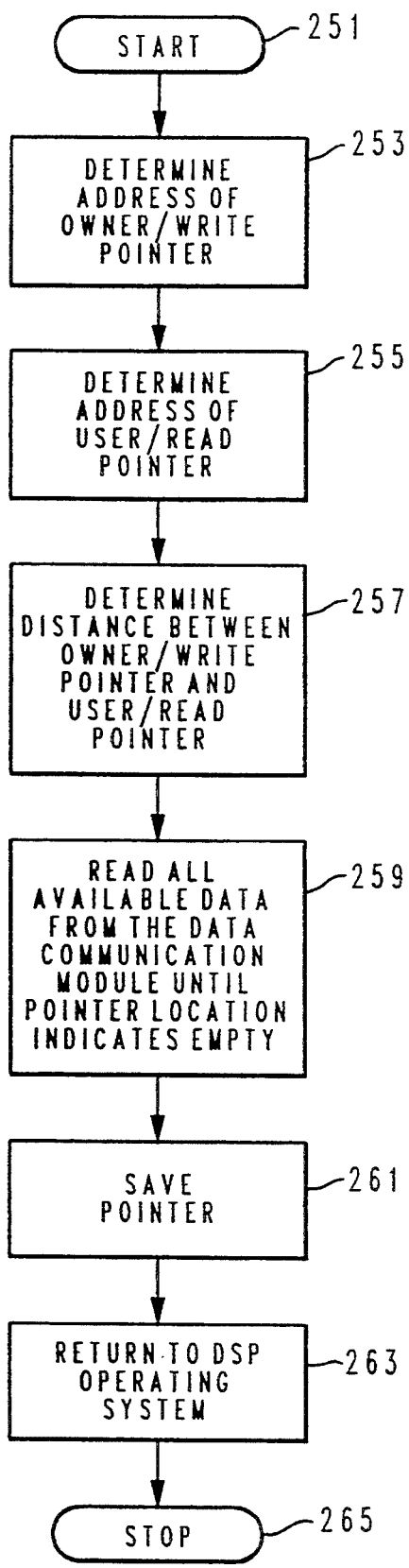
Fig. 17                    Fig. 18

Fig. 30A

```
label   GPC {OWNER=(ownername) I USER=(username)},
            [{size=n I MINSIZE=n},]
            [PROTOCOL=protocol,]
            MAXWPF=n
            MPTRSEP=n,
            [SAMPRATE=n,]
            [ADDRMODE=address mode,]
            [MODE=mode,]
            [{MAXDELT=n I MAXDELF=n},]
            [STRIDE=n I i,j]
```

Fig. 30B

| owner protocol | User Protocol | | | |
|---|---|---|---|---|
| | SYNC | OWNERDD | USERDD | SAFEDD |
| SYNC | • | • | | |
| OWNERDD | | • | | |
| USERDD | • | • | • | • |
| SAFEDD | | • | | • |

Fig. 30C

| Next | Virtual DCM |
|---|---|
| Mute | |
| - Control Block $^{11}$<br>- User pointer<br>- Size<br>- Max words per frame<br>- Pointer to owner's pointer | |
| Owner | Size |
| User-defined Data (variable)<br>... | |

Fig. 30D

CATERGORY NO. 1

1) dsp Allocate Seg
2) dsp Initiation
3) dsp Load Module
4) dsp Load Task
5) dsp Load Thread

CATERGORY NO. 2

1) dsp Change CPF
2) dsp Change DMA
3) dsp Change Module State
4) dsp Change Task State
5) dsp connect DCM
6) dsp Connect ITCB
7) dsp Disconnect DCM
8) dsp disconnect ITCB
9) dsp Free Module
10) dsp Free Segment
11) dsp Free Task

CATERGORY NO. 3

1) dsp Memtransfer
2) dsp Reset
3) dsp Run

CATERGORY NO. 4

1) dsp Connect IPC
2) dsp Disconnect IPC

CATERGORY NO. 5

1) dsp Abilities
2) dsp Label to Address
3) dsp Name to Module Handle
4) dsp Name to Segment Handle
5) dsp Name to Thread Handle
6) dsp Query DSP Info
7) dsp Query Manager Info
8) dsp Query Misc Info
9) dsp Query Module Info

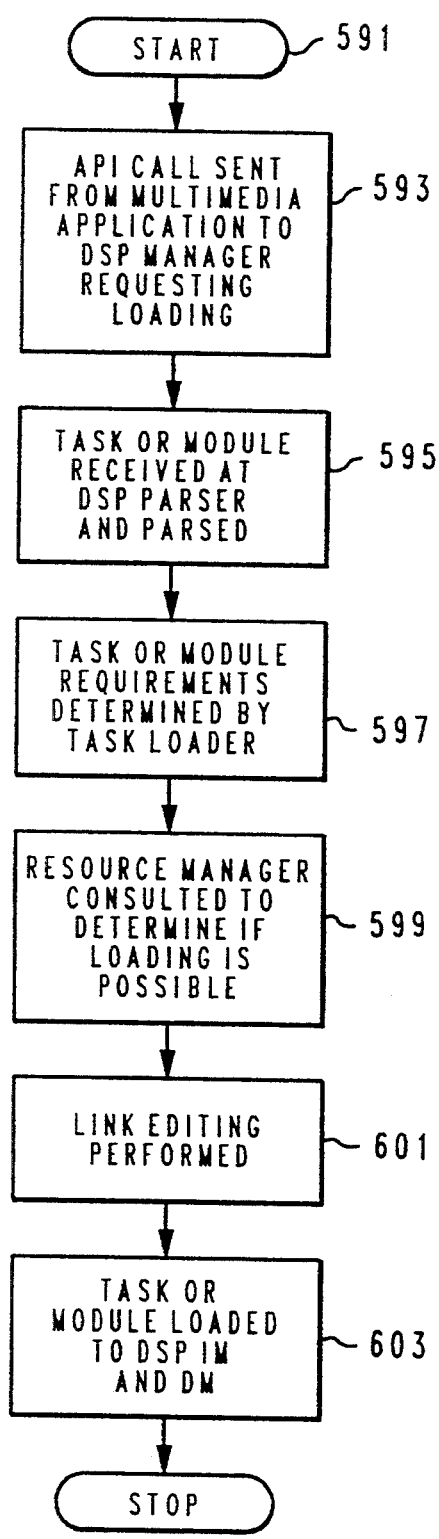
Fig. 31
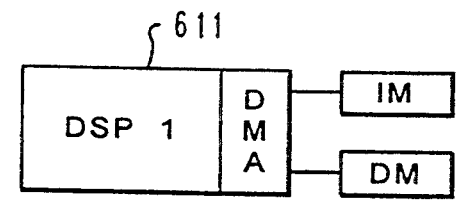
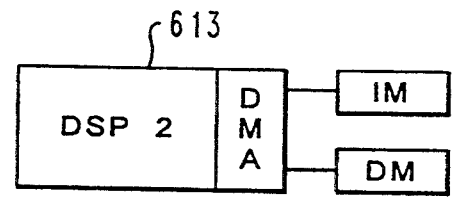
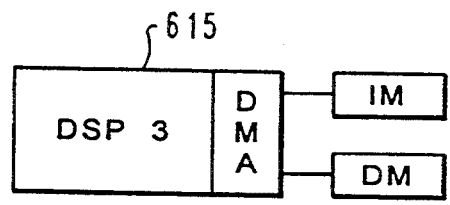
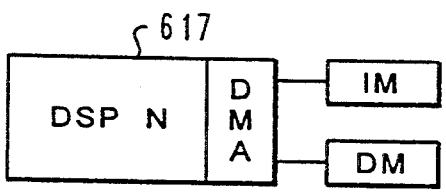
Fig. 32

SYSTEM AND METHOD FOR EFFICIENTLY LOADING AND REMOVING SELECTED FUNCTIONS ON DIGITAL SIGNAL PROCESSORS WITHOUT INTERRUPTING EXECUTION OF OTHER FUNCTIONS ON THE DIGITAL SIGNAL PROCESSORS

RELATED APPLICATIONS

The following applications, concurrently filed, which are assigned to the same assignee of this application and are hereby incorporated herein by reference, are related:

(1) "METHOD AND APPARATUS FOR FACILITATING REAL-TIME AND ASYNCHRONOUS LOADING AND TEMPORALLY OVERLAPPING OF MODULAR MULTIMEDIA SOFTWARE TASKS IN A MULTIMEDIA DATA PROCESSING SYSTEM," Ser. No. 07/960,951, filed Oct. 13, 1992 by Allran et al; and (2) "METHOD AND APPARATUS OF FACILITATING REAL-TIME AND ASYNCHRONOUS INTERTASK AND END-DEVICE COMMUNICATION IN A MULTIMEDIA DATA PROCESSING SYSTEM," Ser. No. 07/960,976, filed Oct. 13, 1992 by Allran et al.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field

The present invention relates to an improved data processing system and in particular to a method and system for managing the execution of tasks executing on multiple digital signal processors.

2. Related Art

The digital signal processor (DSP) has been used in the PC industry to provide computing power to meet multimedia real-time requirements, for example, data compression, expansion (decompression), telephony, sound generation, and other audio processing such as mixing and volume control. The hardware configuration is normally comprised of a DSP, memory for instruction and data, and hardware devices such as DAC (Digital to Analog Converter, ADC (Analog to Digital Converter), MIDI (Musical Instrument Digital Interface), and ports for such exemplary items as telephone line and phone set.

A program that has been created to handle DSP task scheduling and resource management is called SPOX, created by Spectron MicroSystems in Santa Barbara, Calif. Like OS/2, SPOX provides a high-level software interface to the underlying DSP hardware. However, it is directed at creating common interfaces for a variety of single DSP systems. Since its interface is aimed at single DSPs (or master DSPS in a master/slave relationship) and not at homogeneous multiple-DSPs, it lacks sufficient addressing of load balancing and resource management.

VCOS, for Visible Cache Operating System, is a multi-tasking, multiprocessing environment written by AT&T for their DSP 3210 family of parts. It is most readily identified with ISPOS and is intended to be a slave to the host operating system. Since it is not tightly woven into the host, it does not have equal the range of operability provided by IBM's DSP manager. While it has some of the features of the IBM DSP Manager it specifically targets single DSP subsystems. Overall the known DSP supports from Texas Instruments (TI), Motorola, and AT&T don't provide global management requirements for hardware devices.

SUMMARY OF INVENTION

This invention is related to the IBM digital signal processor projects for multimedia audio and video support. Presently software which manages digital signal processors (DSPs) supports hardware devices on one DSP. This invention supports multiple hardware devices on multiple-DSPs by centralizing the hardware resources in a DSP manager. Each hardware device, including the DSP itself, is mapped to a hardware device identifier. All devices of each DSP are reported to the DSP manager by its installable BIOS device driver. The DSP manager collects and numbers all devices on multiple-DSPs. At the loading of DSP tasks, the manager locates the destination by the device identifier specified by the application. In order to support multiple-DSPs without impacting the program applications, a DSP manager is provided to centralize the hardware resources and provide easy access to any specific hardware device on any DSP.

Specifically, the DSP manager provides a process for efficiently loading tasks on to multiple DSPs taking into account factors such as processing power, instruction memory, and data memory in the various DSPs located within a data processing system. The DSP manager provides a capability to load and remove selected functions without interrupting the execution of other functions on the DSPs.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein;

FIG. 3 is a block diagram representation of the principal software components of multimedia digital signal processing operations;

FIG. 17 is a flowchart representation of the task of writing to a data communication module in the user data driven protocol mode of operation;

FIG. 18 is a flowchart representation of the task of reading data from a data communication module in either the owner data driven protocol mode of operation or the safe data driven protocol mode of operation;

FIG. 30A is an assembly language macro table which is used to create and define a data communication module;

FIG. 30B is a table which depicts the allowable pairing of data communication module protocols;

FIG. 30C is a table providing a representation of information contained in a control block which allows the creation of a virtual data communication module;

FIG. 30D is a table which identifies the five (5) broad categories of application program interface (API) commands which allow a digital signal processor manager program, which is resident in the host CPU, to coordinate and control the operation of a digital signal processor;

FIG. 31 is a flowchart representation of the process of determining whether a modular multimedia software task may be loaded to a DSP for execution;

FIG. 32 represents in block diagram format the "networking" of a plurality of DSPs to perform modular multimedia software tasks;

DETAILED DESCRIPTION OF PREFERRED EMBODIMENT

Figure 1:
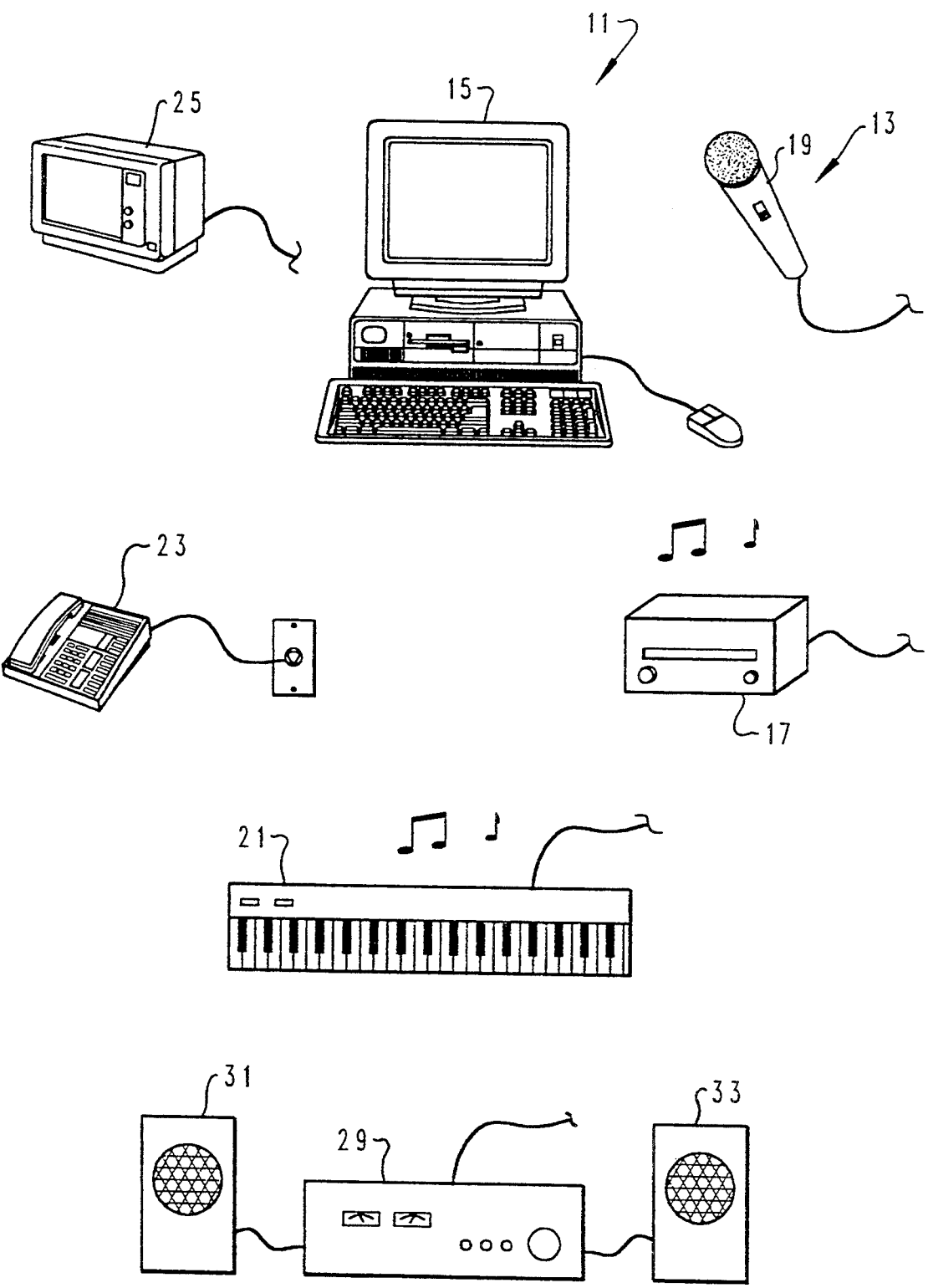
FIG. 1 is a pictorial representation of a multimedia data processing system which is connected to a plurality of multimedia end devices and is especially suited for processing multimedia applications.

With reference now to the figures and in particular with reference to FIG. 1, there is depicted multimedia data processing system 11 which includes a plurality of multimedia end devices 13 which are electrically connected to computer 15. Those skilled in the art, will, upon reference to the specification, appreciate that computer 15 may comprise any personal computer system well known in the prior art, such as the PS/2 IBM Computer manufactured by International Business Machines Corporation of Armonk, N.Y. The plurality of multimedia end devices 13 include all types of multimedia end devices which either produce or consume real-time and/or asynchronous streamed data, and include without limitation such end devices as CD-ROM player 17, microphone 19, keyboard 21, telephone 23, and video monitor 25. Each of these multimedia end devices 13 may be called by multimedia application software to produce or consume the streamed data.

For example, the operation of CD-ROM player 17 may be controlled by multimedia application software which is resident in, and executed by, computer 15. The real-time digital data stream generated as an output of CD-ROM player 17 may be received and processed by computer 15 in accordance with instructions of the multimedia application resident therein. For example, the real-time digital data stream may be compressed for storage on a conventional computer floppy disk or for transmission via modem over ordinary telephone lines for receipt by a remotely located computer system which may decompress and play the digital streamed data on analog audio equipment. Alternatively, the real-time data stream output from CD-ROM player 17 may be received by computer 15, and subjected to digital or analog filtering, amplification, and sound balancing before being directed, in analog signal form, to analog stereo amplifier 29 for output on audio speakers 31 and 33.

Microphone 19 may be used to receive analog input signals corresponding to ambient sounds. The real-time analog data stream may be directed to computer 15, converted into digital form, and subjected to manipulation by the multimedia application software. The digital data may be stored, compressed, encrypted, filtered, subjected to transforms, outputted in analog form to analog stereo amplifier 29, directed as an output in analog form to telephone 23, presented in digitized analog form as an output of a modem for transmission on telephone lines, transformed into visual images for display on video monitor 25, or subjected to a variety of other different and conventional multimedia digital signal processing operations.

In a similar fashion, the analog and digital inputs and outputs of keyboard 21, telephone 23, and video monitor 25 may be subjected to conventional multimedia operations in computer 15.

A number of significant advantages over existing multimedia data processing systems is evident from the inventive contributions set forth herein. One embodiment of the present inventive contribution provides a multimedia data processing system which:

(1) provides an open architecture which allows for a myriad of user-written multimedia applications;
(2) allows for the coordinated and/or simultaneous operation of multimedia end devices without interfering in the real-time operation of the end devices;
(3) allows for the real-time and asynchronous communication of streamed data between modular multimedia software tasks;
(4) allows for the real-time and/or asynchronous communication of streamed data between the computer and multimedia end devices;
(5) allows for conventional functions of multimedia hardware end devices to be virtualized and performed in software;
(6) provides a modularity in design which facilitates the creation and operation of multimedia application software; and
(7) allows for the dynamic reconfiguration of multimedia tasks without interruption of other on-going multimedia tasks, thus allowing temporally overlapping operation of multimedia end devices.

Figure 2:
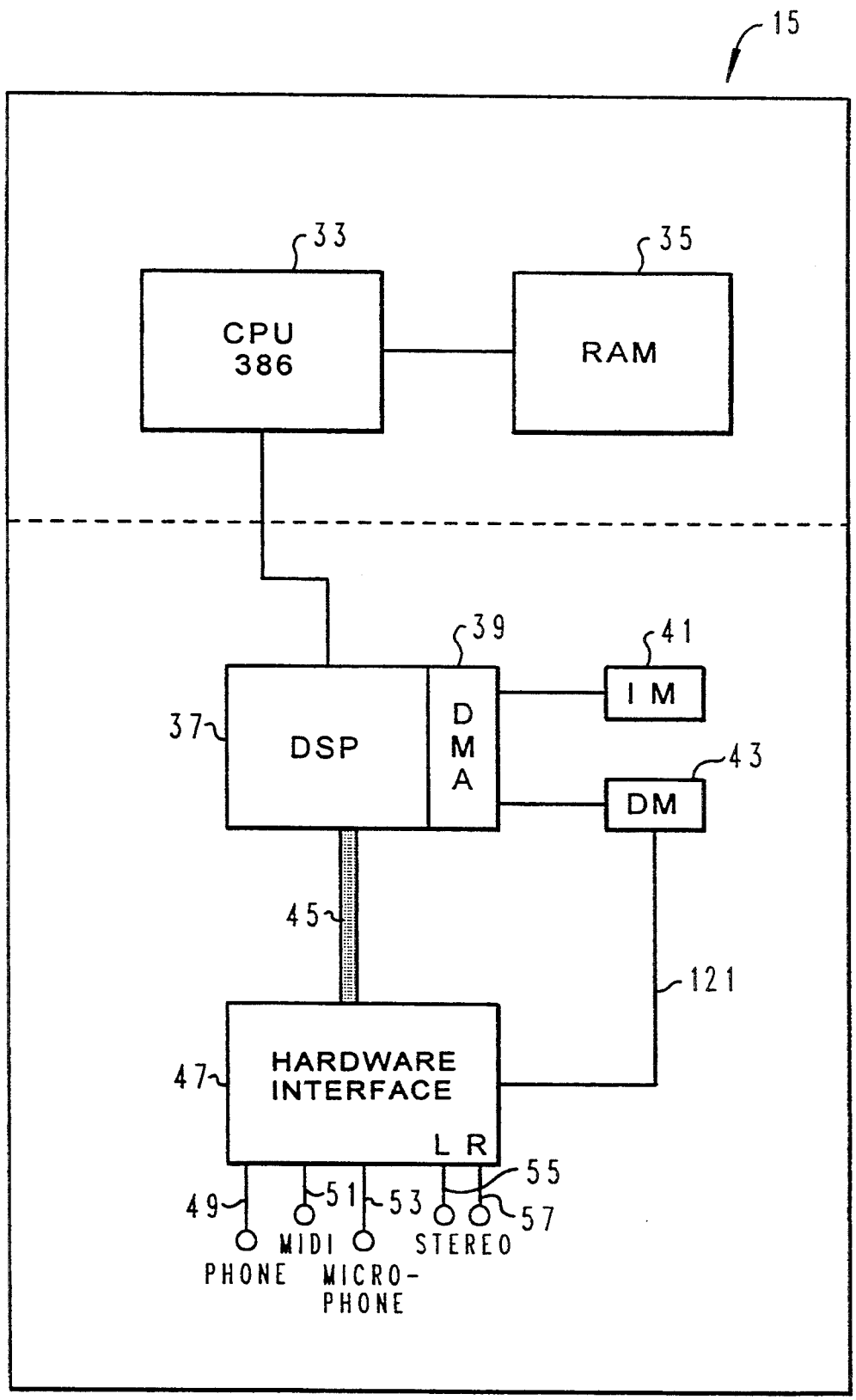
FIG. 2 a block diagram representation of the principal hardware components which are utilized to execute multimedia applications which control the operation of the multimedia end devices.

FIG. 2 is a block diagram representation of the principal hardware components which are utilized in the present invention to execute multimedia applications which control the operation of multimedia end devices 13. As is conventional in multimedia data processing operations, a central processing unit (CPU) 33 is provided in computer 15. Typically, the multimedia application software is resident in RAM computer memory 35. CPU 33 executes the instructions which comprise the multimedia application. Also, as is typical in multimedia data processing operations, digital signal processor 37 is provided as an auxiliary processor, which is dedicated to performing operations on the real-time and/or asynchronous streamed data. As is well known to those skilled in the art, digital signal processors are microprocessor devices which are dedicated to performing operations based upon, or which include, real-time data and are thus designed to be very fast and respond quickly to allow the real-time operational nature of the multimedia end devices. Typically, in order to speed-up the operation of the digital signal processor 37, a conventional direct memory access (DMA) 39 is provided to allow for the rapid fetching and storing of data. In the present invention, separate instruction memory (IM) 41 and data memory (DM) 43 are provided to further speed up the operation of digital signal processor 37. Bus 45 is provided to communicate data between digital signal processor 37 and hardware interface 47, which includes digital-to-analog and analog-to-digital converters. Inputs and outputs for the various multimedia end devices 13 are connected through the digital-to-analog (D/A) and analog-to-digital (A/D) converter 47. In FIG. 2, a telephone input/output 49, a microphone input 53, and stereo outputs 55, 57 are depicted, in an exemplary manner, and are connected through the A/D and D/A converters in hardware interface 47. MIDI input/output also is connected to hardware interface 47 to digital signal processor 37 but is not connected to A/D or D/A converters.

FIG. 3 is a block diagram representation of the principal software components of multimedia digital signal processing operations. The upper portion of this figure is representative of software which is hosted in central processing unit 33 (of FIG. 2) while the lower portion of this figure is representative of software 73 hosted in digital signal processor 37 (of FIG. 2). As is shown, multimedia applications 59 communicate through multimedia application programming interfaces (APIs) 61 to device drivers, Such as telephone answering machine (TAM) driver 63, sound driver 65, modem driver 67, and other digital signal processing drivers 69 to DSP manager 71. DSP manager 71 may call for and load for execution, any one of a plurality of modular multimedia software tasks into digital signal processor 37 (of FIG. 2). Several representative modular tasks are depicted in FIG. 3, including TAM 75, sound task 77, and modem task 79. Other various digital signal processing tasks are graphically represented by block 81, which is labeled "other DSP tasks". These multimedia software tasks represent substantially irreducible operations which are performed on the real-time and/or asynchronous streamed data which is consumed or produced by multimedia end devices or other modular multimedia software tasks. The multimedia software tasks represent a set of instructions which are executable by the digital signal processor, as well as a set of data-points representing real-time and/or asynchronous data-points, which have been produced by other modular multimedia software tasks or multimedia end devices, or will be consumed by other modular multimedia tasks or multimedia end devices. Frequently, multimedia applications 59 will call for the performance of an operation represented by a plurality of multimedia modular software tasks. In this event, the tasks are arranged in a module, which is graphically depicted in FIG. 4.

Figure 3A:
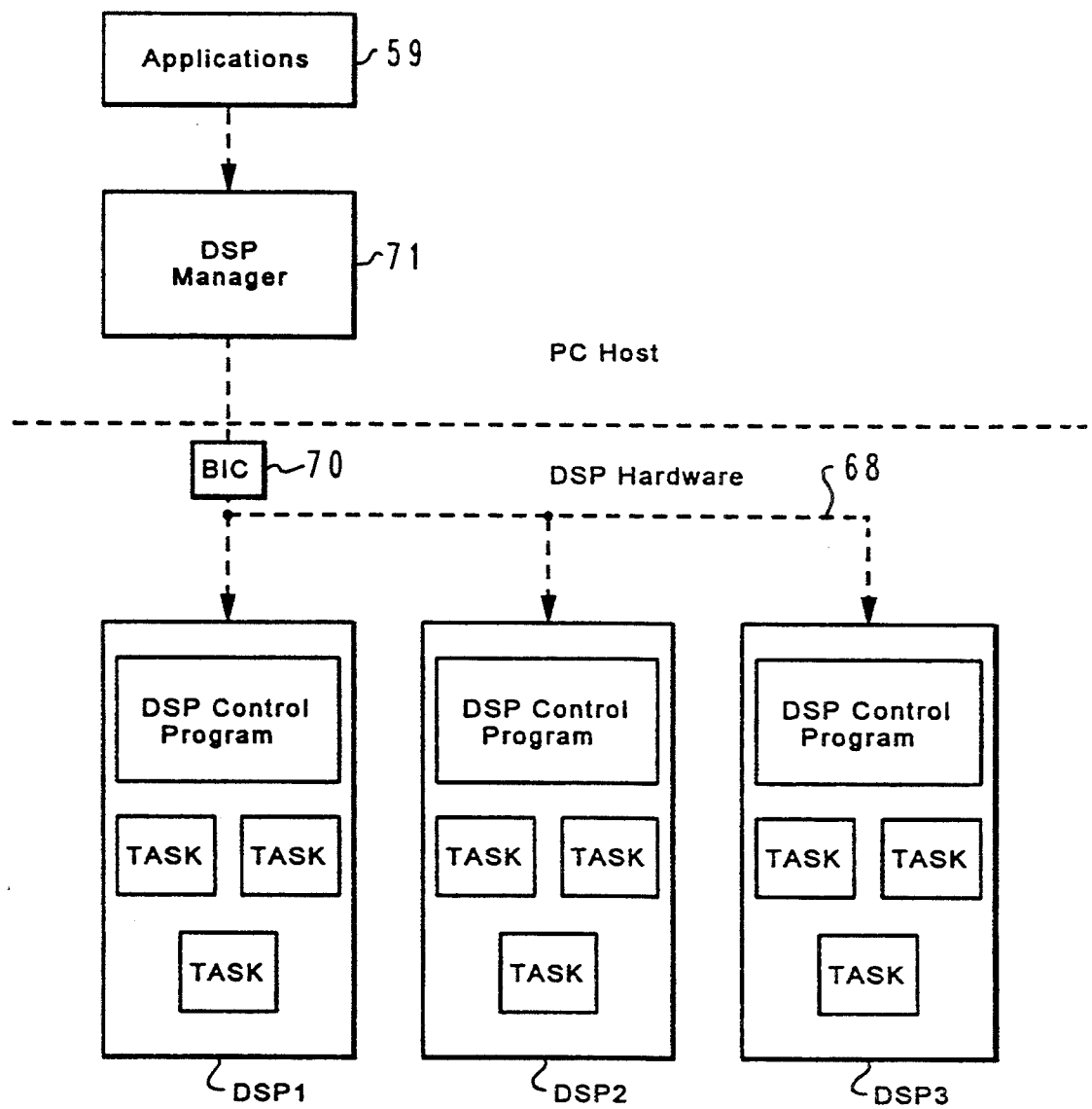
FIG. 3A is a further block diagram depiction of the components of FIG. 3 with illustration of multiple digital signal processors.

Referring to FIG. 3A, a block diagram of a data processing system employing multiple-DSPs a number of different communication channels may be employed to interconnect DSPs to provide communication between the DSPs. In accordance with the preferred embodiment of the present invention, DSP1, DSP2, and DSP3 are connected to bus 68. Bus 68 is connected to bus interface chip (BIC) 70, which in turn is connected to the main bus of the PC host (i.e., micro-channel). "Micro-Channel" is a registered trademark with International Business Machines Corporation. BIC 70 controls communications between the PC hose and DSP hardware. More information on BIC 70 and the bus configuration connecting the DSPs can be found in computer system having a DSP local bus, Ser. No. 08/155,311, filed on Nov. 19, 1993 by Baker et al. This application is assigned to the same assignee of this application and is hereby incorporated by reference.

Although the depicted embodiment illustrates a "local bus" providing a connection and communication between the DSPs, a number of different types of communication channels other than a "local bus" may be employed to interconnect DSPs to provide communication between the DSPs. For example, a shared memory system may be implemented in a global shared memory configuration or a dual-ported shared memory configuration. In addition, communications between DSPs may be provided via a serial port arrangement interconnecting serial ports in the various DSPs. For example, if four DSPs are employed, where each DSP contains at least three serial ports all four DSPs may be interconnected with each other via the serial ports.

A significant feature of the DSP manager is its ability to provide multiple DSP support in a device-independent manner. This goal is achieved through the use of the DSP BIOS interface; see interface 704 in FIG. 3B. The interface insulates the hardware specific information from DSP manager 71. This allows the hardware to be included by the simple process of plugging in a card without impacting the other applications.

Following is the list of functions managed by the DSP manager 71 through each respective DSP DBIOSx driver:

BIOS_Read
Reads DSP data or instruction memory into the specified buffer for n words.
BIOS_Write
Writes DSP data or instruction memory from the specified buffer for n words.
BIOS_Query_Info
Queries DSP information such as MIPs, memory size, and hardware devices.
BIOS_Reset
Resets the specified DSP.
BIOS_Halt
Resets the specified DSP.
BIOS_SetIPC
Sets the IPC routine address.

The steps to install a DSP BIOS device driver are as follows:

1. The device driver initially contains the name "DBIOS00$".
2. During initialization, the device driver issues ATTACHDD to device driver "DBIOS01$" (see driver 700 of FIG. 3B). If it succeeds, it changes "DBIOS01$" to "DBIOS02$" (see driver 702 of FIG. 3B) and performs the same operation. This step will be repeated until it fails.
3. The device driver changes "DBIOS00$" to the number it fails, for example, "DBIOS10$".
4. The device driver saves the predecessor's IDC entry point and exits.

When the DSP manager is run, the initialization code will locate the last DSP BIOS driver by calling several DOSOPENs until it fails. The DSP manager then issues an IOCTL command to the last BIOS driver, which issues the same command to its predecessor device driver, which does the same. The result of the process is that the DSP manager will obtain all entry points of all installed BIOS drivers.

DSP Hardware Representation

The level of abstraction chosen for this embodiment is to use a numeric value, called a device ID, to identify each hardware device. The device ID is a 32-bit word shown as follows:

| Bit (high word) | Bit |
|---|---|
| 3 | 1 |
| 1 | 6 |
| TTDD DDDD DDDD DDDD | |
| T=00, input device | |
| 01, output device | |
| 10, input and output device | |
| D=device type | |
| Bit (low word) | Bit |
| 1 | 0 |
| 5 | 0 |
| NNNN NNNN NNNN NNNN | |
| N=device ordinal | |
| 0 - default | |
| 1 - device 1 | |
| 2 - device 2 | |
| . | |
| etc. | |

| High Word (Hex) | Device Name |
|---|---|
| 0001 | stereo line input |
| 8001 | stereo line output |
| E006 | phone line |
| 0006 | phone set |
| 0008 | MIDI in |
| 8008 | MIDI out |
| E009 | DSP |
| E00A | UART |

At the end of DSP BIOS driver installation, the DSP manager issues the BIOS-Query-Info command to get the following resource information for each DSP:

```
STRUCTURE/*DSP info */
USHORT DSP_MIPSs;/* Number of DSP MIPs */
USHORT DSP_DataStore;/* Data Store size in KW*/
USHORT DSP_InstStore;/* Instruction Store size in KW*/
USHORT DSP_Smart_Cable_ID; /* OFFH: unavailable */
USHORT DSP_Slot_Number; /* slot number of the adapter */
USHORT DSP_Adapter_ID; /* adapter ID */
USHORT DSP_COM; /* COM ports used, bit 0 = 1 = COM1 */
    /* bit 1 = 1 = COM2, etc. */
USHORT DSP_NumHWs;/* number of unique hardwares */
```

```
                -continued
ULONG DSP_HWID[SDP_NumHWs];
/* the ordinal is used for count instead */
/* e.g., 0002 8001 = 2 stereo out lines */
.
.
END
```

USHORT means an unsigned short integer (16 bits) while ULONG means an unsigned long integer (32 bits).

The DSP manager then numbers the hardware devices based on the slot number. For example, the stereo-out line on slot one is numbered STEREO-OUT-1 and the stereo-out line on slot two is numbered STEREO-OUT-2 and that protocol is repeated.

When the application issues the DSP manager API to load DSP tasks, the hardware device ID is also specified to indicate the destination.

Figure 3B:
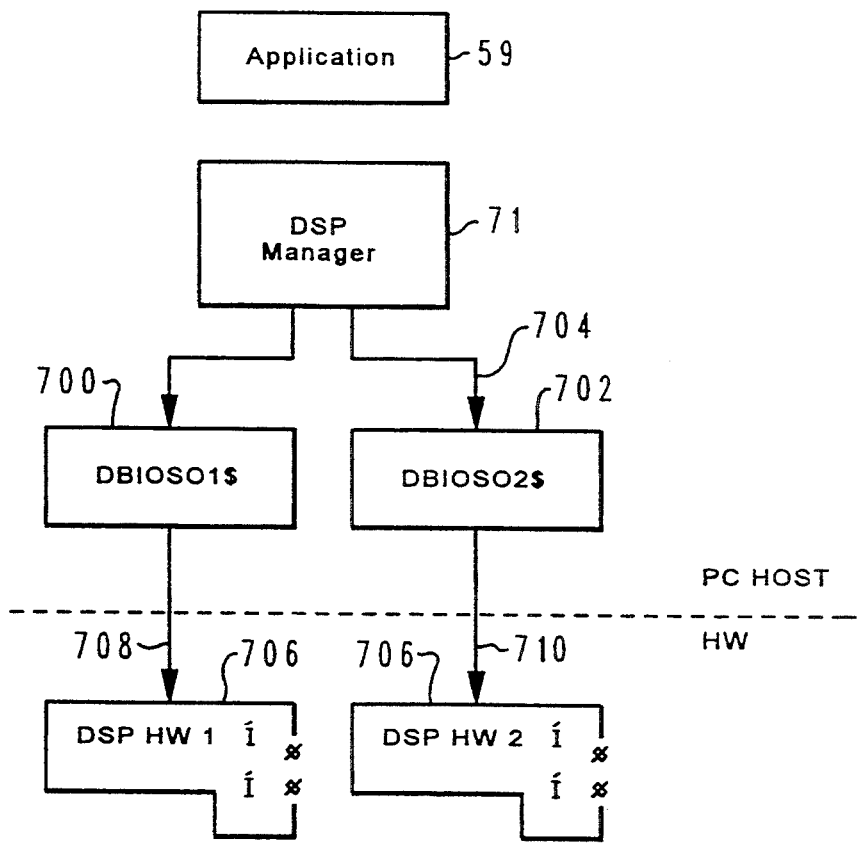
FIG. 3B is yet a further block diagram depiction of the components of FIG. 3 with illustration of the hardware digital signed processors and their respective interface drivers and BIOS interface.

FIG. 3B depicts how the DSP manager 71 utilizes device identifiers to manage multiple-DSP devices, independently of the hardware.

DSP manager 71 has the ability to connect and maintain exemplary multiple DSP DBIOSx drivers 700 and 702, using the DSP BIOS interface 704. The DSP manager 71 maintains, allocates and deallocates HW and SW (software) resources comprising DSP HW1 and DSP HW2 units 706 in FIG. 3B through the device identifiers and DSP BIOS interface 704 in the present embodiment.

Each individual DBIOSx driver 700 and 702 has its own interface 708 and 710, respectively, to the DSP hardware 706. The DSP BIOS interface 704 provides a common interface that "insulates" the DSP manager 71 and applications 59 from different types of hardware 706, such as Mwave hardware.

Figure 3E:
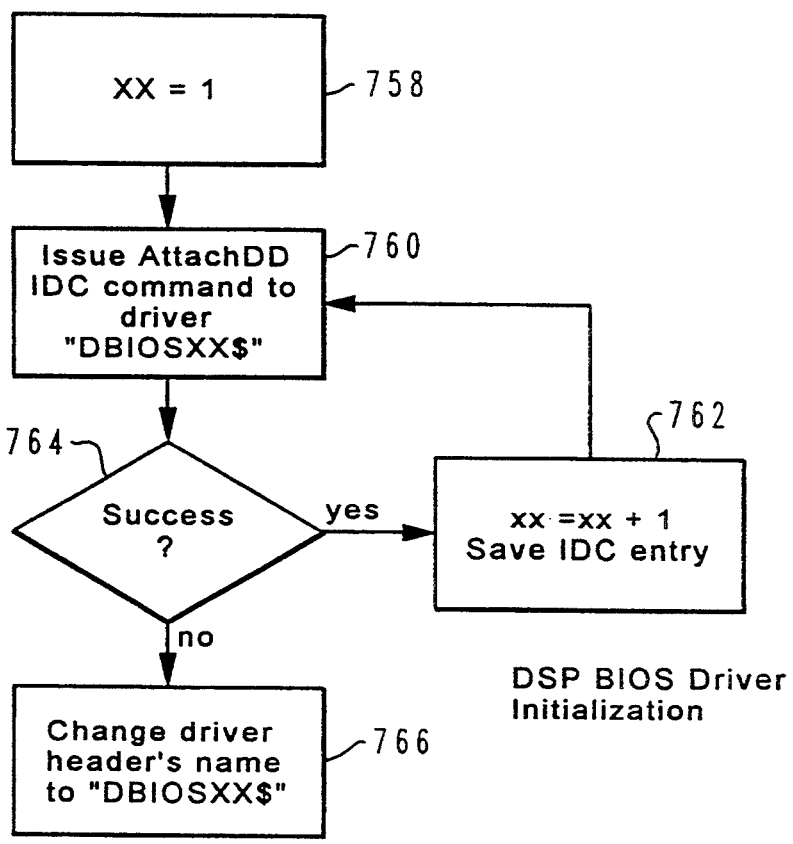
FIG. 3E is a flow chart illustrating the steps of DSP BIOS driver initialization and the loading of multiple-DSP BIOS drivers.
Figure 3C:
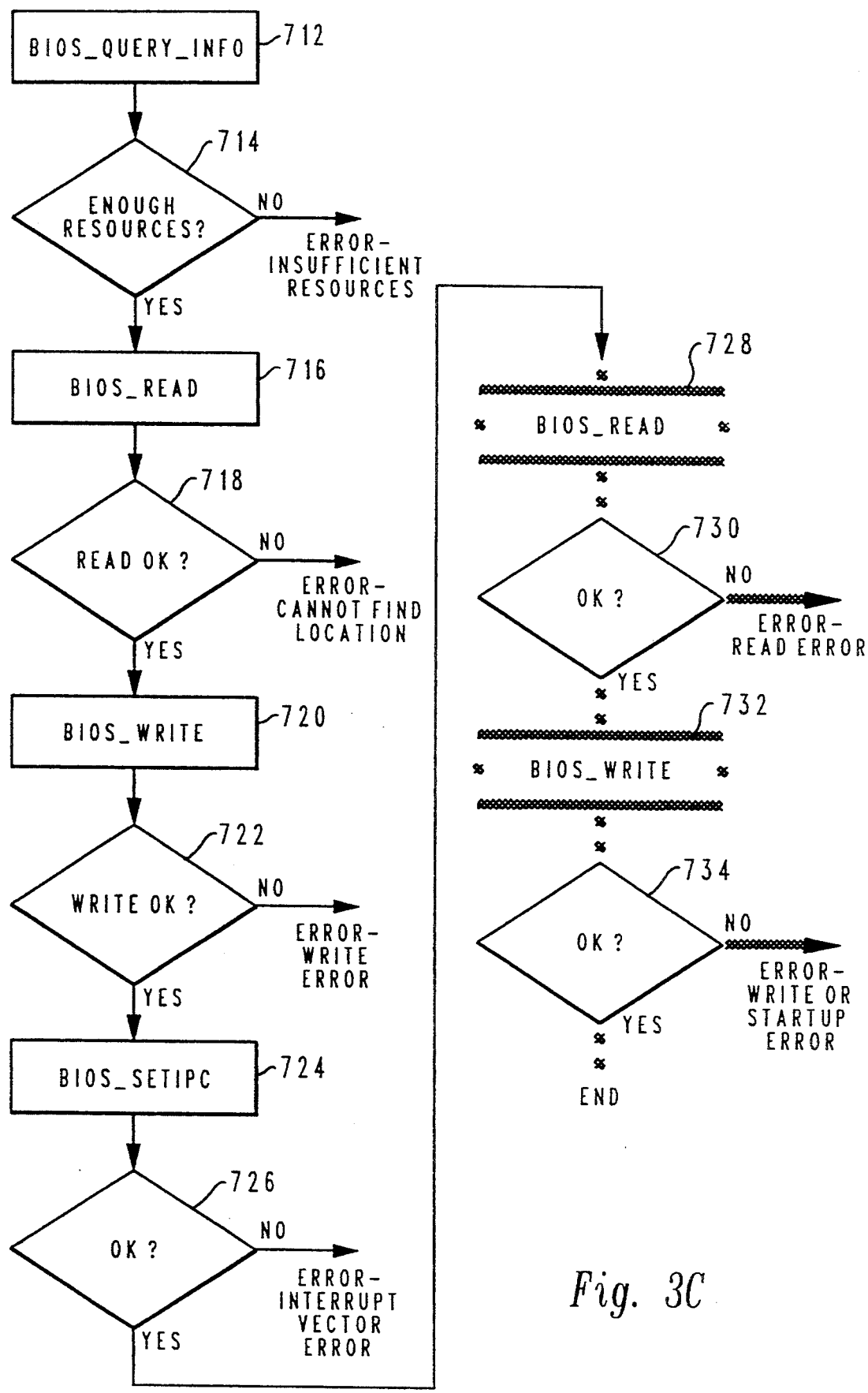
FIG. 3C is a flow chart illustrating the steps for interfacing between the DSP BIOS interface and the multiple-DSP resource manager and interface drivers of FIG. 3B.

FIG. 3C is a logic flowchart explanation of the usage of the DSP BIOS interface 704 between the DSP manager 71 and the DBIOSx drivers 700 and 702, and the loading of a DSP task onto the HW 706.

The BIOS_QUERY_INFO 712 command is issued to find information about the DSP. The information, as described in the DSP_INFO Structure, is used to determine:

.DSP_MIPS—Processing capacity of DSP;
.DSP_DataStore—Amount of data storage available;
.DSP_InstStore—Amount of instruction storage available;
.DSP_Slot_Number—Slot number of the adapter;
.DSP_Adapter_ID—Type of adapter;
.DSP_COM—COM ports used;
.DSP-NumHWs—Number of unique hardwares;
.DSP_HWID[DSP_NumIIWs]—HW device IDs as specified in the present invention.

Using the information returned from BIOS_QUERY_INFO 712, a determination if there are enough resources and the appropriate type of resources 714 for the DSP task to be loaded can be made. Note the described process is the interaction between the DSP manager 71 and the DBIOSx drivers 700 and 702. Also note that the DSP manager 71 "insulates" multimedia applications 59 from the actual low-level choices of what are the HW resources 706 and the number of DSP cards that exist in the system.

The next step is to issue a BIOS_Read command 716 to find the next available Instruction Store address and Data Store address regarding where to load the DSP task. A check is done at step 718 to verify that there is a location to load the DSP code.

A BIOS_WRITE command 720 may be issued multiple times to load the DSP task into data and instruction storage memory units 43 and 41, respectively for the DSP. Success is verified at step 722. Note that all of these successes and Errors are eventually returned to multimedia applications 59 as per the DSP manager 71's implementation of the present invention technique of maintaining current status of hardware and software resource capability.

BIOS_SETIPC 724 is issued to setup up an Interrupt Callback (IPC) address between DBIOSx drivers 700 or 702 and the DSP manager 71. There are only a finite number of interrupt "channels" available per DSP HW card for DSP HW1 and DSP HW2 for FIG. 3B, so a verify channel step 726 is available.

A final (optional) BIOS_READ 728 is done to ensure correctness, at step 730 of the DSP microcode.

A BIOS_WRITE at steps 732 and 734 is issued to start the DSP task running. At this point all communications between the task and multimedia applications 59 take place through interrupts fielded by the DBIOSx drivers 700 or 702 and through device identification passed to the DSP manager 71.

Figure 3D:
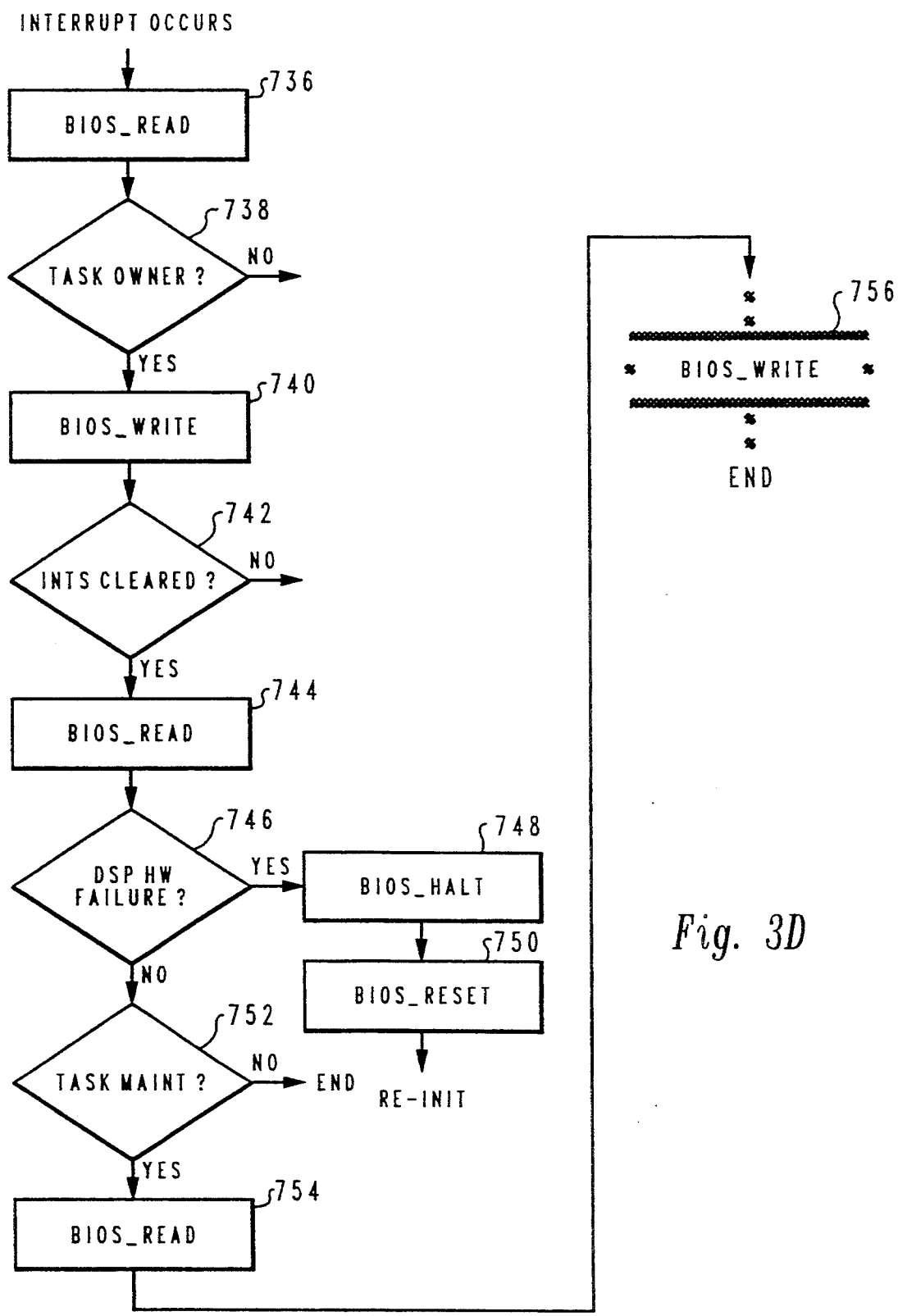
FIG. 3D is a flow chart illustrating the steps of interrupt handling between the interface drivers and DSP resource manager of FIG. 3B.

FIG. 3D delineates the logic flow of interrupt handling between DBIOSx drivers 700 or 702 and DSP manager 71.

In this circumstance a task has been interrupted and the DBIOSx drivers has passed the interrupt call to the interrupt handler established by the BIOS_SETUP command. The flow process of FIG. 3D describes the maintenance of the interrupt by the DSP manager 71.

A BIOS_Read command 736 is issued to the HW 706 to read the HW interrupt vector. A verification has to be made at step 738 to determine the ownership of the interrupting task/HW combination. Once verification at step 738 has been established, a BIOS_WRITE step 740 transpires and a 742 command is issued to clear the interrupt vector for this particular task/HW combination.

A BIOS_READ step 744 is issued from the task to determine why the interrupt was posted. If the interrupt was issued because of a HW failure shown at step 746, then a BIOS-HALT step 748 and BIOS_RESET step 250 must be issued to halt and reset the HW on the digital signal processor.

If the interrupt was posted for normal task maintenance as at step 752, (i.e., more data, normal completion, etc.), a BIOS_READ step 754 is issued to obtain information on the state of the task and resources. A BIOS_Write step 756 is issued one or more times to serve the task for proper operation.

FIG. 3E illustrates a DSP BIOS driver initialization flowchart and how more than one DBIOSx driver can be loaded into the system using Device Identification, as described in the present invention.

The DSP manager 71 starts with a DBIOS00$ identifier on initialization. When a driver is going to be loaded, the DSP manager 71 sets the identifier to DBIOS01$ 700 at step 758 and issued an ATTACHDD at step 760 to it. The ATTACHDD command will set entry points to the driver and establish a communication "path" to the driver. If the ATTACH is successful, a DBIOSx driver is present, XX is incremented at step 762 and the ATTACHDD of step 760 is retried for the next driver.

This loop is reiterated until the ATTACHDD fails at step 764. In this case, the previous XX is saved for any new drivers in the system 766. Note that at this point the DSP manager 71 has initial communications with each of the DBIOSx drivers.

Figure 3F:
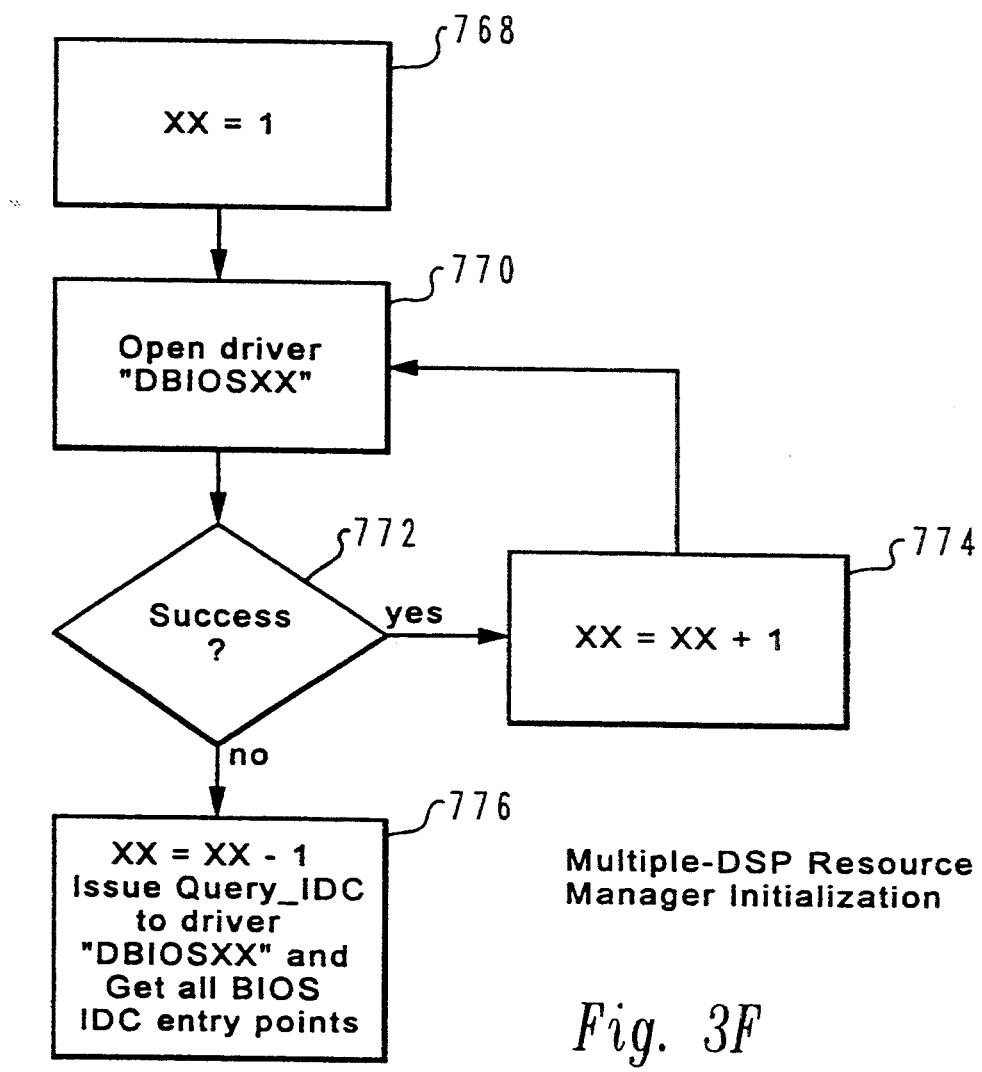
FIG. 3F is a flow chart illustrating the steps of initialization of the multiple-DSP resource manager.

Referring to FIG. 3F, once all of the drivers, as for example drivers 700 and 702, have successfully attached to each other in accordance with step 760, the DSP manager 71 registers the addresses of the drivers. This is done by the DSP manager 71 starting at the first driver block 768, and issuing successive opens at step 770 to the drivers.

Each open at step 770 will cause the DBIOSxx Driver, as for example driver 702, to initialize itself. Note that the successful opening of the driver at step 770 is also a method of establishing the presence of the driver at step 772. At step 774 the xx level is incremented.

Once all of drivers have been initialized a Query_IDC command is issued to the last-opened driver at step 776 causing a cascade effect of queries between drivers 700 and 702 with the end result being the registration of all the IDC entry points from step 760.

As stated in the present invention, all of these opens from step 770 to the drivers and the ATTACHDDS at step 760, issued between the DSP manager 71 and the DBIOSxx 700 and 702 drivers form a BIOS communication link or interface 704 amongst the components. Further, using the device identification technique and the technique for HW resource identification, all of the communications are transparent to multimedia applications 59.

Figure 4:
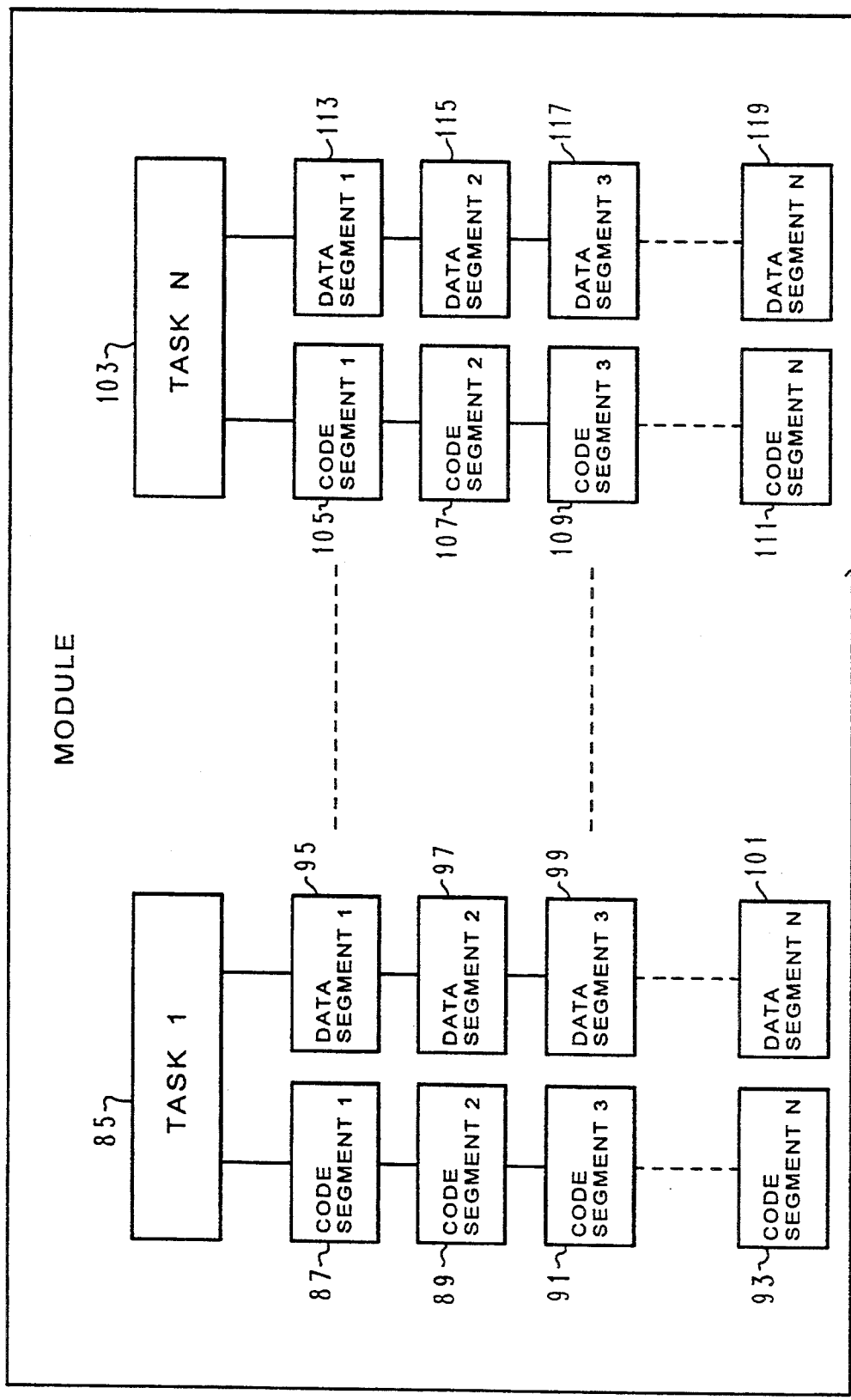
FIG. 4 is a block diagram representation of a multimedia operation which is comprised of a module which represents a grouping of N modular multimedia software tasks.

FIG. 4 is a block diagram representation of a multimedia operation which is comprised of module 83 which represents a grouping of N modular multimedia software tasks 85 and 103. As is shown, task 1 is composed of a plurality of code segments 87, 89, 91 and 93 and a plurality of data segments 95, 97, 99, and 101. Task 103 is likewise composed of a plurality of code segments 105, 107, 109 and 111, and a plurality of data segments 113, 115, 117 and 119. With reference again to FIG. 2, the code segments of tasks 85 and 103 are resident in instruction memory 41, while the data segments of tasks 85 and 103 are resident in data memory 43. As is visually represented in FIG. 2, real-time and/or asynchronous data which is either produced or consumed by the multimedia end devices 13 may be directly written to or read from data memory 43 via bus 121.

Figure 5:
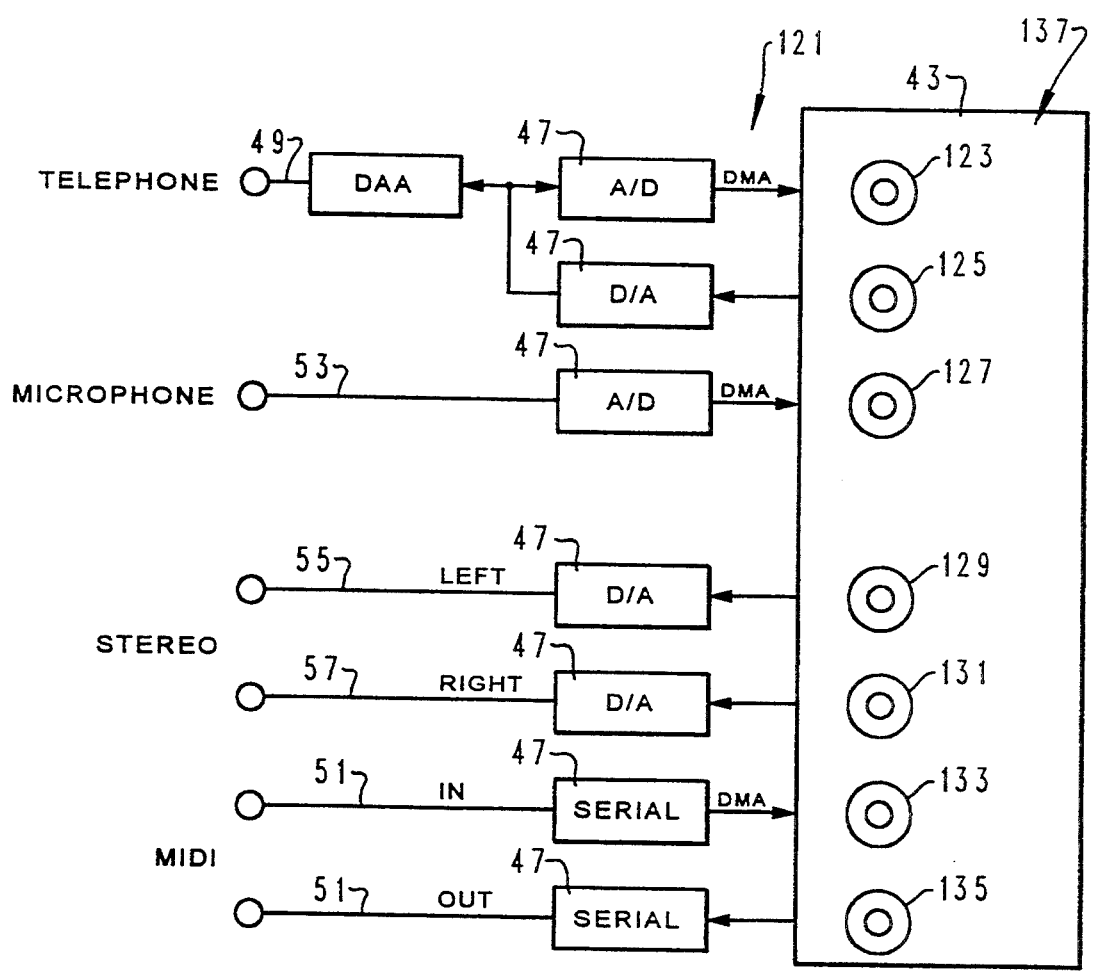
FIG. 5 is a block diagram representation of the direct reading and writing of real-time and/or asynchronous streamed data between multimedia end devices and dedicated data memory.

The physical connections are depicted in greater detail in FIG. 5, which is a block diagram representation of the direct reading and writing of real-time and/or asynchronous streamed data between multimedia end devices 13 illustrated in FIG. 1 and dedicated data memory 43 depicted in FIG. 2. As is shown, telephone input/output 49, microphone input 53, MIDI terminal input/output 51, and left channel 55 and right channel 57 of a stereo output communicate serially or through various analog-to-digital (A/D) and digital-to-analog (D/A) converters in converter 47 in FIG. 2 and bus 121 to data memory 43. A plurality of data communication modules 137 are provided in data memory 43 for passing real-time and/or asynchronous steamed data between DSP 37 and multimedia end devices 13. Preferably, each data communication-modules comprises a circular memory buffers, which will be described in greater detail herebelow, and include telephone input circular buffer 123, telephone output circular buffer 125, microphone input circular buffer 127, left channel stereo output circular buffer 129, right channel stereo output circular buffer 131, MIDI input circular buffer 133, and MIDI output circular buffer 135. As is depicted in FIG. 5, streamed data from telephone input 49, microphone input 53, and MIDI input 51 are directed to data memory 43 through use of a conventional direct memory access (DMA) operation.

With reference again to FIG. 3, a plurality of modular multimedia software tasks are resident in the digital signal processing BIOS, including: direct memory access interface task 139; universal asynchronous receiver and transmitter (UART) interface task 141; analog conversion interface task 143; and CD digital-to-analog conversion (CD-D/A) interface task 145. The multimedia modular software tasks, such as telephone answering machine task 75, sound task 77, modem task 79, and other digital signal processing tasks 81 communicate real-time and/or asynchronous streamed data between one another and with the digital signal processing BIOS tasks through use of data communication modules, such as those which are provided for writing and reading real-time and/or asynchronous stream data between data memory 43 and the plurality of multimedia end devices 13.

Figure 6A:
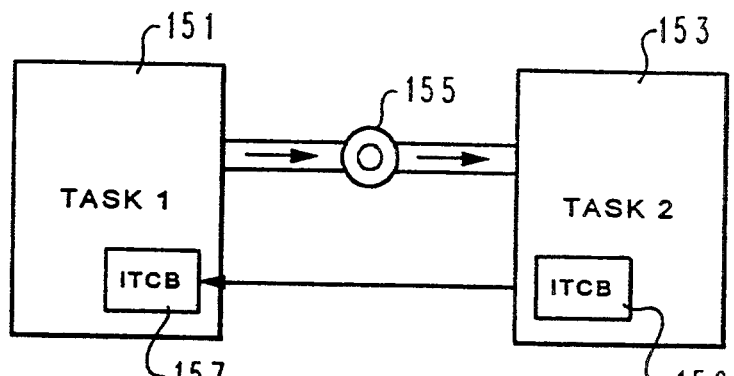
FIGS. 6A, 6B, and 6C are block diagram representations of the use of data communication modules and intertask control blocks to obtain a modular and open architecture.
Figure 6B:
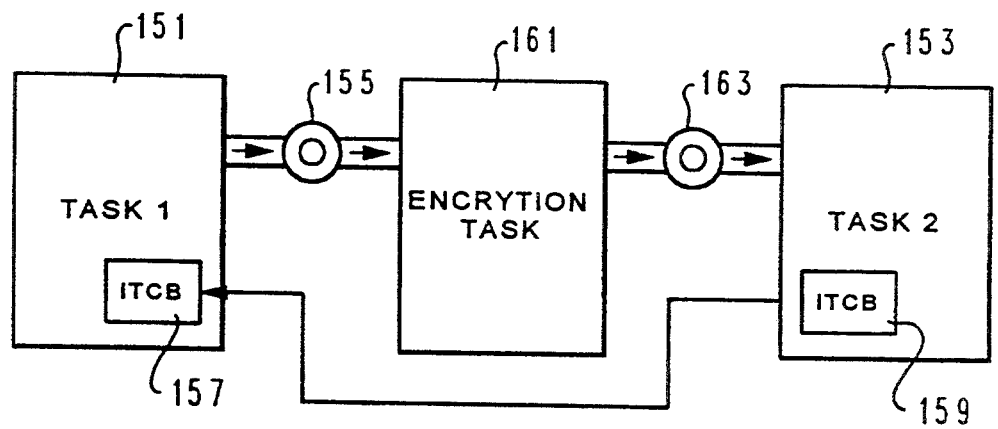
Figure 6C:
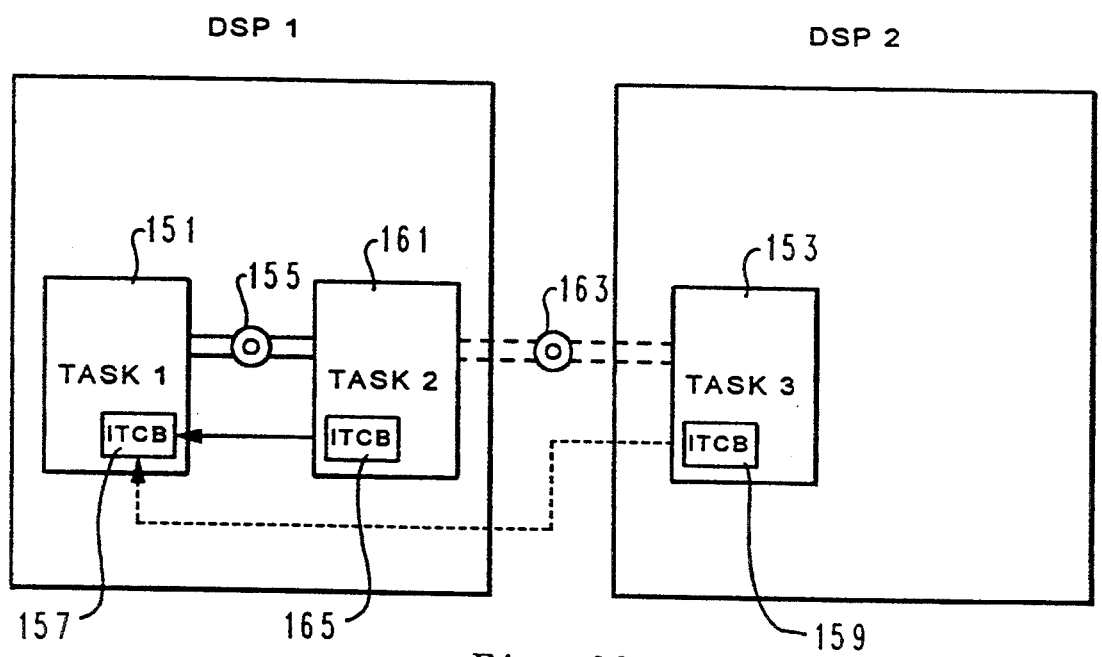

An open and modular architecture for multimedia operations is obtained through use of this novel data communication module, when used in combination with an intertask control block, both of which will be described herebelow with reference to FIGS. 6 through 12. FIGS. 6A, 6B, and 6C are block diagram representations of the use of data communication modules and intertask control blocks to obtain a modular and open architecture. FIG. 6A depicts a data communication module 155 that may be employed to provide continuous, real-time, and unidirectional transfer of data from task 151 to task 153, both of which are resident in a single digital signal processor. Intertask control block 157 is defined in task 151, while intertask control block 159 is defined in task 153. The intertask control blocks 157 and 159 are provided to pass status and control information between tasks 151 and 153.

FIG. 6B depicts the insertion of encryption task 161 between task 151 and task 153. As is shown, data communication module 155 passes data from task 151 to encryption task 163. Data communication module 163 is provided between encryption task 161 and task 153 to allow continuous, real-time and unidirectional transmission of data from encryption task 161 to task 153. As illustrated, intertask control blocks 157 and 159 still serve to pass status and control information between tasks 151 and 153. Tasks 151 and 153 and encryption task 161 are all resident in a single digital signal processor.

FIG. 6C depicts a configuration with tasks 151 and 161 resident in a first digital signal processor, and with task 153 resident in a second digital signal processor, which are cooperating to perform multimedia tasks. As illustrated, data communication module 155 provides for passing data between task 151 and task 161. Data communication module 163 provides for passing data from task 161 to task 153. An additional intertask control block 165 provides for passing status and control information between tasks 151 and 161, while intertask control blocks 157 and 159 pass status and control variables between task 151 and 153.

In the manner shown in FIGS. 6A, 6B, and 6C, modular multimedia software tasks and multimedia end devices may be connected together in a myriad of user-selected combinations. Users may code unique tasks for individual needs, and then connect these tasks to preexisting modular multimedia software tasks by using data communication modules and intertask control blocks. Users need not be concerned with the particular coding of the modular multimedia software tasks, and need only be concerned with the data communication protocols for passing data through data communication modules and intertask control blocks.

Thus, the present invention provides a relatively low-risk open architecture allowing users to code their own multimedia application software without undue risk to the operation of prepackaged modular multimedia software tasks. Using data communication modules and intertask communication blocks provides a greatly enhanced connectivity and represents a substantially open architecture, thus allowing a large number of software vendors to create and market prepackaged multimedia application software which include a large variety of modular multimedia software tasks which are executable by the digital signal processor without interference with other prepackaged multimedia application software which has been generated by other software vendors, as well as the end users themselves. Sustaining this substantially open architecture requires a number of strict rules with regard to data communication modules and intertask control blocks.

Figure 7A:
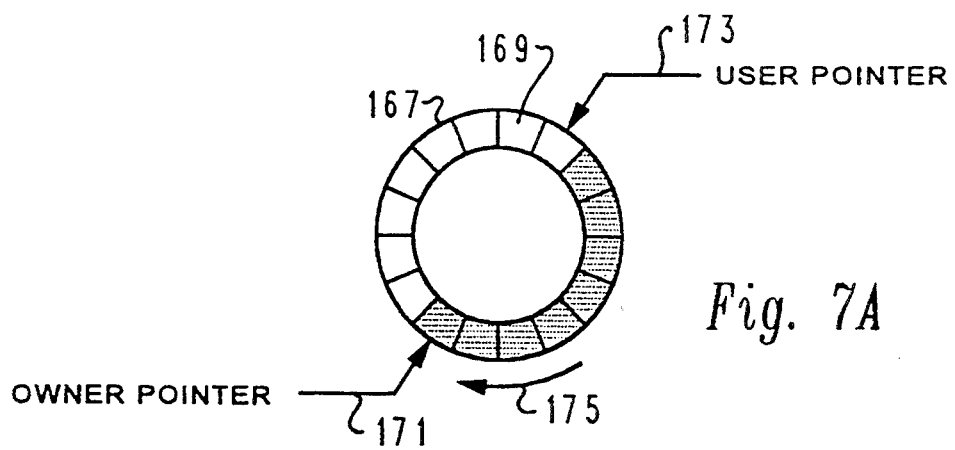
FIGS. 7A, 7B, and 7C depict the preferred operating rules which allow orderly use of data communication modules to transfer data between modular multimedia software tasks and multimedia end devices.
Figure 7B:
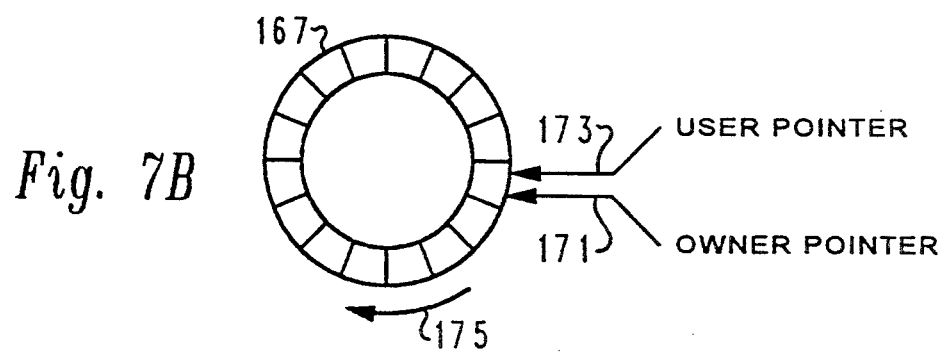
Figure 7C:
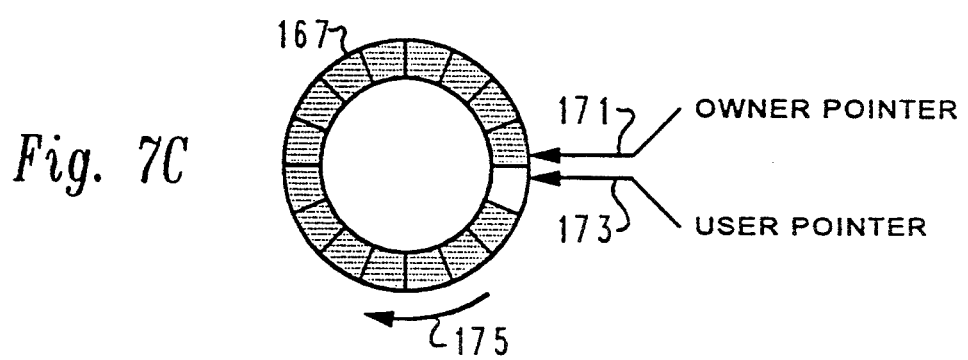

FIGS. 7A, 7B, and 7C depict the preferred operating rules allowing orderly use of data communication modules to transfer data between modular multimedia software tasks and multimedia end devices. In the preferred embodiment, data communication modules are circular buffers used to pass data streams between two or more modular multimedia software tasks or between one modular multimedia software task and one or more multimedia end devices. As illustrated in FIG. 7A, circular memory array 167 is composed of a plurality of bytes or words, which are graphically depicted by segments in circular memory array 167, such as memory segment 169. In FIGS. 7A, 7B and 7C, the shaded memory segments contain new data while the unshaded memory segments contain no new data.

To ensure an orderly communication of real-time and/or asynchronous data, one task is designated as the "owner" of any particular data communication module. A data communication module may have only one owner. The owner is the only task allowed to write to the data communication module circular memory array 167. The owner task controls an owner pointer 171 (or "write pointer") identifying the last memory segment into which data has been written. One or more modular multimedia software task are identified as the "users" of a data communication module. The "user" task or end device controls a user pointer 173 (or "read pointer") identifying the last memory segment in the circular memory 167 from which data has been read. Before an owner task writes data to circular memory array 167, owner pointer 171 is incremented to identify the next consecutive memory segment in the circular memory array 167. Before a user task reads data from circular memory array 167, user pointer 173 is likewise incremented to identify the next memory segment in circular memory array 167 which is to be read. Data is read from and written to circular memory array. 167 in only one direction, which is graphically depicted by arrow 175 in FIG. 7A.

FIG. 7B depicts an "empty" data communication module. All of the data written by the owner task to circular memory array 167 has been read or "consumed" by the user task. In this situation, the owner pointer 171 and the user pointer 173 will identify the same memory segment. FIG. 7C depicts a "full" data communication module. In this situation, the owner task has written data to all available memory segments in circular memory array 167. This situation can be identified when owner pointer 171 is one memory segment element behind the user pointer 173. Incrementing user pointer 173 or owner pointer 171 moves the pointer forward in the buffer in the direction of arrow 175.

Figure 8A:
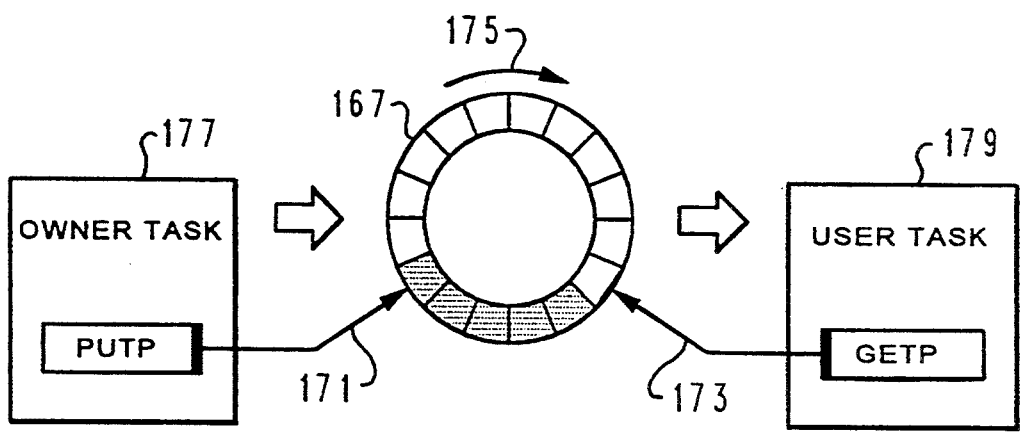
FIGS. 8A, 8B, 8C, and 8D graphically represent the four standardized communication protocols established for use with data communication modules in the preferred embodiment of the present invention.
Figure 8B:
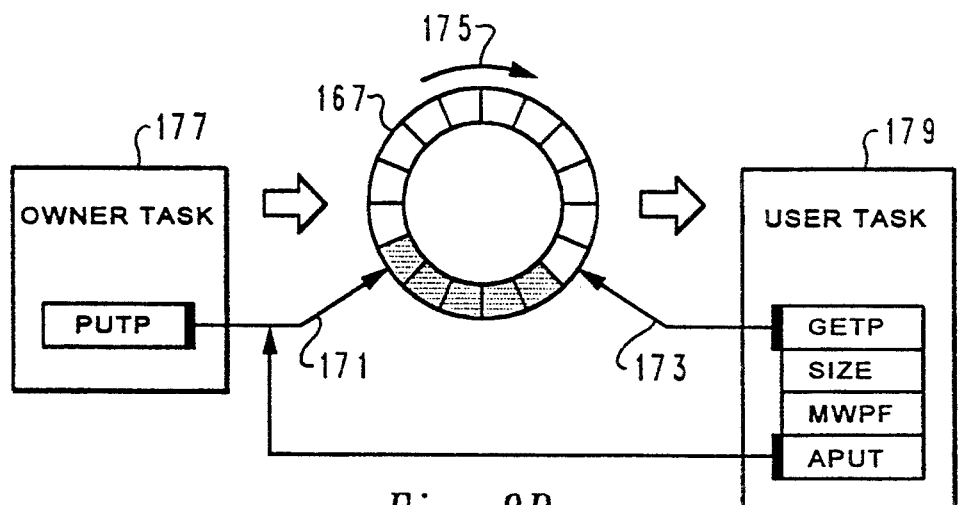
Figure 8C:
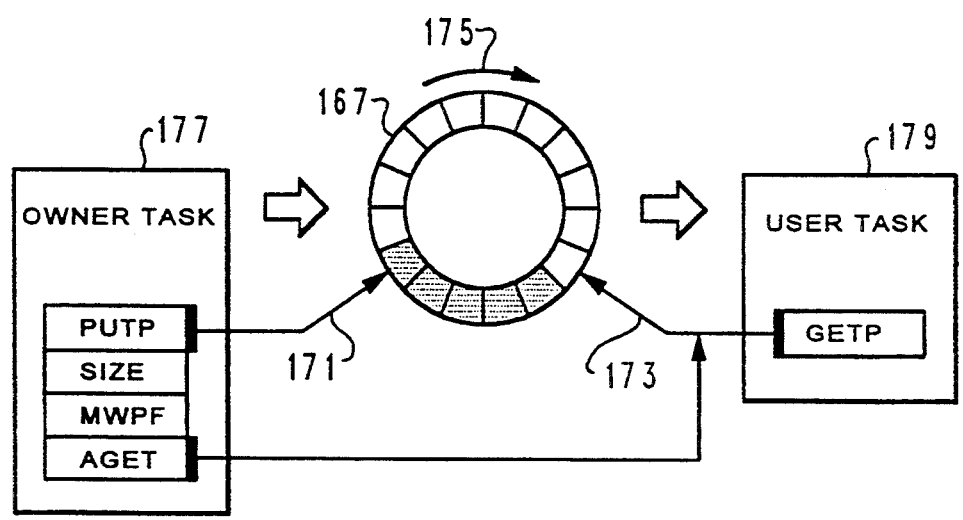
Figure 8D:
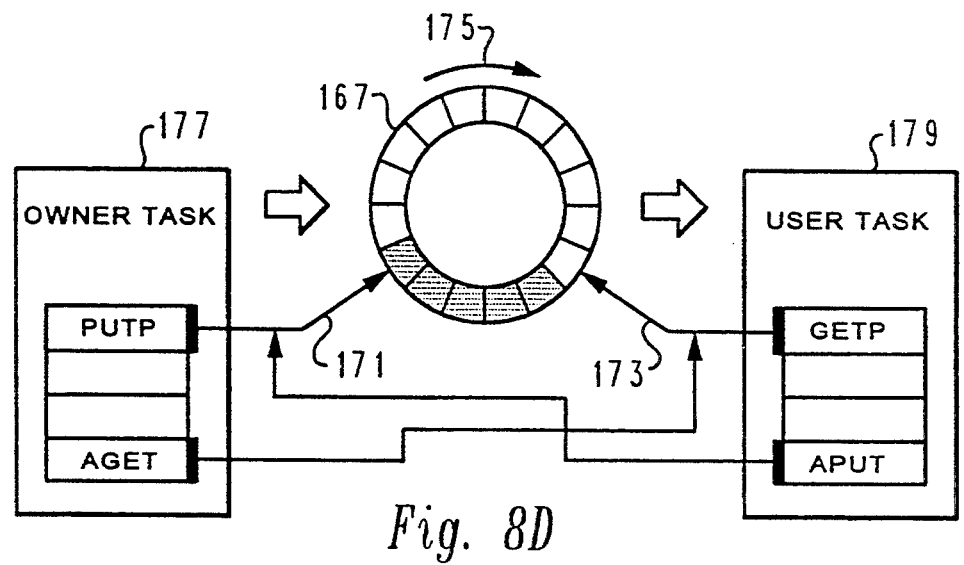

In facilitating communication of real-time and/or asynchronous streamed data, four standardized communication protocols are employed with data communication modules in accordance with a preferred embodiment of the present invention. FIGS. 8A, 8B, 8C, and 8D graphically represent the four standardized communication protocols used with data communication modules in the preferred embodiment of the present invention. FIG. 8A represents a synchronous protocol. FIG. 8B represents an owner data driven protocol. FIG. 8C represents a user data driven protocol. FIG. 8D represents a safe data driven protocol.

With reference now to the synchronous protocol illustrated in FIG. 8A, owner task 177 writes data to circular memory array 167 at a constant rate, while user task 179 reads data at the same constant rate. Therefore, both owner task 177 and user task 179 run "open loop" with no feedback about the location of the owner pointer 171 (the address "PUTP") provided to the user task and no feedback about the location of the user pointer 173 (the address "GETP") provided to the owner task. The owner task 177 assumes that the user task 179 is consuming data at the correct rate, while the user task 179 assumes that the owner task 177 is producing data at the correct rate. Neither owner task 177 nor user task 179 checks for "empty" or "full" buffer conditions, and neither owner task 177 nor user task 179 knows the position or address of the other task's pointer. It is therefore important that the owner task 177 and the user task 179 run from the same hardware interrupt source and at the same sample rate to assure that they will maintain precise synchronization evidenced by a uniform separation (over time) of the write pointer 171 and the read pointer 173. Only one owner task can write-data to a data communication module operating in the synchronous protocol mode of operation, but any number of user tasks can be connected to the data communication module.

FIG. 8B represents the owner data driven protocol in which owner task 177 writes data to circular memory array 167 at its own rate. User task 179 is expected to keep up with owner task 177 and consume all the data that is produced by owner task 177 and written to circular memory array 167. Owner task 177 runs "open looped", never having any feedback on the location (that is, the address) of read pointer 173 and never checking to determine if circular memory array 167 is "full" or "empty". Owner task 177 can write data to circular memory array 167 at a constant rate or at a variable rate, up to a maximum prescribed rate. This maximum rate is specified in a "macro" defining the data communication module in units of maximum words per frame, MWPF, as will be described in greater detail below. The size of circular memory array 167 also is defined by the macro as "SIZE". The size, SIZE, maximum words per frame, MWPF, as well as the address of write pointer 171, APUT, are all maintained by user task 179 and are employed to ensure that user task 179 consumes all of the data produced by owner task 177. User task 179 has the responsibility to ensure that circular memory array 167 never becomes full or overflows. If user task 179 falls behind, owner task 177 will overwrite old data with new data. Typically, user task 179 empties circular memory array 167 by reading all of data that is available or reads a block of data as soon as a complete block of data is available. As stated above, user task 179 knows the address of write pointer 171 of owner task 177 and therefore can compare the location of pointers. If the address of write pointer 171, PUTP, is equal to the address of write pointer 173, GETP, then circular memory array 167 is "empty". Otherwise, circular memory array 167 contains data that should be consumed by user task 179.

The owner data driven protocol is useful when owner task 177 must produce data at some given rate, while user task 179 can adapt its consumption rate to match that of owner task 177. An example of an application requiring the owner data driven protocol is a modem receiving data from a telephone line and passing the data to another task for processing. The task sampling incoming data from the phone line must do so at precise fixed rates. The task processing the data might have less stringent timing requirements.

FIG. 8C depicts the user data driven protocol in which user task 179 reads data at its own rate. Owner task 177 is expected to match the rate of user task 179 and must always keep enough data in circular memory array 167. User task 179 can read data at a constant or variable rate, but the rate must be less than or equal to a specified maximum rate. Owner task 177 is responsible for maintaining separation between write pointer 171 and read pointer 173, based upon the maximum data consumption rate, MWPF of user task 179. User task 179 runs "open loop", and does not know the address of write pointer 171, PUTP. In contrast, owner task 177 knows the address of read pointer 173, AGET, of user task 179.

FIG. 8D depicts the safe data driven protocol mode of operation. In this protocol, both owner task 177 and user task 179 actively prevent pointer overrun. Owner task 177 will never write data to circular memory array 167 if the circular memory array 167 is determined to be "full" in view of the location of write pointer 171 and read pointer 173. User task 179 never reads data from circular memory array 167 if circular memory array 167 is determined to "empty" as determined by the relative position of write pointer 171 and read pointer 173. If owner task 177 passes data to user task 179 in blocks, such as sixteen samples per block, owner task 177 should wait until there is sufficient room in circular memory array 167 for a full block before beginning write operations. User task 179 should wait until a full block of data is available for commencing read operations. In this safe data driven protocol mode of operation, owner task 177 is apprised at all times of the address of read pointer 173. Conversely, user task 179 is at all times apprised of the address of write pointer 171.

All connections to a data communication module may be established and defined with regard to a data communication module macro, which is depicted in FIG. 30A. Each connection to a data communication module is defined with reference to the following labels and parameters:
(1) label;
(2) owner or user designation;
(3) size or minimum size;
(4) data communication protocols;
(5) a maximum word per frame for either reading or writing data;
(6) a minimum pointer separation;
(7) a data sample rate;
(8) a data addressing mode;
(9) a data format mode;
(10) a maximum delay between reading and writing operations; and
(11) size of the data elements passing through the data communication module.

Each of these parameters will be discussed in more detail below with reference to the macro, which is set forth in assembler programming language in FIG. 30A.

LABEL FOR THE DATA COMMUNICATION MODULE: A label is required for designation of the data communication module, which is used to identify and distinguish a particular data communication module from other data communication modules, which have been created to pass data between modular multimedia software tasks or between modular multimedia software tasks and multimedia end devices.

OWNER OR USER DESIGNATION: It is required that the connection to a data communication module be identified as being either an owner-type or user-type. Both designations cannot be made.

SIZE: The size of the circular memory array is designated, in sixteen-bit words. In the preferred embodiment, the data communication module may have a size of 32, 64, 128, 256, 512, 1024, or 2048 words. For operation of data communication modules in the synchronous protocol mode of operation, it is important that the size of the buffer be at least twice the maximum words per frame that will be produced or consumed. In the alternative, the user may select a minimum buffer size for user-type data communication modules only. A user-type data communication module may connect to any owner-type data communication module that has a size greater than or equal to the minimum size (MINSIZE).

Figure 9:
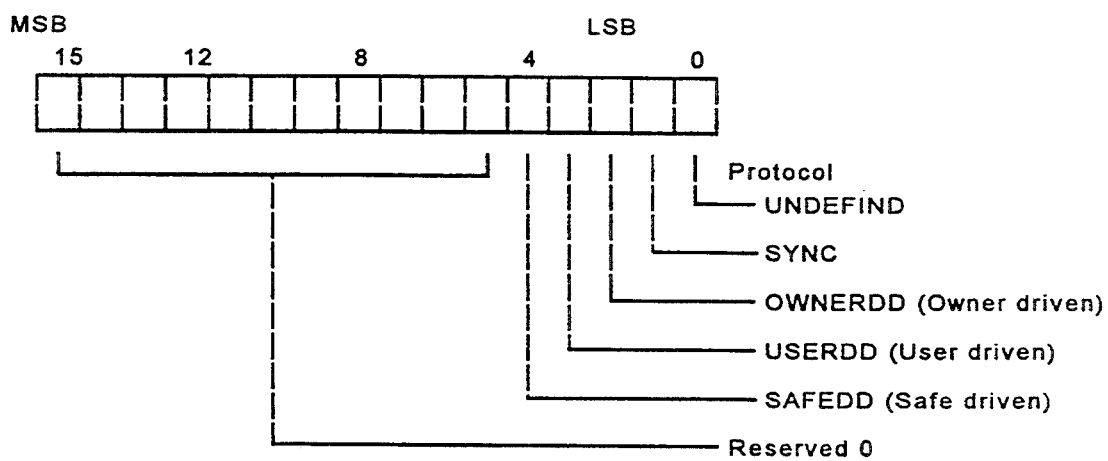
FIG. 9 graphically depicts a sixteen bit word of which the five least significant bits represent a data communication protocol selection.

PROTOCOLS: As discussed above, four protocols are available for user selection, including: synchronous protocol, owner data driven protocol, user data driven protocol, and safe data driven protocol. FIG. 9 graphically depicts a sixteen bit word of which the five least significant bits represent a data communication protocol selection. A binary one in bit zero indicates that a protocol has not been selected. A binary one in bit one indicates that the synchronous protocol mode of operation has been selected by the user. A binary one in bit two indicates that an owner data driven protocol has been selected. A binary one in bit three indicates that the user has selected a user data driven protocol. Finally, a binary one in binary bit four indicates that a safe data driven protocol has been selected. The user may select more than one protocol, provided that the protocols are compatible. FIG. 30B graphically depicts protocol compatibility. As depicted therein, an owner-type task which is operated in a synchronous protocol mode of operation may be connected through a data communication module with a user-type task which is in either a synchronous (SYNC) protocol mode of operation or an owner data driven (OWNERDD) protocol mode of operation. FIG. 30B further indicates that an owner-type task which is operated in an owner data driven protocol mode of operation may only be coupled through a data communication module with a user-type task which is operated in an owner data driven protocol mode of operation. FIG. 30B further indicates that an owner-type task which is operated in a user data driven (USERDD) protocol mode of operation may pass data through a data communication module to a user-type task which is operated in any of the four identified protocol modes of operation. Finally, FIG. 30B indicates an owner-type task which is operated in a safe data driven (SAFEDD) protocol mode of operation may pass data to a user-type task which is operated in either the owner data driven protocol mode of operation or the safe data driven protocol mode of operation.

MAXIMUM WORDS PER FRAME: The maximum words per frame is the maximum number of words that will be produced or consumed each time the task executes. For example, if the owner task writes data at a constant rate of sixteen words per frame, then the maximum words per frame (MAXWPF) is sixteen.

MINIMUM SEPARATION: The minimum separation is the minimum separation that can be tolerated between the owner pointer and the user pointer. For data communication modules operating in the synchronous protocol mode of operation, a good rule of thumb is to set the minimum separation equal to the maximum words per frame. If the owner task and the user task define different values for minimum separation, then the larger value should be used to synchronize the operation of the two.

SAMPLE RATE: The sample rate specifies the intrinsic sample rate of the data flowing through the data communication module. If both the user and owner specify non-zero sample rates, then the sample rate must be the same for both the owner task and the user task. If this is not so, the tasks should not be connected.

DATA ADDRESSING MODE: The data addressing mode identifies the mode that will be used in manipulating the data communication module pointer. The choices are "byte", "table", or "word". The owner-task and user-task must identify the same type of data addressing mode to allow connection.

DATA FORMAT MODE: The data format mode describes the format of data which is written into and read from the data communication module. The owner task and the user task must specify the same mode; otherwise, the connection is not allowed. Data is viewed as packets of length N, where N is an integer. For example, setting N to 2 is one technique for allowing the transmission of left and right channels for stereo sound, or real and imaginary parts of complex numbers. Setting N to other integer values will allow the passage of larger sets of data within N components representative of different portions of a signal. Setting the data format mode to "universal" will allow the connection of the data communication module to any other data communication module, without regard to its particular mode selection for data format.

MAXIMUM DELAY: The maximum delay is what one is willing to tolerate between the time an owner task writes data to the data communication module and the time the user task reads the data from the data communication module. The maximum delay may be specified as either "MAXDELF" or "MAXDELT," but not both. MAXDELT is measured in absolute time in units of nanoseconds, microseconds, milliseconds, or seconds. The unit of measure for MAXDELF is one frame or period of the task associated with the data communication module macro. For example, if an owner task runs once every eight interrupts from an eight kilohertz interrupt source, the frame, or period, of the task is determined to be one millisecond. The task can tolerate a delay of no more than three milliseconds between the time it writes to the data communication module and the time the data is consumed. The data communication module macro should specify the delay tolerance with either MAXDELT=3 MS or MAXDELF=3.

STRIDE: The stride is the size, in words, of the data elements passing through the data communication module. Stride defines the number of sixteen bit samples that comprise a single unit of information that is useful to a task. If N-dimensional data is being processed, stride should be set to equal N. For example, stereo audio must be processed in left and right pairs of samples, therefore stride should be set to two.

Figure 10:
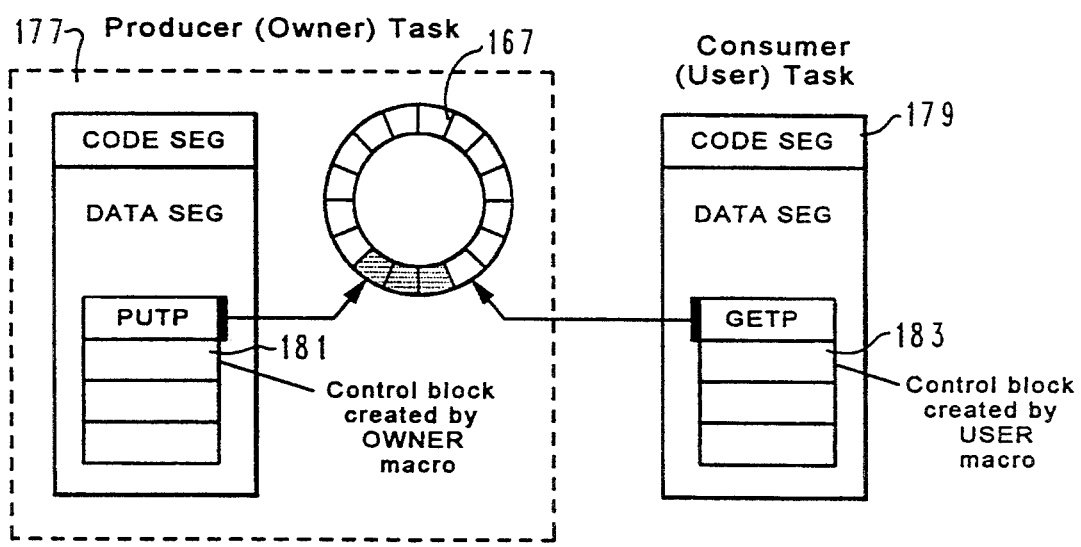
FIG. 10 represents the creation of control blocks in the owner and user tasks.

FIG. 10 represents the creation of control blocks in the owner and user tasks as a result of designations made in the macro illustrated in FIG. 30A, which defines a data communication module. Two macros (such as those shown in FIG. 10) must be defined in order to connect producer task 177 to circular memory array 169 and consumer task 179 to circular memory array 167. The owner-type macro creates control block 181 in the data segment of the owner task. The user-type macro creates control block 183 in the data segment of the user task. The control block varies in length from one to four words, depending upon the data communication protocol which has been selected. The different types of control blocks which may be generated are depicted in FIGS. 8A through 8D.

Referring again to FIG. 8A, the control block, which is established in owner task 177, includes only write pointer 171. The user task 179 includes only read pointer 173 (GETP). In FIG. 8B, the owner task 177 includes only write pointer 171 (PUTP). In user task 179, the control block includes read pointer 173 (GETP), the size of the circular memory array (SIZE), the maximum words per frame (MWPF), and the address of the write pointer 171 (APUT). In FIG. 8C, the owner task 177 has a control block which includes write pointer 171 (PUTP), the size of the circular memory array (SIZE), the maximum words per frame (MWPF), and the address of the read pointer 173 (AFET). User task 179 includes only read pointer 173. In FIG. 8D, the control block of owner task 177 includes the address of both write pointer 171 (PUTP) and the address for read pointer 173 (AGET). User task 179 likewise includes the write pointer 171 (GETP) and the address of read pointer 173 (APUT).

Figure 15:
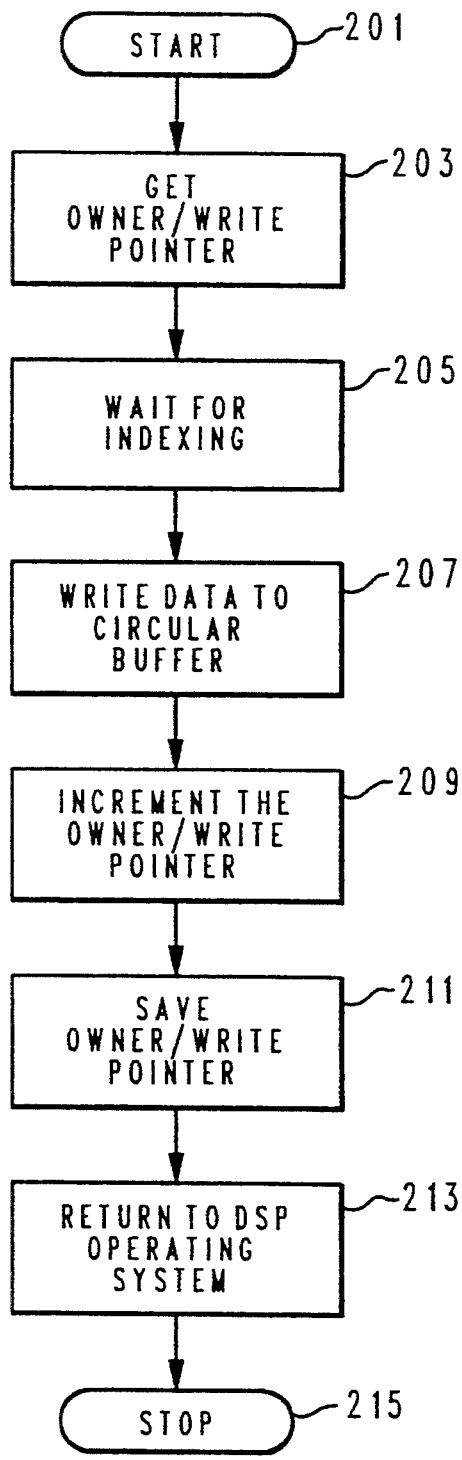
FIG. 15 is a flowchart representation of the task of writing to a data communication module in the synchronous protocol mode of operation.
Figure 16:
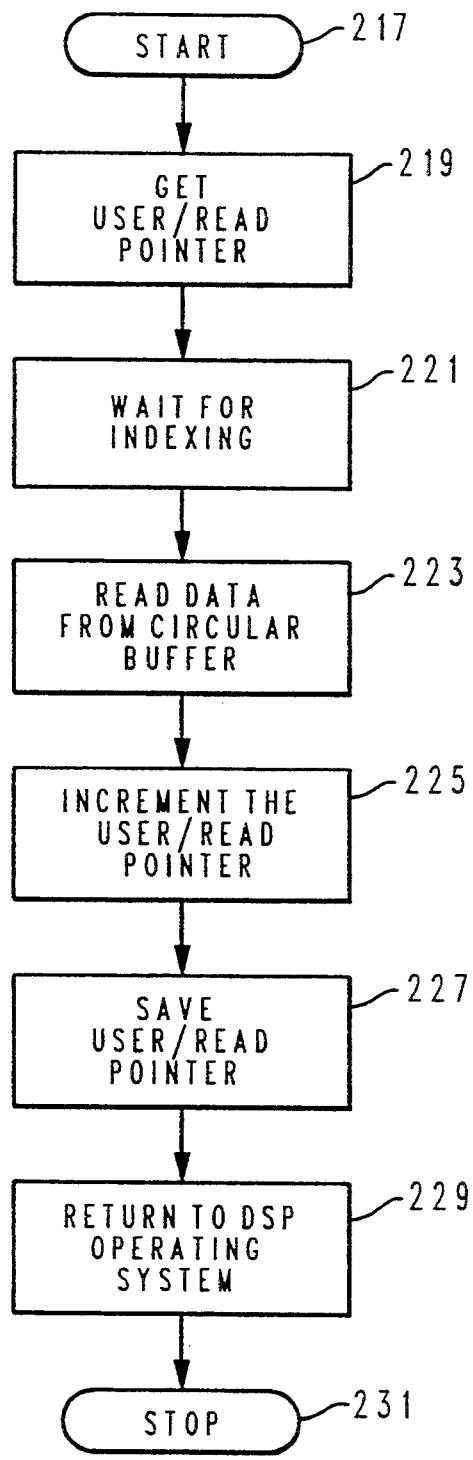
FIG. 16 is a flowchart representation of the task of reading from a data communication module in the synchronous protocol mode of operation.

One substantial benefit of having rigid data communication structures and standardized data communication protocols for data communication modules is that reading and writing operations to and from a data communication module may be constructed as simple, standardized software routines. FIG. 15 is a flowchart of the task of writing to a data communication module in the synchronous protocol mode of operation. FIG. 16 is a flowchart of a task for reading data from a data communication module in the synchronous protocol mode of operation.

First with reference to FIG. 15, the writing operation starts at block 201. In block 203, the digital signal processor is instructed to get the owner/write pointer. The digital signal processor pauses at block 205 to allow for indexing. The particular DSP in this embodiment requires a clock cycle to update the address register. In block 207, the digital signal processor writes data to the circular buffer which comprises a selected data communication module. Then, in block 209, the digital signal processor increments the owner/write pointer to allow writing to the next segment of memory in the circular buffer. Blocks 207 and 209 are repeated until the write operation is completed. In block 211, the digital signal processor saves values of the pointer for use in future writing operations. In block 213, the routine returns to the DSP operating system resident in the DSP memory. In block 215, the Writing process stops.

When data is to be read from the data communication module, the process starts in block 217 when the task is scheduled for processing by the DSP operating system. In block 219, the digital signal processor is instructed to get the user/read pointer. In block 221, the digital signal processor waits for indexing operations. In block 223, the digital signal processor reads data from the circular buffer. Next, in block 225, the digital signal processor increments the user/read pointer. Blocks 223 and 225 are repeated until the read operation is completed. In block 227, the digital signal processor saves the value of the user/read pointer for use in future read operations. Then, in block 229, the routine returns to the DSP operating system resident in DSP memory.

FIG. 17 is a flowchart of the task of writing to a data communication module in the user data driven protocol mode of operation. The process starts at block 235 when the task is scheduled for execution by the DSP operating system. In block 237, the digital signal processor is instructed to determine the value of the owner/write pointer. Next, in block 239, the digital signal processor is instructed to determine the value of the user/read pointer. Then, in block 241, the digital signal processor is instructed to determine the distance between the owner/write pointer and the user/read pointer. In block 243, the digital signal processor is instructed to write data to the data communication module at a rate which is dependent upon the determined distance between the owner/write pointer and the user/read pointer. In block 245, the digital signal processor is instructed to save the value of the pointers for both the owner/write pointer and the user/read pointer. According to block 247, the route returns to the DSP operating system resident in DSP memory. Finally, in block 249, the process stops.

FIG. 18 is a flowchart representation of the task of reading data from a data communication module in either the owner data driven protocol mode of operation or the safe data driven protocol mode of operation. The process begins in block 251, when the DSP operating system schedules the routine for execution. In block 253, the digital signal processor is instructed to determine the value of the owner/write pointer. Next, in block 255, the digital signal processor is instructed to determine the value of the user/read pointer. In accordance with block 257, the digital signal processor is instructed to determine the distance between the owner/write pointer and the user/read pointer. Next, in block 259, the digital signal processor is instructed to read all available data from the data communication module until the pointer locations indicate that the circular memory array is "empty". Next in block 261, the digital signal processor is instructed to save the value of the pointers for use in future read operations. In accordance with block 263, the digital signal processor returns control to the DSP operating system resident in DSP memory. Finally, in step 265, the process terminates.

Figure 11:
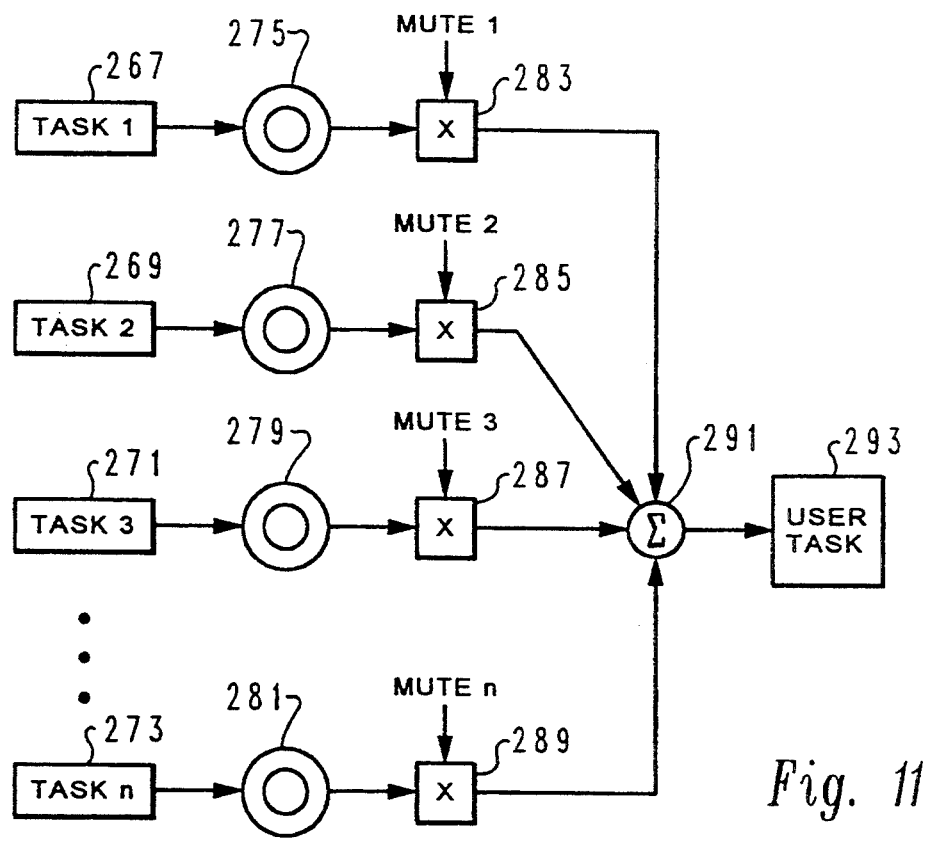
FIG. 11 is a block diagram representation of the communication of data streams from a plurality of modular multimedia software tasks through a plurality of data communication modules to a single user task through the use of a virtual data communication module.

As discussed above, it is possible for a single user task to receive data which is streamed through a plurality of data communication modules. FIG. 11 is a block diagram of communication of data streams from a plurality of modular multimedia software tasks 267, 269, 271 and 273 through a plurality of data communication modules 275, 277, 279 and 281 to a single user task 293 through the use of a virtual data communication module 291. In the preferred embodiment of the present invention, a plurality of "mute" tasks 283, 285, 287 and 289 are connected between data communication modules 275, 277, 279 and 281 and virtual data communications module 291. Mute tasks 283, 285, 287 and 289 apply an attenuation or "mute" factor to the outputs of data communication modules 275, 277, 279 and 281 to attenuate the output and prevent overflow during summing operations, which are performed by virtual data communication module 291.

Figure 13:
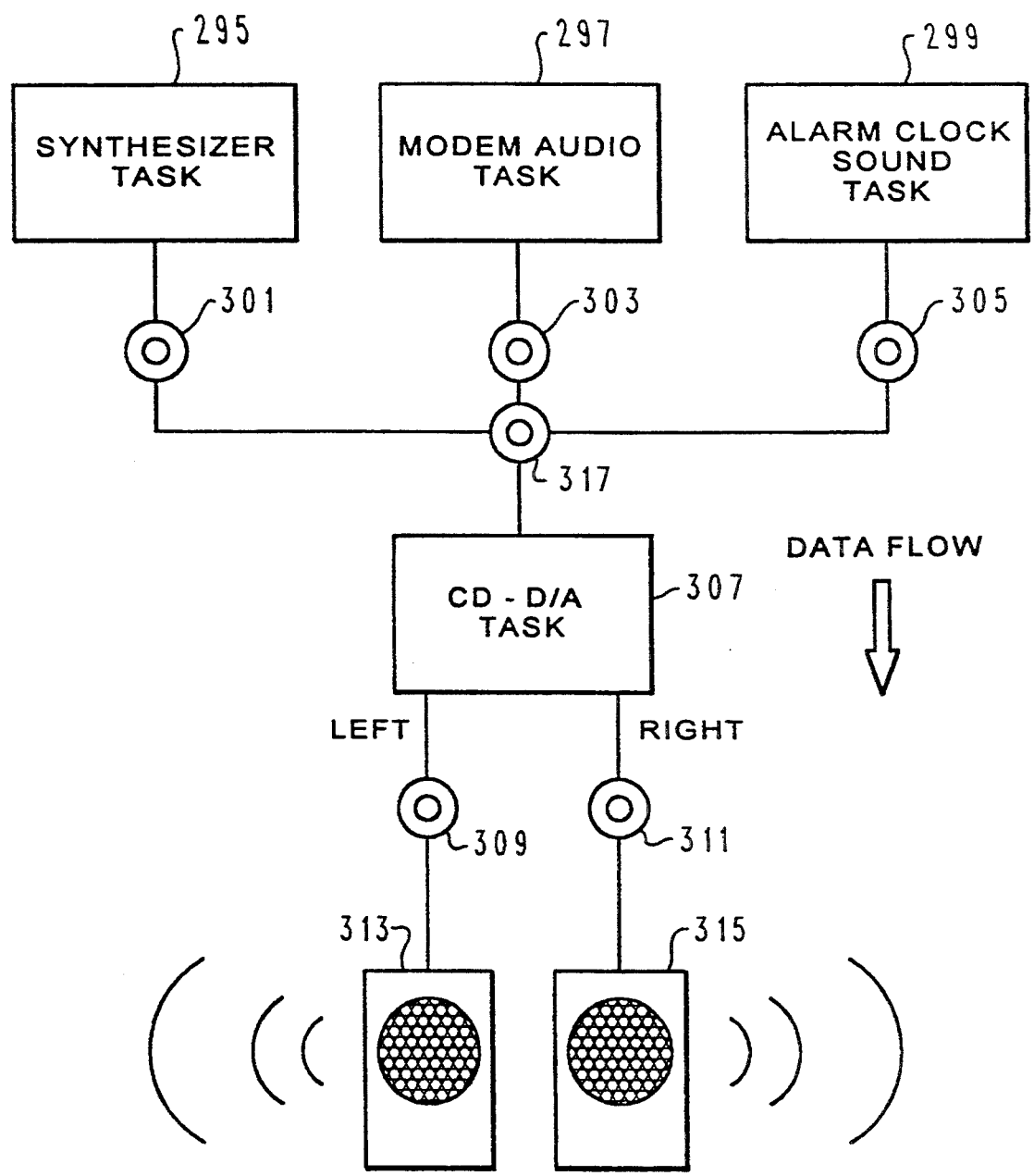
FIG. 13 is a block diagram representation of the multiplexing of audio output signals from a plurality of modular multimedia software task to a single CD-digital-to-analog converter through use of a virtual data communication module.

An example of this type of operation is depicted in FIG. 13, which is a block diagram illustrating the multiplexing of audio output signals from a plurality of modular multimedia software tasks, including synthesizer task 295, modem audio task 297, and alarm clock sound task 299 to a single CD-digital-to-audio (CD-D/A) converter task 307. Real-time and/or asynchronous streamed data is directed from synthesizer task 295 through data communication module 301 to virtual data communication module 317. Likewise, real-time and/or asynchronous stream data is directed from modem audio task 297 through data communication module 303 to virtual data communication module 317. Similarly, alarm clock sound task 299 directs real-time and/or asynchronous streamed data through data communication module 305 to virtual data communication module 317. Virtual data communication module 317 sums various real-time and/or asynchronous streamed data outputs from synthesizer task 295, modem audio task 297, and alarm clock sound task 299 to provide an input to CD-D/A task 307. In turn, CD-D/A task 307 converts the digital output from virtual data communication module 317 into a digitized analog output. This output is passed through data communication modules 309 and 311 before being directed to speakers 313 and 315 to produce an audio sound output.

In the example shown in FIG. 13, the output from synthesizer task 295 may represent synthesized human voice sounds. The output from modem audio task 297 may represent the audible confirmation tones, which are provided in most commercially available modems, to indicate to the user that the modem task is being performed. The alarm clock sound task 299 may represent an alarm clock sound to alert the user of a calendared or scheduled event at a predetermined time. The use of virtual data communication module 317 allows speakers 313 and 315 to be simultaneously driven with the real-time and/or asynchronous streamed data from those tasks. This is an advantageous feature because overlapping, simultaneous operation Of a variety of multimedia tasks, which drive multimedia end devices, is allowed without interfering with the operation of any of the particular tasks or end devices. In this manner, FIG. 13 depicts one real world advantage of the data communication modules of the present invention used in conjunction with the predefined and standardized data communication protocols and data communication rules.

Figure 12:
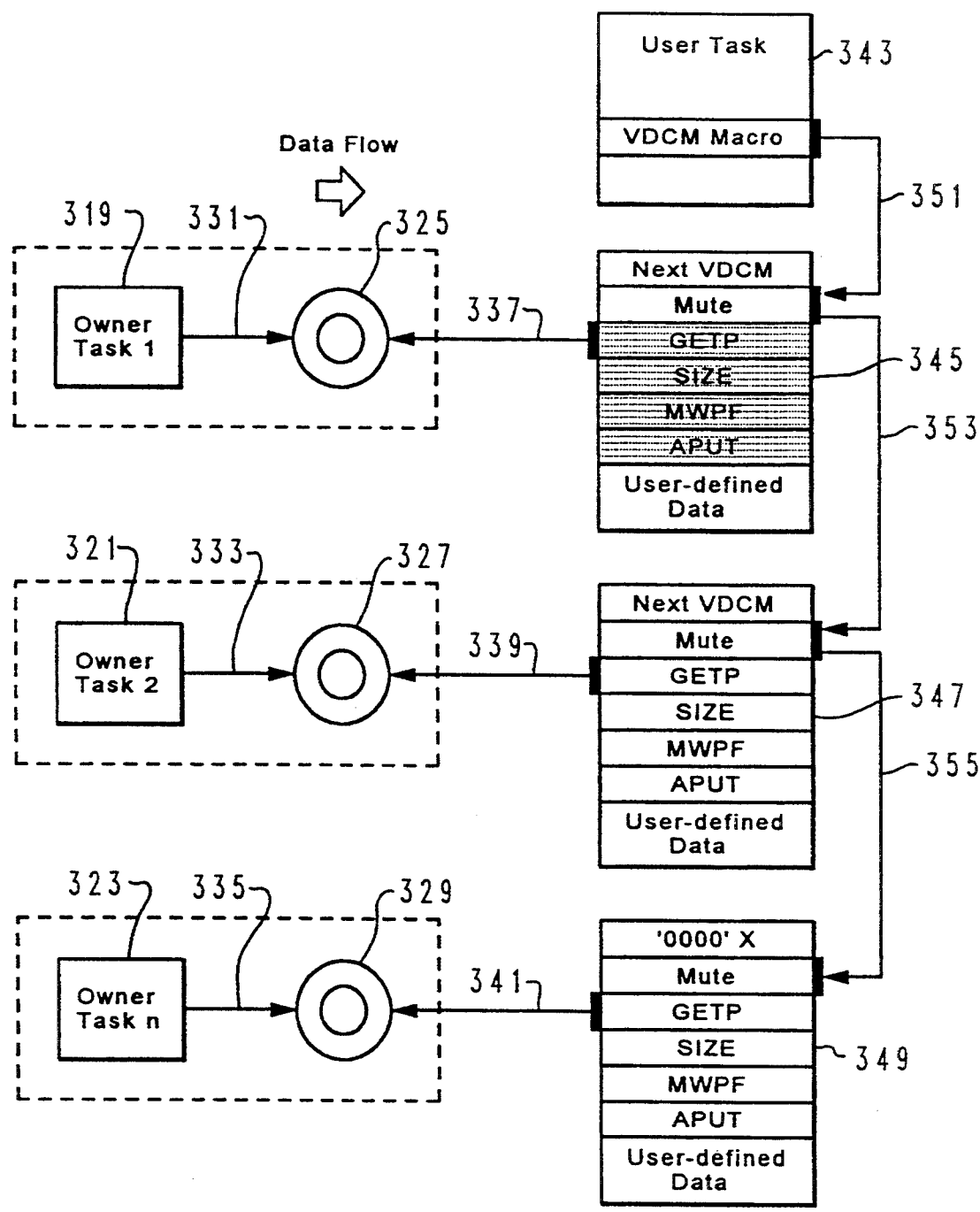
FIG. 12 is a more detailed block diagram representation of the operation of the virtual data communication module of FIG. 11.

FIG. 12 is a more detailed block diagram representation of the operation of the virtual data communication module of FIGS. 11 and 13. As is shown in FIG. 12, owner tasks 319, 321, and 323 write streamed data to data communication modules 325, 327, and 329 using write pointers 331, 333 and 335, respectively. Read pointers 337, 339 and 341 read data from data communication modules 325, 327, and 329 according to instructions and parameters of data macros 343, 345, 347, and 349. As shown, data macros 345, 347, and 349 are coupled together by a linked-list through the virtual data communication module control blocks graphically depicted on the right hand side of FIG. 12. As depicted, link 351 connects user task 343 to data macro 345. Link 353 connects data macro 345 to data macro 347. Link 355 connects data macro 347 to data macro 349.

User task 343 includes an address (VDCM macro) to data macro 345. Data macro 345 defines the mute factor, the read pointer (GETP), the size of data communication module 325 (SIZE), the maximum data flow rate into data communication module 325 (maximum words per frame—MWPF), and the address of write pointer 331 (APUT). Data macro 345 further includes a user-defined variable, which may or may not be used by user task 343 in the processing of the data from owner task 319. Data macro 345 includes an address to the next virtual data communication module. As shown, data macro 347 includes the read pointer 339 (GETP), the size of data communication module 327 (SIZE), the maximum data flow rate into data communication module 327 (maximum words per frame—MWPF), and the address of write pointer 333 (APUT). DATA macro 347 further includes a user defined variable, which may be used by user task 343 in processing of the data from owner task 321. Data macro 347 also includes the address to the next virtual data communication module. As illustrated, data macro 349 includes the values of the read pointer 341 (GETP). Since data macro 349 represents the last data multiplexing task, its first location is set to "0000" to indicate that control should not be passed to any other data macro.

FIG. 30C identifies in a table the basic components of a virtual data communication macro. The first component is the address to the "next virtual data communication module", which is identified as "next virtual DCM". The second component is the mute factor which is used to quiet the output during connection. The third component is a control block which identifies the user's pointer, the size of the circular memory buffer, the maximum words per frame, and the address of the owner's pointer. Finally, user-defined data is provided to allow other variables.

Figure 14:
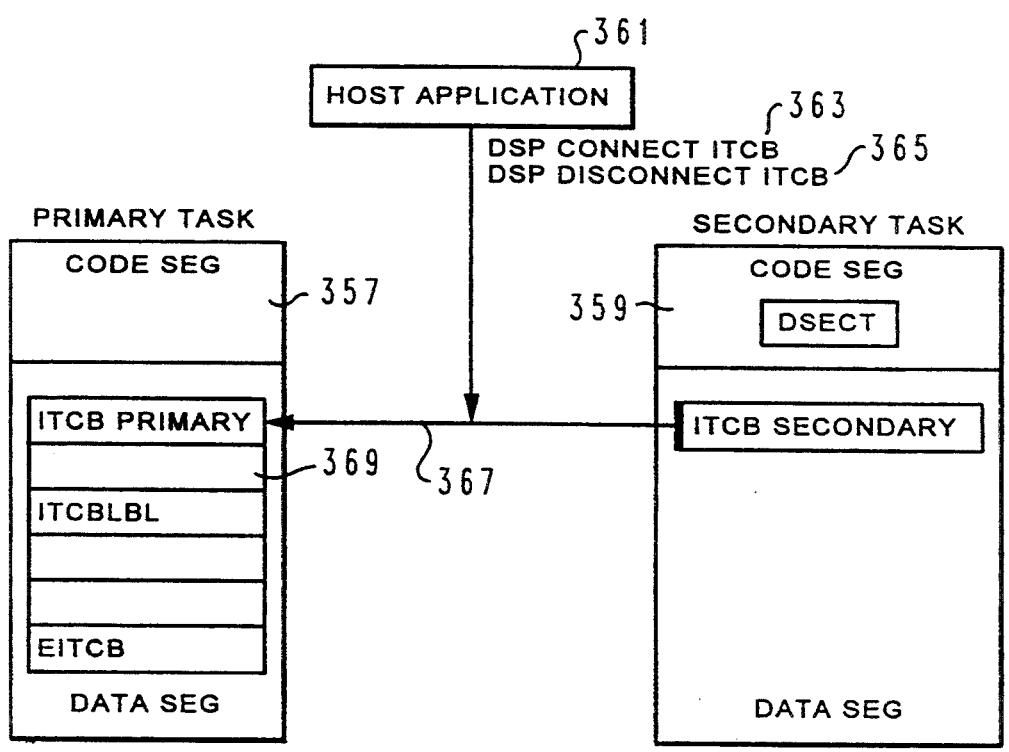
FIG. 14 is a block diagram representation of the operation of intertask control blocks.

As discussed above, the data communication modules work in cooperation with intertask control blocks (ITCBs), which have heretofore not been fully discussed. FIG. 14 is a block diagram representation of the operation of intertask control blocks. Each task, which is called for execution by the digital signal operating system, has its own local data section that is not visible to other tasks. The intertask control block is a mechanism that allows one task to share a block of data with another task. Tasks that communicate through an intertask control block (ITCB) are called the "primary tasks" and the "secondary tasks". In FIG. 14, primary task 357, secondary task 359, and their interconnection is illustrated. As shown, host application 361, resident in the host CPU, uses application program interface (API) commands, "connect ITCB" and "disconnect ITCB", to connect and disconnect pointer 367. This pointer points from the data segment of secondary task 359 to control block 369 in the data segment portion of primary task 359. Therefore, the control block 369, which passes status and control variables between selected modular multimedia software tasks, is located in the primary task's data section. Primary task 357 contains macros defining the structure of the data. Secondary tasks 359 contains a macro, which declares pointer 367 to the beginning of the control block 369.

As previously discussed, host application 361 connects secondary task 359 to primary task 357 with predefined digital signal processor commands. When the tasks are connected, DSP manager 71 from FIG. 3 stores a pointer to control block 369 in the data section of secondary task 359. Host application 361 can connect or disconnect secondary task 359 from primary task 357 at any time. When the tasks are connected, secondary task 359 can read or write data to control block 369 of primary task 357. Secondary task 359 typically loads an index register with pointer to the base of control block 369 and addresses data within control block as offsets from the base.

In summary, the general sequence required for creating and using an intertask control block is as follows:
(1) The intertask control block is coded in the primary task's data section using three macros, including: (1) ITCB PRIMARY; (2) ITCBLBL; and (3) EITCB, all of which will be discussed herebelow.
(2) The ITCB secondary is coded via a macro into the secondary task's data section. This macro allocates one word of memory for a pointer to the beginning of the ITCB data block in the primary task.
(3) At run time, the host system application connects the secondary task to the primary task by setting a call to the DSP manager. The DSP manager then loads the secondary task's pointer with the base address to the intertask control data block. Of course, the host application can connect or disconnect the secondary task at any time.
(4) After the tasks have been connected, the secondary task can read or write to the intertask control data block. The secondary task typically loads an index register with the pointer to the base of the data block and addresses data within the register as an offset from the base. The secondary pointer is set to zero when no connection exists.

The ITCB PRIMARY macro in the data section of the primary task identifies the beginning of the ITCB data block, while the EITCB macro identifies the end of the control data block. The ITCBLBL macro defines the properties of a single variable or a group of variables within a given ITCB control data block. The macro declares the following information:
the ITCB protocol which has been established for the variables, regarding read and write operations;
(2) the maximum delay allowed for passing a variable from one task to another; and
(3) a label or labels for the variable or variables.

Figure 19:
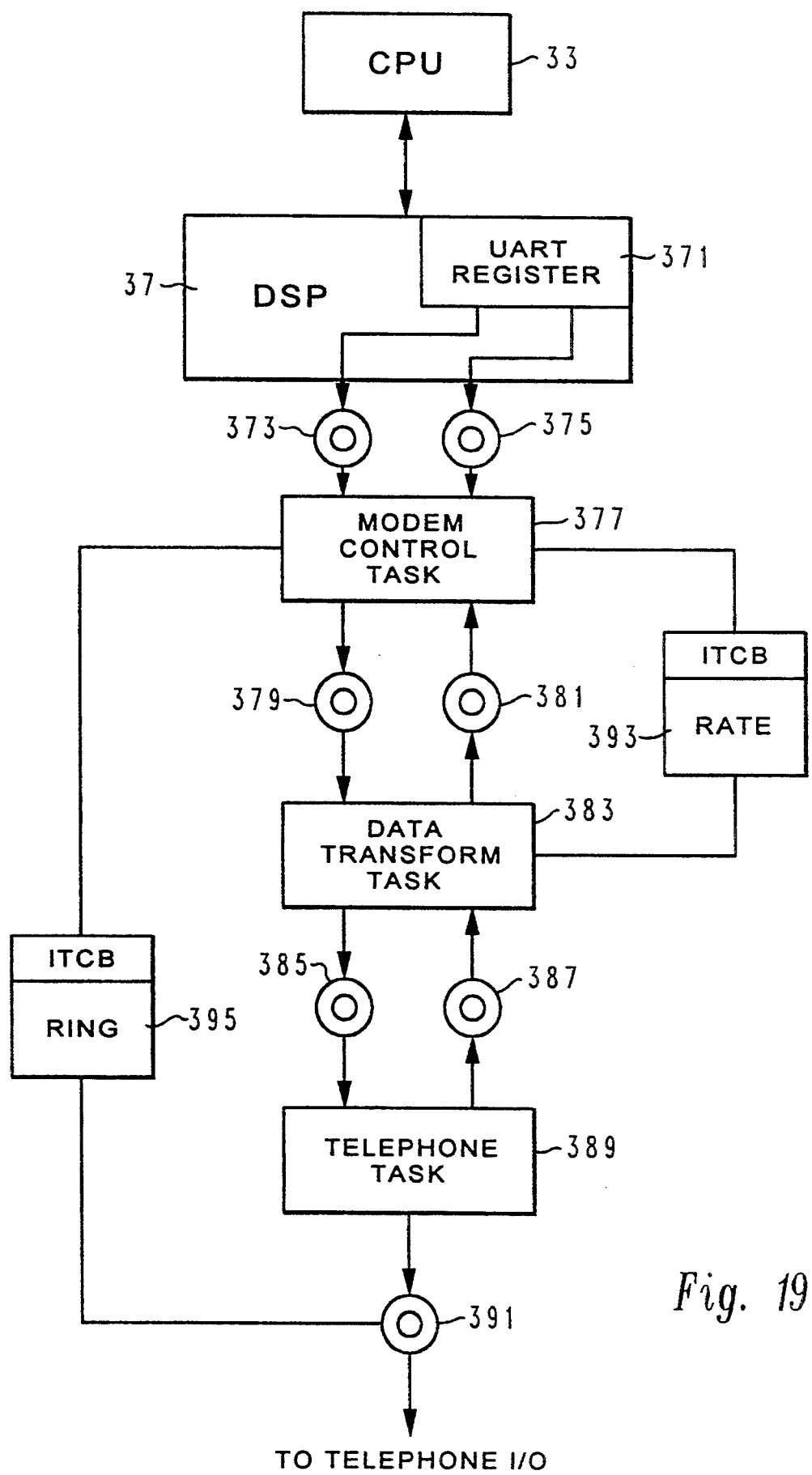
FIG. 19 is a block diagram representation of the operation of a plurality of modular multimedia software tasks, source of which virtualize the operation of conventional hardware multimedia end devices.
Figure 20:
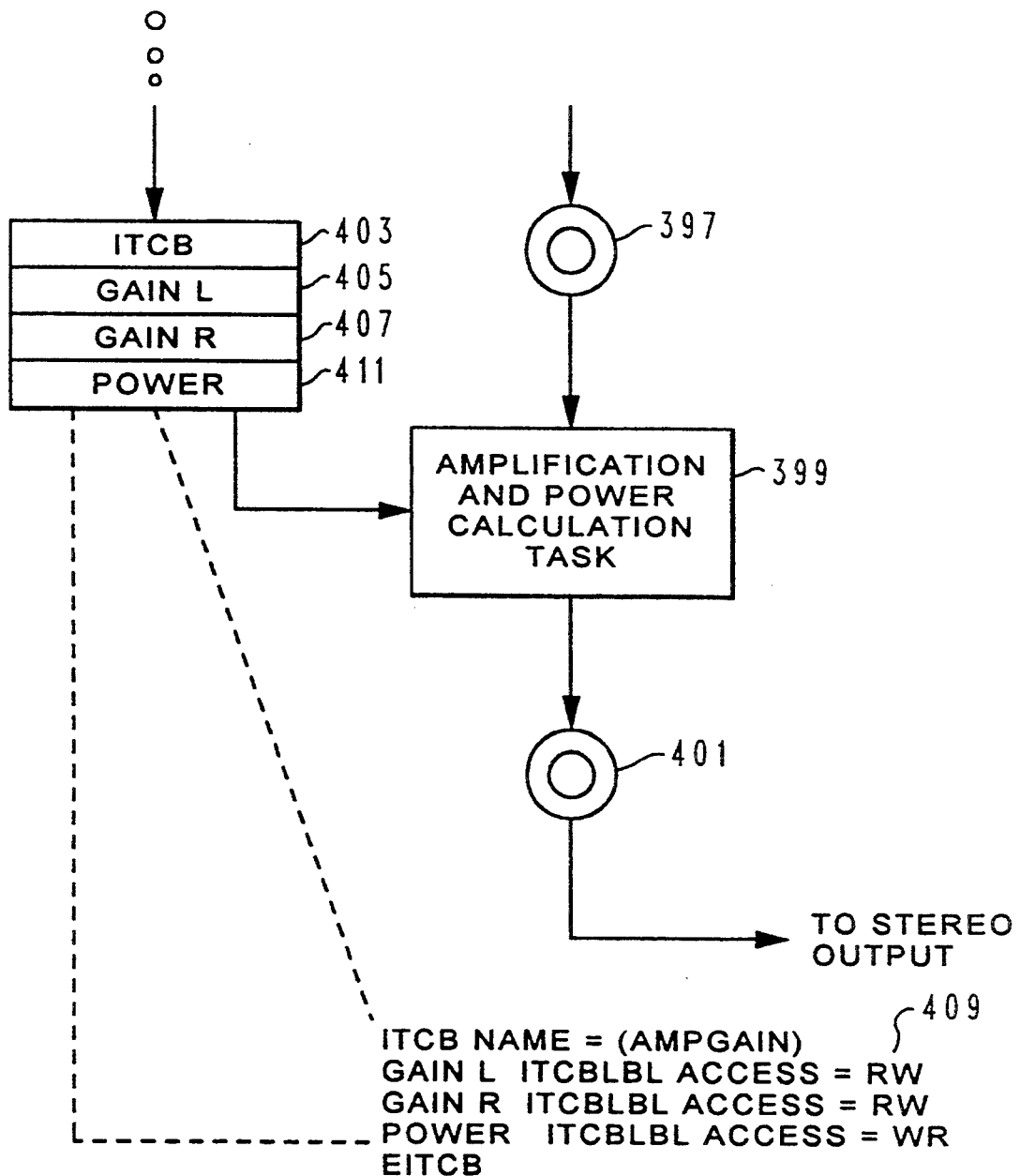
FIG. 20 is a block diagram representation of the operation of an audio output amplification task.
Figure 21:
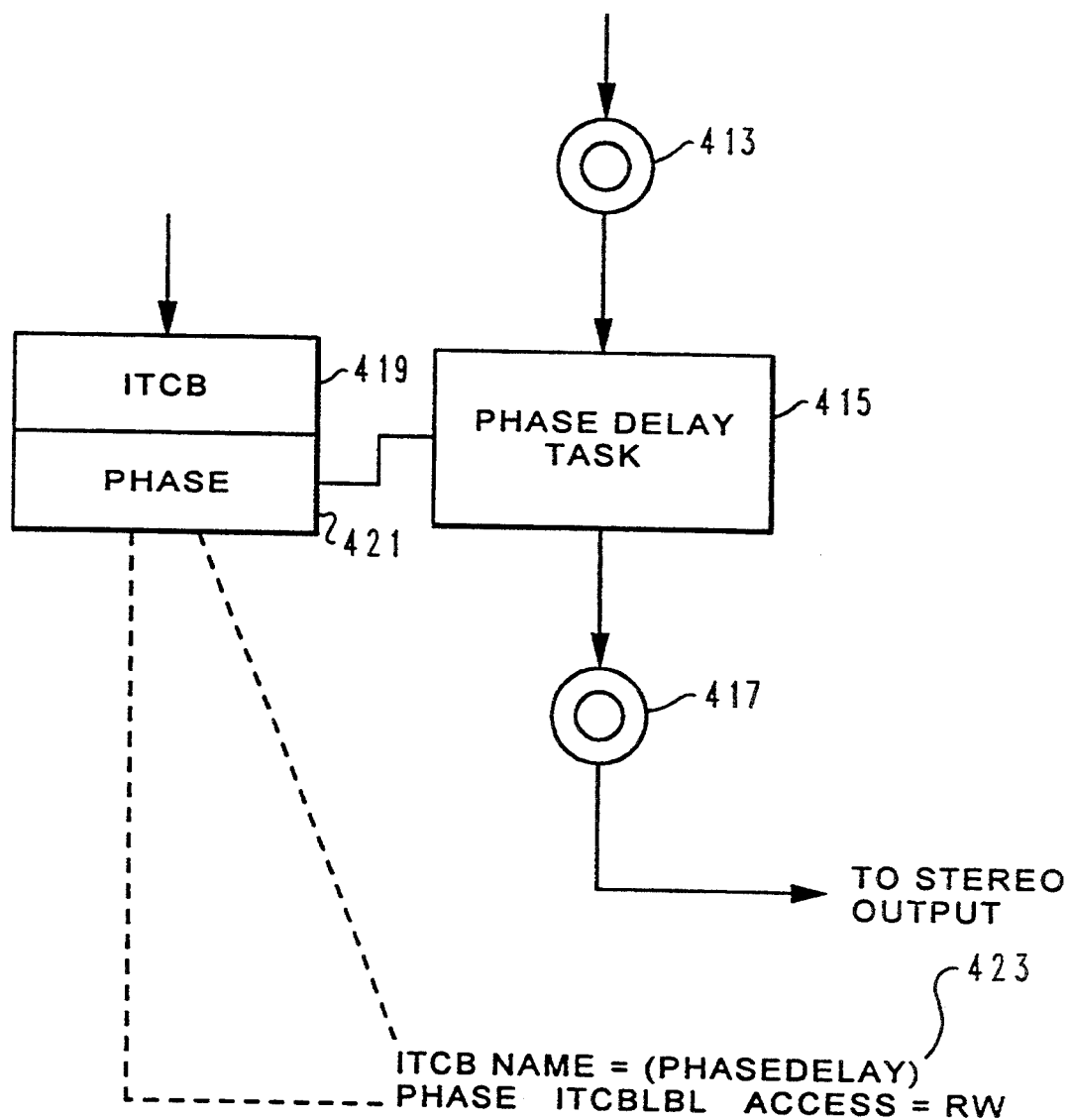
FIG. 21 is a block diagram representation of use of data communication modules and modular multimedia software tasks to control the phase difference between data streams.

The functions of the intertask control block, as well as the overall operation and advantages of the data communication modules, can best be understood with reference to the examples illustrated in FIGS. 19, 20, and 21. FIG. 19 is a block diagram of the operation of a plurality of modular multimedia software tasks, some of which virtualize the operation of conventional hardware multimedia end devices. FIG. 20 is a block diagram of the operation of an audio output amplification task. FIG. 21 is a block diagram of the use of data communication modules and modular multimedia software tasks to control and manipulate phase differences in data streams.

With reference first to FIG. 19, there is depicted the operation of the multimedia data processing system of the present invention configured to perform the functions of a modem operating in full duplex mode. CPU 33 directs data to, and receives data from, digital signal processor 37. In particular, data is passed through universal asynchronous receiver transmitter (UART) register 371. Streamed data is directed from digital signal processor 37 through data communication module 373. This data communication module allows for continuous, real-time, and unidirectional communication of data to modem control task 377. Data communication module 375 serves to direct continuous, real-time, and unidirectional data from modem control task 377 to digital signal processor 37. Data communication module 379 serves to direct streamed data from modem control task 377 to data transform task 383. Data communication module 381 serves to direct data from data transform task 383 to modem control task 377. Data communication module 385 serves to direct data from data transform task 383 to telephone task 389. Data communication module 387 serves to direct data from telephone task 389 to data transform task 383. Data communication task 389 communicates through data communication module 391 to a telephone input/output line. As shown, the data communication modules provide two data flow paths corresponding to data flow paths in a modem operating in full duplex mode.

Modem control task 377 represents a software state machine that is sensitive to a variety of variables, including a RING signal which may be received at data communication module 391 from the telephone input and output. Intertask communication block 395 links modem control task 377 to data communication block 391, and allows for the passage of a RING variable from data communication block 391 to modem control task 377 to alert modem control task 377 that a RING has been received on the telephone input/output line.

Data transform task 383 operates to receive digital data streams from modem control task 377 and produce an output stream which is representative of a digitized analog signal corresponding to the digital data stream. Intertask control block 393 is coupled between data transform task 383 and modem control task 377, and serves to communicate a RATE variable between those tasks. The RATE variable identifies the rate at which data should be output in digitized analog form from data transform task 383.

In accordance with the example of FIG. 19, the status indicator RING and the control variable RATE are passed between these tasks and data communication modules to ensure the coordinated operation of the modular multimedia software tasks. As is shown in FIG. 19, the functions of a conventional telephone may be simulated in software by the modular multimedia software task telephone task 389. Likewise, modem control task 377 simulates the conventional hardware and software functions of conventional modems. It is thus apparent that the present invention is useful in "virtualizing" various conventional hardware end devices, thus providing the user with an enhanced flexibility over existing prior art systems. The user may code tasks to be performed by the CPU and the digital signal processor which would have been performed ordinarily by conventional multimedia end devices. Considerable savings can be obtained by "virtualizing" hardware devices by software routines which perform the conventional functions of the hardware devices. The end users are provided with enhanced control over the multimedia environment using this technique to virtualize a variety of multimedia end devices.

FIG. 20 provides an example of the Use of the ITCB protocols used to determine whether tasks can write to or read from a control variable. As depicted, data communication module 397 communicates streamed data into amplification and power calculation task 399. Data communication module 401 receives the output of amplification and power calculation task 399 and directs it to a stereo output. Intertask control block 403 communicates variables from another (undisclosed) task to amplification and power calculation task 399.

Intertask control block 403 includes two variables: left gain 405 and right gain 407 which are identified respectively as "GAIN L" and "GAIN R". The ITCBLBL macro is depicted as connected to ITCB 403 by phantom lines. This macro identifies the name of the intertask control block as "AMPGAIN". It also identifies the first variable as "GAIN L" and identifies the read/write nature of this variable as "RW". The ITCBLBL macro identifies the second variable as "GAIN R," and identifies the read/write protocol for access as being "RW". Furthermore, the ITCBLBL macro identifies a third variable as "POWER" which has a read/write access protocol of "WR".

The access protocol of "RW" for GAIN L and GAIN R identifies that the primary task (amplification and power calculation task 399) may read the GAIN L and GAIN R variables from the ITCB 403. This access protocol also identifies the secondary task (the undisclosed task) as capable of writing variables to the "GAIN L" and "GAIN R" variable locations. In this manner, the user may have multimedia software applications controlling tasks, which may write variables to "GAIN L" and "GAIN R" to modify the gain. These variables are employed by amplification and power calculation task 399, resulting in amplification of the data stream provided by data communication module 397. If, for example, GAIN L and GAIN R are set to two, the values of data received by amplification and power calculation task 399 is amplified by factor of two. The secondary task (that is, the undisclosed task) may write variables to the GAIN L and GAIN R variables, and thus may modify them to a higher or lower number to modify the gain of amplification and power calculation task 399.

As suggested by its title, amplification and power calculation task 399 will calculate the power output of the signal provided to data communication module 401. This power variable 411 may be communicated to the secondary task by writing it to the "POWER" variable, periodically. As the power value changes, the changes are reflected by modification of the "POWER" variable. As is shown by this example, the ITCBLBL macro determines a read/write access protocol, which determines which of the primary and secondary tasks may write to a variable and determines which of the primary and secondary tasks may read from a variable.

As shown in FIG. 21, the data communication modules and intertask control blocks of the present invention may be employed to alter the phase property of a stream of data. As illustrated, data communication module 413 directs streamed data to phase delay task 415, which introduces a predetermined and variable amount of phase delay. Phase delay task 415 produces a streamed data output, which is directed to data communication module 417 which in turn directly or indirectly provides the streamed data output to a stereo output. Intertask control block 419 couples phase delay task 415 to another (undisclosed) task. The "PHASE" variable 421 is defined by ITCB 419 and in particular by ITCBLBL macro 423, which names the ITCB 419 "PHASEDELAY" and which defines the access protocol as "RW". According to this protocol, the primary task may read the value of the "PHASE" variable 421 and the secondary task may write values to the "PHASE" variable 421. If the phase delay task 415 is the "PRIMARY" task, it may read the value of the "PHASE" variable 421, but may not write to it. In this manner, a user may construct a multimedia application that allows introduction or removal of a selected amount of phase delay to any particular data stream output from any modular multimedia software task or from any multimedia end device. This operation has the advantage of eliminating troublesome phase delays in a multimedia applications through the intelligent use of phase delay tasks. Thus, synchronization problems may be avoided altogether.

Figure 22:
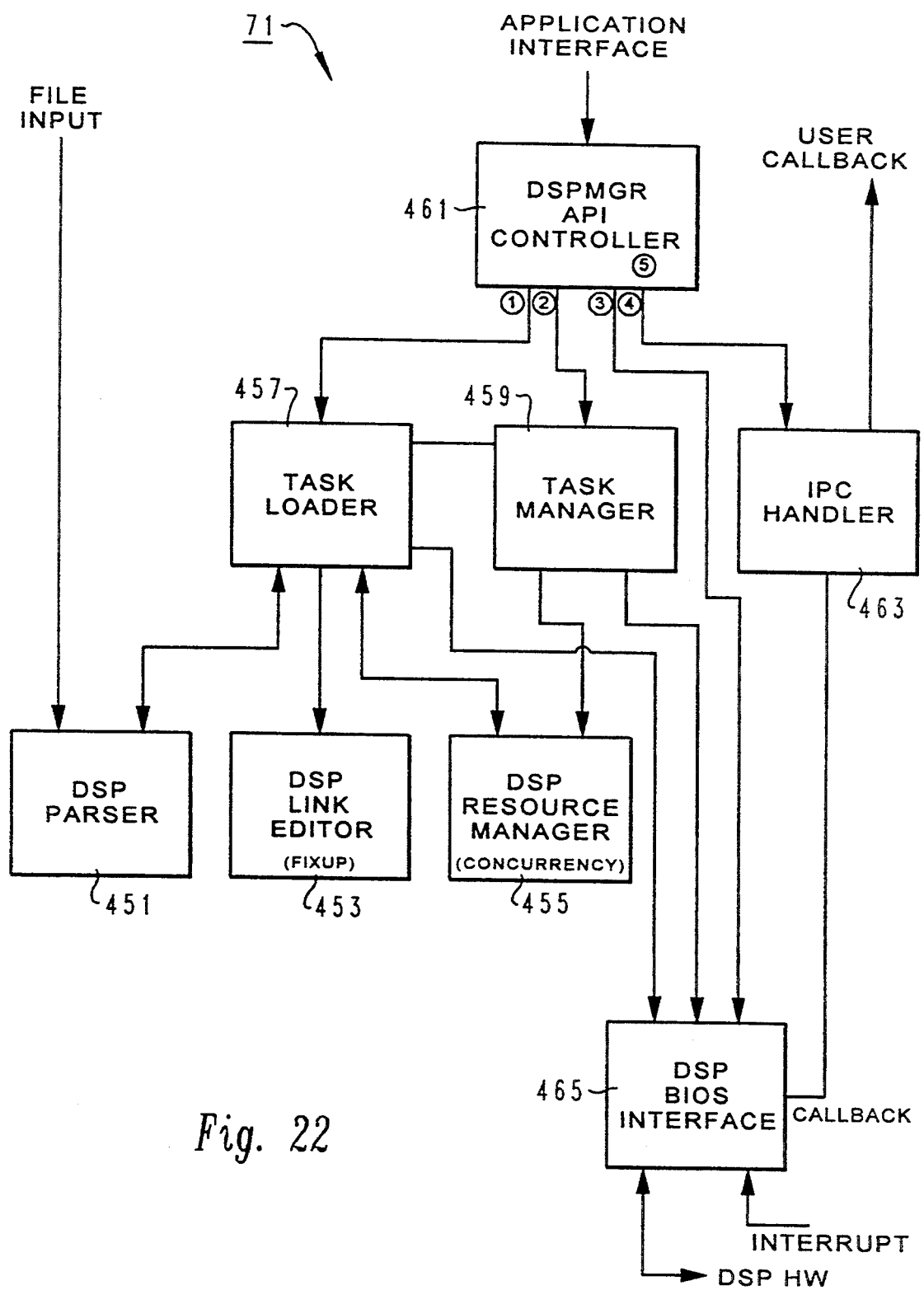
FIG. 22 is a block diagram representation of the digital signal processor manager program of FIG. 3.

As shown in FIG. 3, DSP manager 71 is resident in the host CPU, and operates to control the loading for execution of modular multimedia software tasks to digital signal processor 37 (of FIG. 2). As depicted in FIG. 22, DSP manager 71 is composed of a plurality of functional blocks that cooperate together to control the loading and execution of modular multimedia software tasks. The blocks, which cooperate together, include digital signal processor parser 451, digital signal processor link editor 453, digital signal processor resource manager 455, task loader 457, task manager 459, digital signal processor manager application program interface controller 461 (DSPMGR API controller), interrupt and processor call back handler 463, and digital signal processor BIOS interface 465. Each of these functional blocks is depicted in greater detail in FIGS. 23 through 30.

With reference to FIG. 22, digital signal processor manager API controller 461 receives application program interface (API) commands from multimedia applications 59 and routes the application program interface (API) commands to the appropriate functional locks. There are five broad categories of application program interface commands. Category No. 1 includes commands which are directed between digital signal processor manager API controller 461 and task loader 457. Category No. 2 of API commands include commands which are passed from digital signal processor manager API controller 461 to task manager 459. Category No. 3 of API commands are those which are passed from digital signal processor manager API controller 461 to the digital signal processor BIOS interface 465. Category No. 4 of API commands are those which are passed between digital signal processor manager API controller 461 and IPC handler 463. Category No. 5 of API commands include those which provide status and other information to DSP manager 71 and which are especially useful in housekeeping and debugging operations, but which are not especially important for a full understanding of the present invention.

Figure 30:
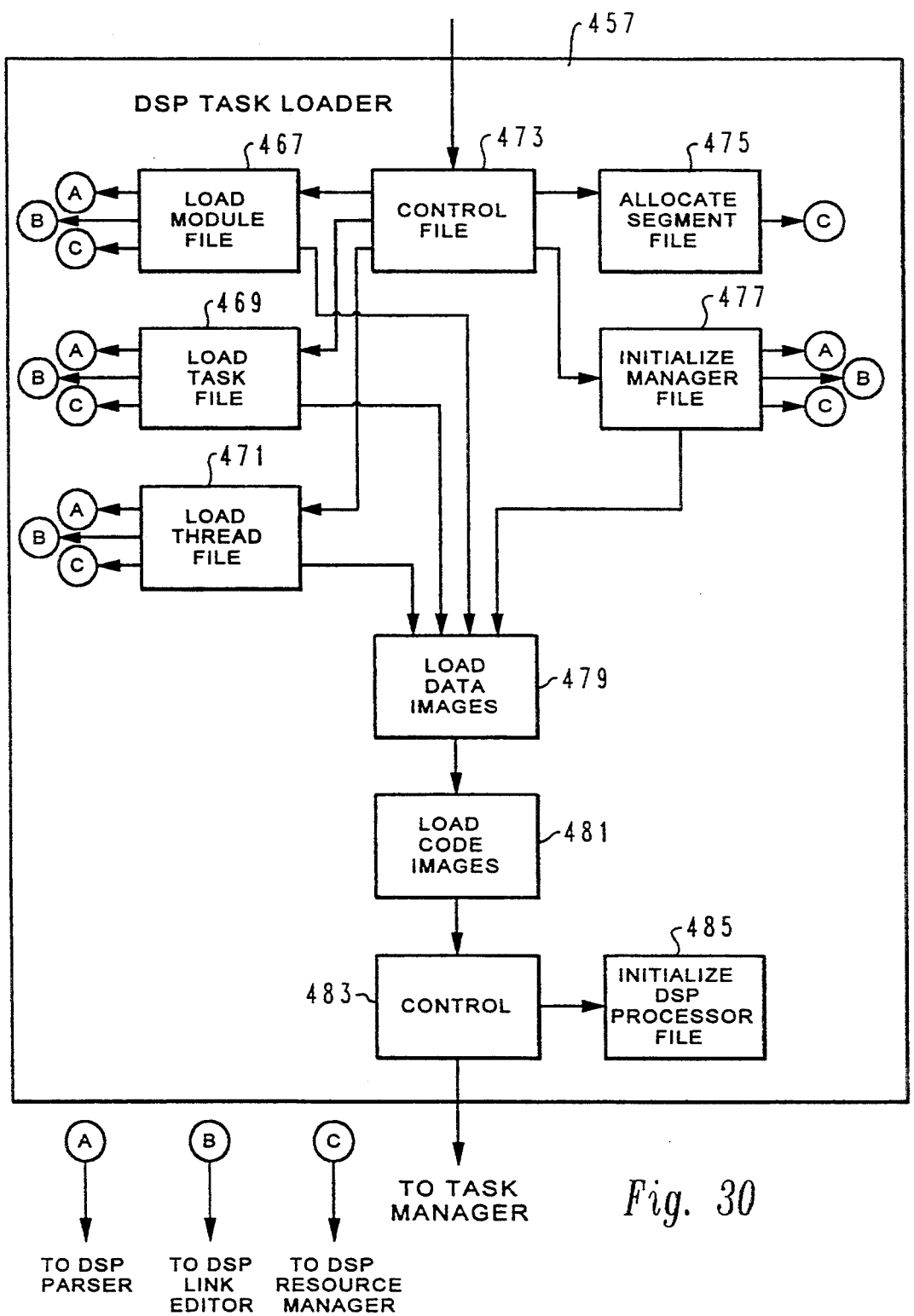
FIG. 30 is a detailed block diagram representation of the DSP task loader of FIG. 22.

FIG. 30D identifies the five broad categories of API commands which allow DSP manager program 71 resident in the host CPU to coordinate and control the operation of digital signal processor 37. With reference now to FIG. 30D, Category No. 1 commands include: dsp allocate seg; dsp initiation, dsp load module; dsp load task; and dsp load thread. The dsp allocate segment is a command which instructs the digital signal processor to set aside memory for a particular task. The dsp initiation command initializes the digital signal processor by clearing registers, resetting the processor, and loading the operating system. The dsp load module command loads a module of selected tasks (see FIG. 4). The dsp load task command instructs the digital signal processor to load the data segments and instruction segments which make up a single task. The dsp load thread command instructs the digital signal processor to load a single thread (that is, a small block of instructions and/or data) for execution. As is shown in FIG. 22, the Category No. 1 commands are passed from digital signal processor manager API controller 461 to the task loader 457, which is depicted in greater detail in block diagram form in FIG. 30.

As is shown in FIG. 30, DSP task loader 457 includes control file 473, which receives the APIs and calls a variety of other files as needed. Load module file 467 performs the task of loading a module of tasks to the digital signal processor. The load task file 469 loads a particular task to the digital signal processor for execution. The load thread file 171 loads a particular thread to the digital signal processor for execution.

The allocate segment file 475 allocates a particular portion of memory for receipt of a particular task. The initialize manager file 477 selectively initializes the digital signal processor. The load module file 467, load task file 469, and load thread file 471 communicate and cooperate with dsp parser 451, DSP link editor 453, and DSP resource manager, all of which will be discussed here below. The load data images block 479, load code images block 481, and control block 483 cooperate together to provide task manager 459 (of FIG. 28) with data, instructions, and control parameters which is to be passed through the DSP BIOS interface 465 for loading to the digital signal processor.

As is shown in FIG. 30D, the Category No. 2 commands include eleven different commands. All of these commands are communicated from digital signal processor manager API controller 461 to task manager 459. The dsp change CPF command allows a change in the number of cycles per second of the digital signal processors allocated to a particular task. The dsp change DMA command allows for change in the amount of memory resource allocated for direct memory access operations. The DSP change module state command allows for a change in state of a modular grouping of a plurality of multimedia software tasks. The available states include "active", "standby", and "inactive". An "active" task is a task that is to be executed by the digital signal processor immediately upon loading. A "standby" task is a task that is queued and waiting for execution sometime after loading to the digital signal processor. An "inactive" task is a task that is neither on "standby" nor in an "active" state. The dsp change task command allows for the change in state of a single multimedia software task between the "active", "standby", and "inactive" states.

The dsp connect DCM command allows for the connection of a particular data communication module to a particular task and/or multimedia end device. The dsp connect ITCB command allows for the connection of an intertask control block between primary and secondary tasks. The dsp disconnect DCM command and the dsp disconnect ITCB command allow for the disconnection of data communication modules and intertask control blocks, respectively. The dsp free module, dsp free task, and dsp free thread commands stop the execution of a module of tasks, a single task, and a single thread, respectively, and disconnect them from data communication modules, intertask control blocks, and direct memory access connections which have been previously established for them.

Figure 28:
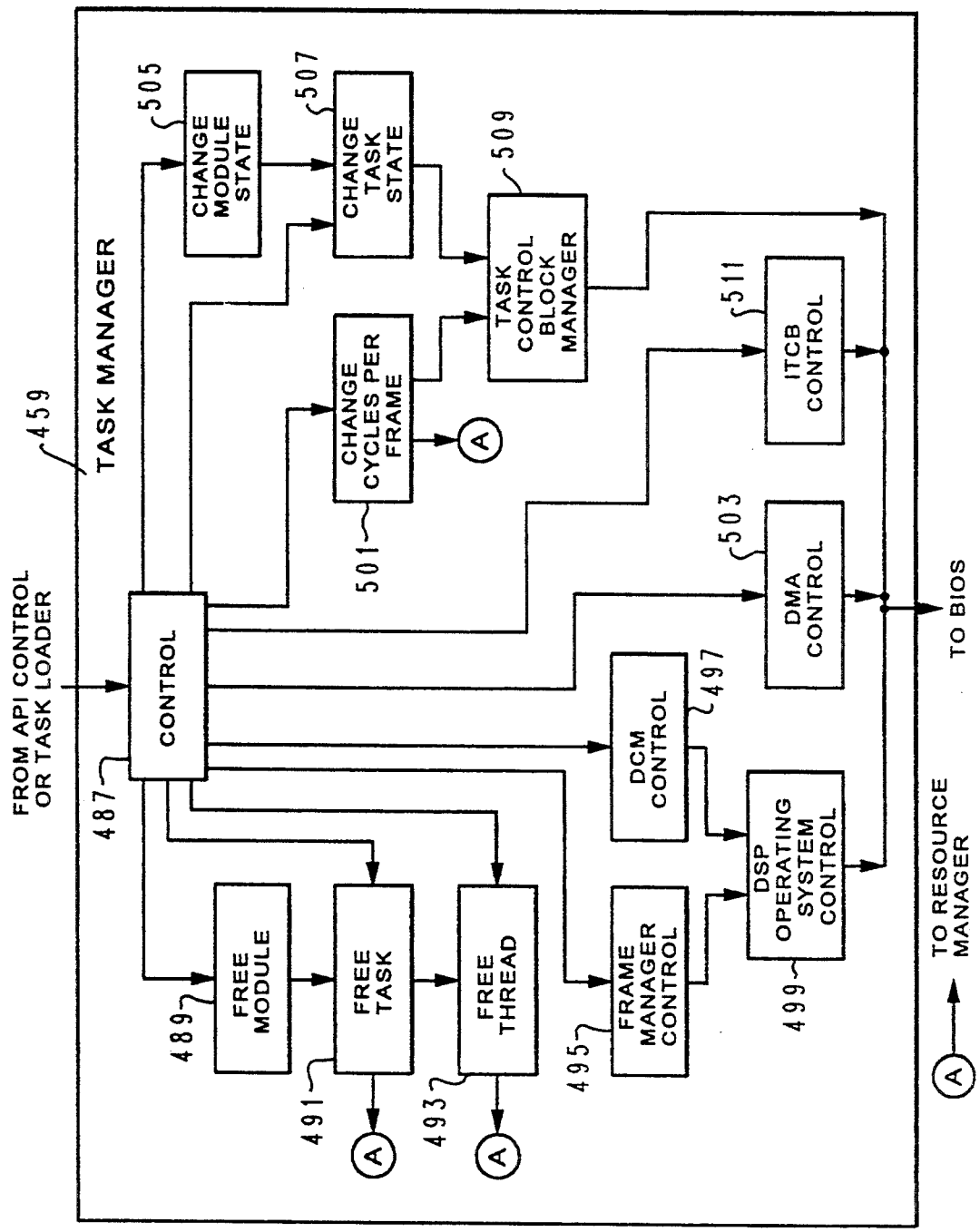
FIG. 28 is a detailed block diagram representation of the task manager of FIG. 22.

As is shown in FIG. 22, the dsp manager API controller 461 communicates Category No. 2 commands to task manager 459, which is depicted in greater detail in block diagram form in FIG. 28. With reference now to FIG. 28, control block 487 receives API commands from digital signal processor manager API controller 461 and routes them to appropriate modules and files for performing particular tasks which relate to the management of tasks in the digital signal processor. As shown, commands requiring the freeing of a module, task or thread are routed to the appropriate file of: free module file 489, free task file 491, and free thread file 493. Likewise, API commands which require the changing in state of modules and tasks are routed to the appropriate ones of the change module state file 505 and change task state file 507. Commands which require the change in cycles per frame are passed to the change cycles per frame file 501. API commands which require the connection or disconnection of data communication modules, direct memory access, or intertask control blocks are routed to the appropriate one of DCM control file 497, DMA control file 503, and ITCB control file 511. The API command which calls for a change in the cycle's per frame is routed to the frame manager control file 495. Note that the data communication module control file 497 and the frame manager control file 495 are routed through the digital signal processor operator control file 499 before passing through the digital signal processor BIOS.

As is shown in FIG. 30D, Category No. 3 of API commands includes three commands. The dsp Memtransfer command determines whether data instructions can be written to or read from data memory 43 and instruction memory 41 (both of FIG. 2). The dsp Reset command stops the digital signal processor and resets the location counter to zero. The dsp Run command starts the processor running. As shown in FIG. 22, these commands are communicated between the dsp manager API controller 461 and the digital signal processor BIOS interface 465, which is shown in greater detail in block diagram form in FIG. 26.

Figure 26:
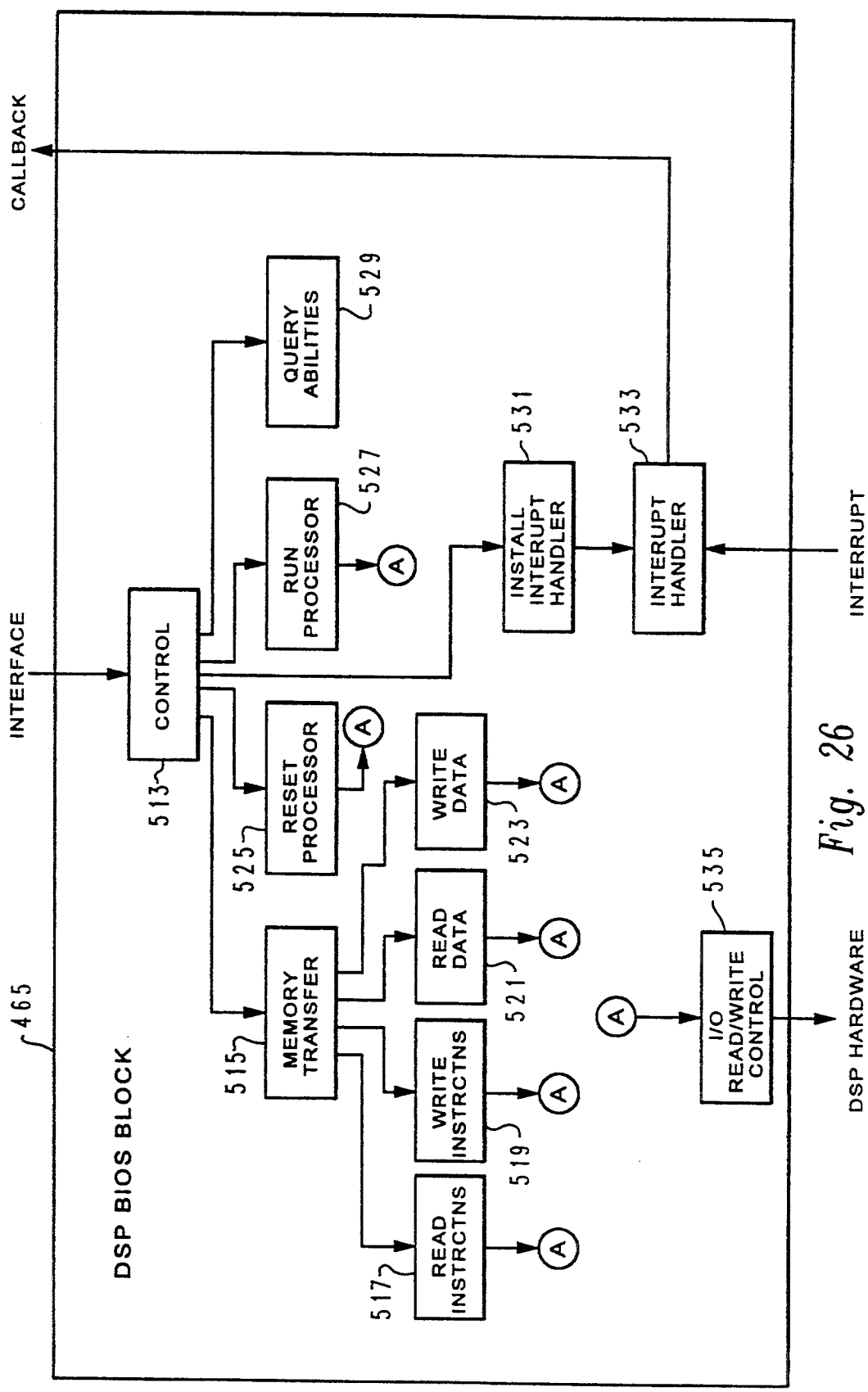
FIG. 26 is a detailed block diagram representation of the DSP BIOS block of FIG. 22.

With reference now to FIG. 26, DSP BIOS interface 465 is shown to include a number of blocks or files, which cooperate together to perform the task required by the API commands. All API commands are received by control block 513. Those API commands pertaining to memory transfer are directed to memory transfer block 515. Operations, which require the reading of instructions, are routed to read instructions file 517. Operations which require the writing of instructions are routed to write instructions file 519. Operations, which require the reading of data, are directed to read data file 521. Operations, which require the writing of data, are directed to write data file 523. All read and write functions are performed through input/output read/write control block 535. API instructions, which require that the processor be reset, are directed to reset processor file 525. API instructions which require that the process begin running are routed to run processor file 527. As depicted in FIG. 26, a Category No. 5 type command, which queries about the capabilities of the digital signal processor, may be routed through DSP files 465 to the query abilities 529 to determine the configuration and capabilities of the digital signal processor. In FIG. 26, DSP BIOS interface 465 may receive interrupts through interrupt handler file 533, which is established by the install interrupt handler file 531. The interrupt handler file 533 generates a callback which is routed to IPC handler 463, which is depicted in FIG. 22 and which is depicted in greater detail in block diagram form in FIG. 24.

Figure 24:
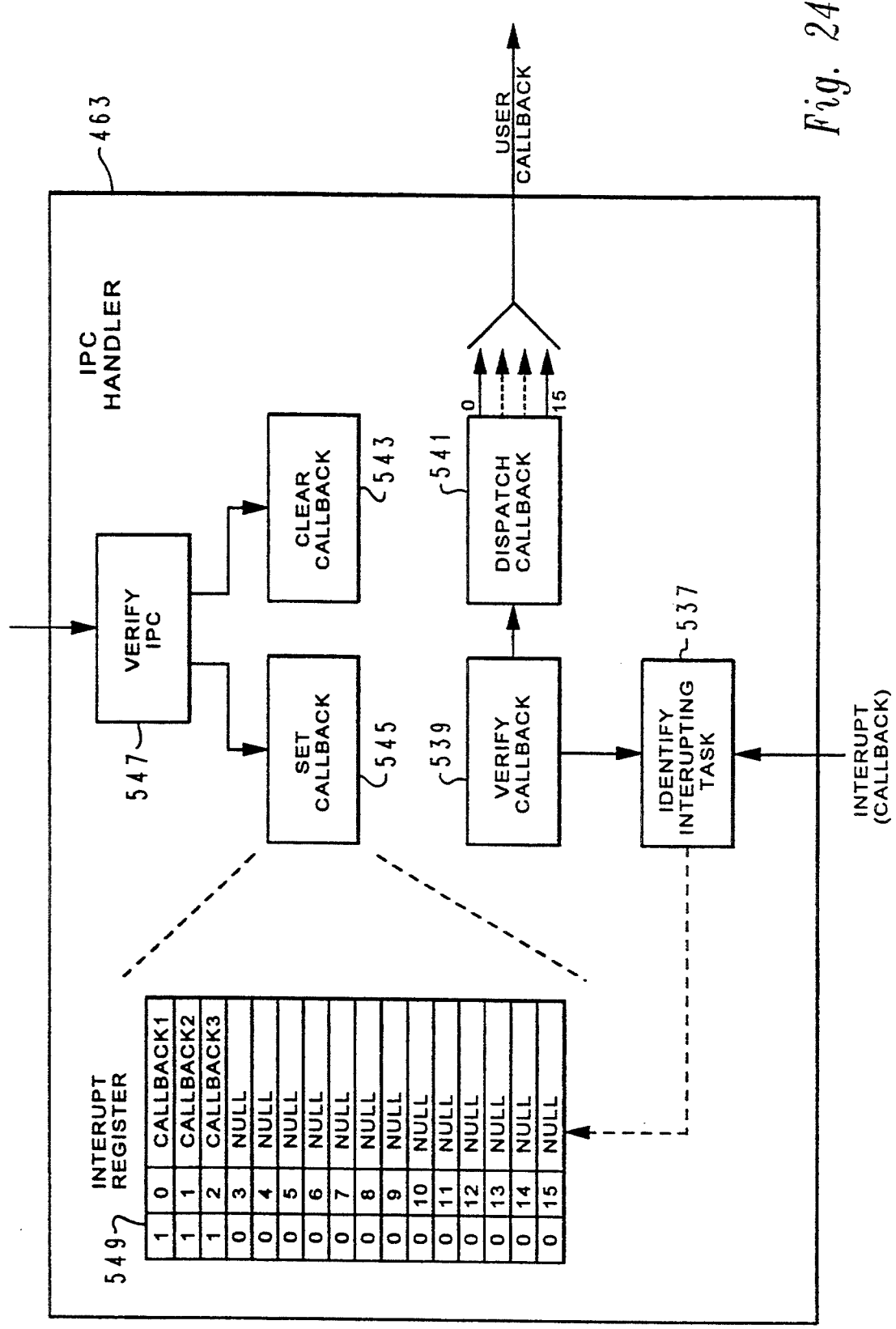
FIG. 24 is a detailed block diagram representation of the IPC handler of FIG. 22.

With reference now to FIG. 24, IPC handler 463 depicts the functional blocks and files which cooperate to perform the tasks of the IPC handler 463. Identify interrupting task block 537 actually receives the interrupt and accesses an interrupt register 549 to determine the particular user callback which is identified to the particular interrupt. As shown in interrupt register 549, the interrupt register comprises a sixteen bit word, with each bit representing a particular required callback. One or more interrupts may be simultaneously active, requiring the generation of a user callback for each one. The DSP manager cycles through the sixteen bit word one bit at a time and addresses each interrupt and corresponding user callback, individually. Verify callback file 539 communicates with both the identify interrupting task file 537 and the dispatch callback file 541. Dispatch callback file 541 actually generates the user callback signals. Verify IPC file 547 receives two types of API commands, including: dsp connect IPC, and dsp disconnect IPC. The dsp connect IPC command connects to the IPC handler 463, while the dsp disconnect IPC command disconnects the IPC handler 463. The verify IPC file 547 communicates with set callback file 545 and clear callback file 543. Set callback file 545 is used to establish a particular callback for a particular interrupt. Clear callback file 543 voids the previous arrangement of interrupts and callbacks and allows for reconfiguration of the interrupt and callback protocol.

Figure 23:
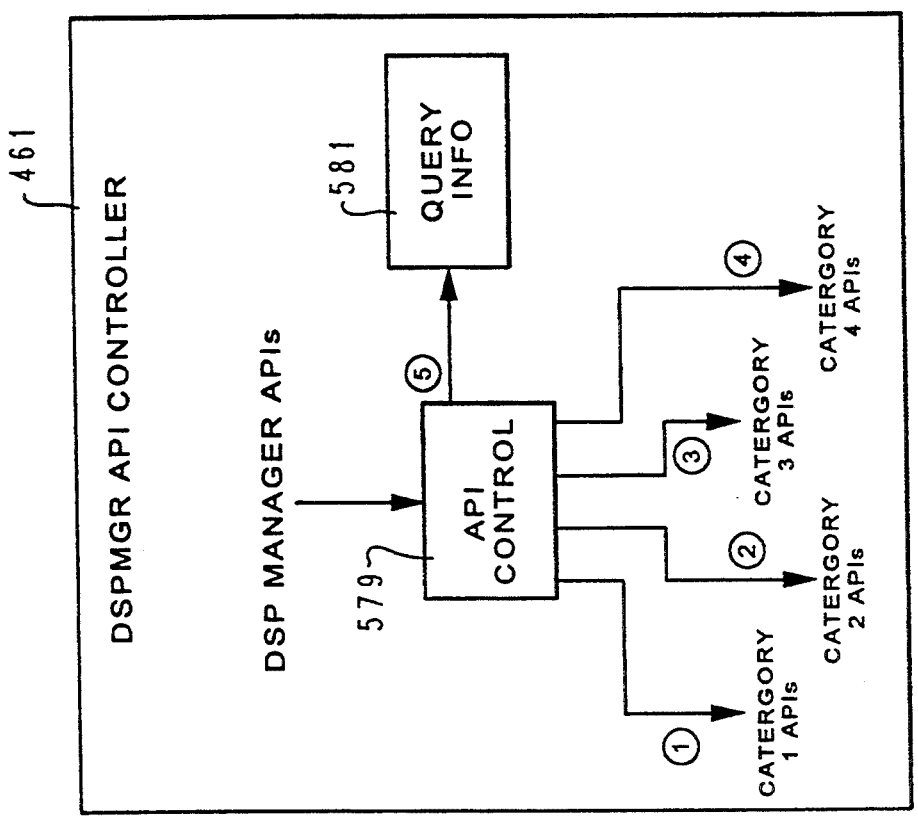
FIG. 23 is a detailed block diagram representation of the Digital Signal Processor Manager API control of FIG. 22.

FIG. 23 is a detailed block diagram representation of digital signal processor manager API controller 461. As illustrated, API control block 579 receives API commands from the digital signal process manager, and routes them to the appropriate task blocks. Category No. 5 commands are directed by API control block 579 to query info block 583. With reference now to FIG. 30D, the Category No. 5 commands include a number of commands, which can be considered "housekeeping" commands. The dsp abilities command determines what resources are available at the time the command is made. The dsp label to address command is a call made by the driver to the DSP manager to allow the set up of a memory transfer. The dsp name to module handle command, the dsp name to task handle command, and the dsp name to thread handle command facilitate communication between drivers 63, 65, 67, and 69 of FIG. 3 and DSP manager 71 of FIG. 3 at the module, task, and thread level, and are conventional. The dsp query command, dsp info command, the dsp query manager info command, the dsp query module info command, and the dsp miscellaneous info command are used to transfer information pertaining to the digital signal processor, the DSP manager, and selected modules. These queries are predominantly useful in troubleshooting and housekeeping operations.

DSP manager 71 of FIG. 22 allows for the dynamic, real-time, and continuous management of digital signal processor resources, and as a consequence, allows for the dynamic and temporally overlapping loading and freeing of modular multimedia software tasks. In the prior art, it was not possible to load or free particular multimedia software tasks while other multimedia software tasks were being performed, as provided for in this invention.

Figure 29:
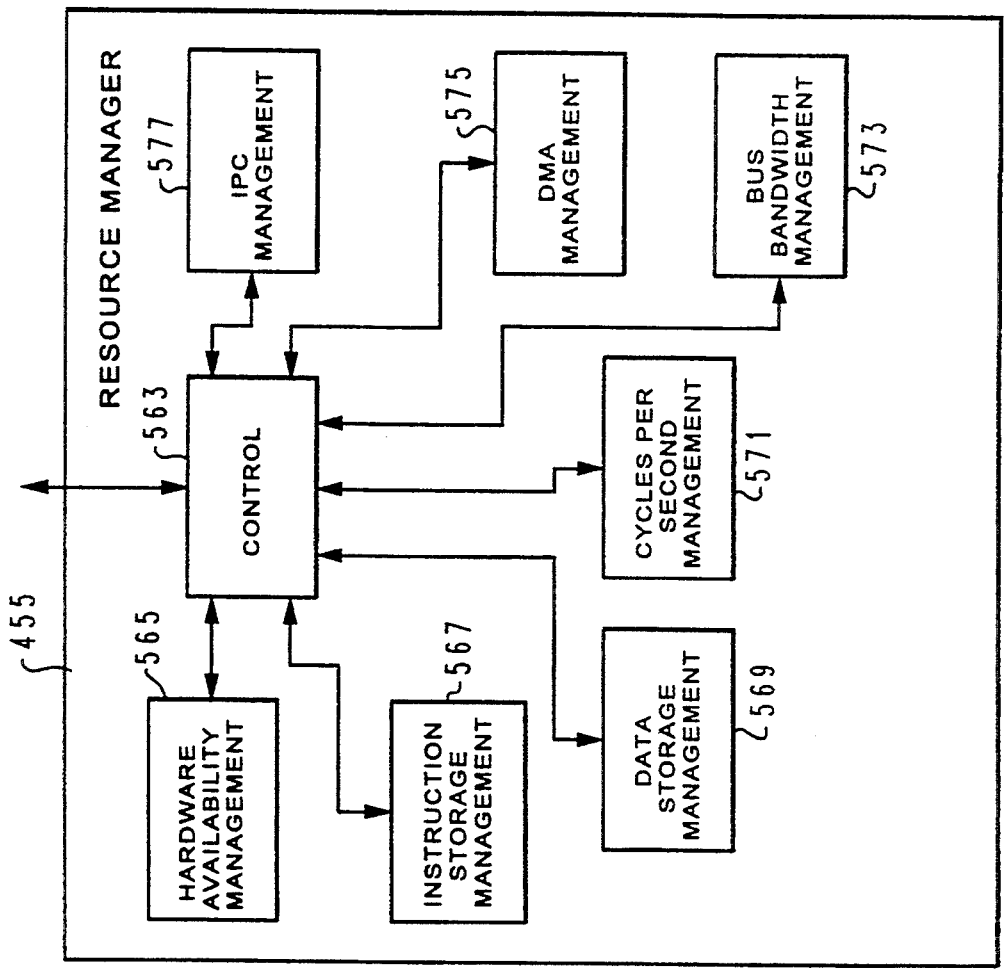
FIG. 29 is a detailed block diagram representation of the resource manager of FIG. 22.
Figure 27:
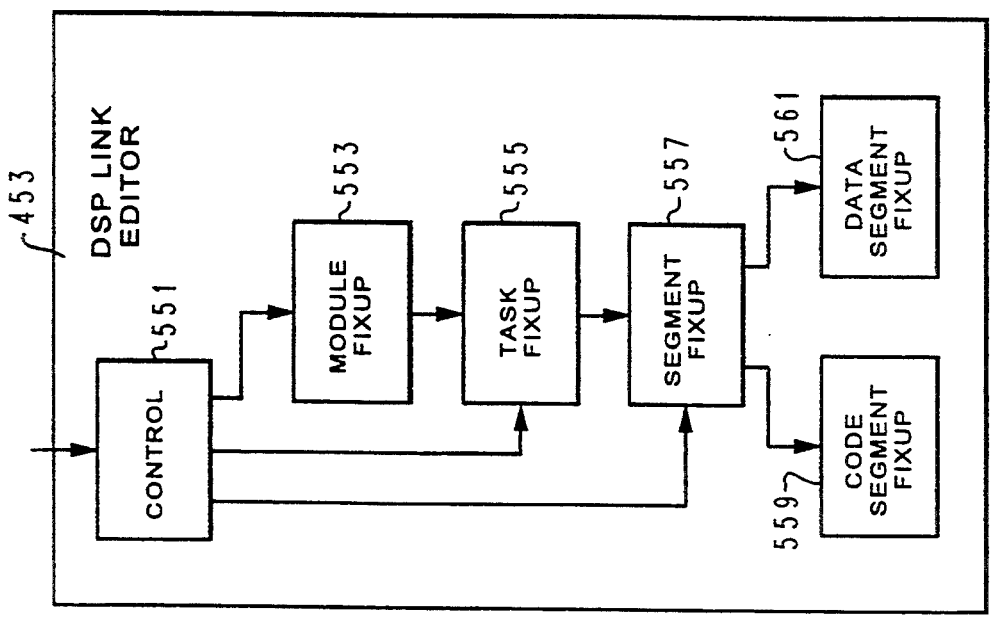
FIG. 27 is a detailed block diagram representation of the DSP Link Editor of FIG. 22.

As shown in FIG. 29, DSP resource manager 455 includes a plurality of software files, which independently manage digital signal processing resources. Hardware availability management file 565 manages the availability of multimedia end devices, and other peripheral devices. Instruction storage management file 567 independently manages the storage of instructions in instruction memory 41 of FIG. 2. Data storage management file 569 independently manages the storage of data in data memory 43 of FIG. 2. Instruction storage management file 567 and data storage management file 569 know at all times the amount of memory in instruction memory 41 and data memory 43, which has been claimed by the multimedia software tasks, and what amount of instruction memory and data memory is available for receipt of data and instructions when additional modular multimedia software tasks are loaded to the digital signal processor. Cycles per second management file 571 continually monitors the consumed and available cycles per second of the digital signal processor. It knows at all times the number of cycles per second which are being consumed by the task or tasks being executed by the digital signal processor, as well as the available cycles per second. No modular multimedia software task may be loaded to the digital signal processor for execution unless sufficient cycles per second are available.

Next, direct memory access management file 575 manages the digital signal processor resources, which are dedicated to direct memory access operations. In particular, direct memory access management file 575 determines the amount of instruction memory 41 and data memory 43 which has been dedicated to direct memory access operations. No other direct memory access task is allowed unless sufficient resources are available. The IPC management file 577 continually monitors the allocation of the available interrupts. Modular multimedia tasks requiring interrupts, which are not available, will not be loaded to the digital signal processor. Finally, bus bandwidth management file 573 determines the level of activity of the main data communication and instruction communication buses and determines whether a particular task will require excessive use of the buses.

Figure 25:
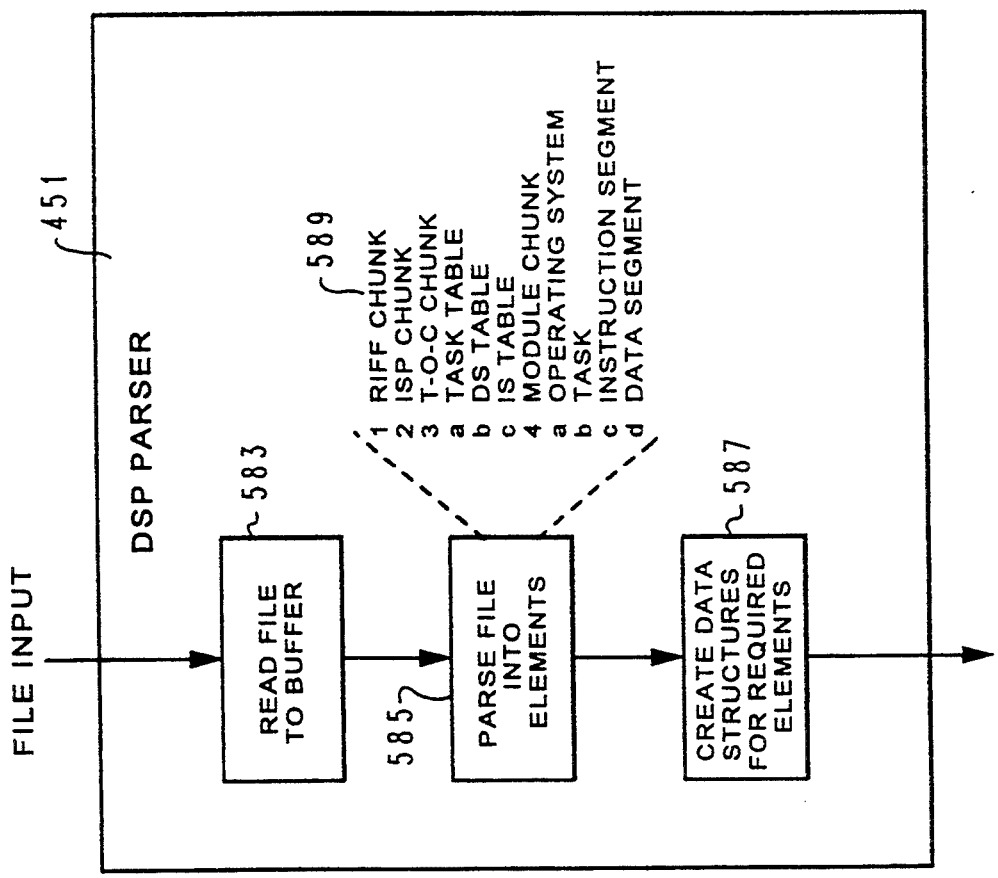
FIG. 25 is a detailed block diagram representation of the DSP parser of FIG. 22.

The important advantages provided by the digital signal processing management program are that (1) the system allows modular multimedia software tasks to be commenced and terminated without interruption of other modular multimedia tasks which are being executed by the digital signal processor (2) without requiring that the modular multimedia tasks be especially adapted for concurrent execution by the digital signal processor. This result is accomplished by using DSP manager 71 to dynamically determine the capacity of digital signal processor for accepting and performing tasks which may be loaded to it. This process can best be understood with simultaneous reference to FIG. 22 and FIG. 31. The process begins at block 591. An API load command is provided IN BLOCK 593 by the multimedia application to the DSP manager 71 requesting loading of a module, which is composed of a plurality of modular multimedia software tasks, a single modular multimedia software task, or a single thread of execution, to the digital signal processor for execution by the digital signal processor. In block 595, the task or module, which is requested to be loaded to the digital signal processor, is received at the dsp parser 451 and parsed, as shown in FIG. 25. In accordance with FIG. 25, the file is read into read file buffer 583 and parsed by block 585 into a variety of conventional "chunks" and/or "tables". In block 587 in FIG. 25, DSP parser 451 creates data structures which are required for the parsed elements.

Referring again to FIG. 31, in block 597, the parsed task or module, which is requested to be loaded to the digital signal processor, is examined by task loader 457 to determine its "requirements". Requirements are defined to be the amount of instruction memory and data memory required by the task or module, the amount of cycles per second which will be consumed by the task or module upon execution, the number of connections (through data communication modules) which write to or read from the task or module, and the number (if any) of interrupts required during the execution of the task or module.

In block 599, DSP resource manager 455, shown in FIG. 29, is consulted to determine if loading of the task or module is possible. As is graphically depicted in FIG. 29, resource manager 455 includes separate files independently monitor hardware availability, instruction memory availability, data memory availability, cycles-per-second availability, bus bandwidth availability, interrupt vector availability, and direct memory access resource availability. Hardware availability management file 565 continuously monitors the availability of the multimedia end devices and provides an indication of whether these multimedia end devices are being used by other modular multimedia software tasks being executed by the digital signal processor. Instruction storage management file 567 continuously monitors the amount of instruction memory being used by the modular multimedia software tasks, which are being executed by the digital signal processor, and also continuously determines the total amount of instruction memory available for modular multimedia software tasks, which may be called for loading to the digital signal processor.

Next, data storage management file 569 continuously monitors the data memory to determine the total amount of data memory that is being currently used by the modular multimedia software tasks which are being executed by the digital signal processor. Data storage management file 569 also continuously monitors the total amount of data memory available for files, which may be called for loading to the digital signal processor for execution. The cycles per second management file 571 continually monitors the cycles per second of the digital signal processor that are being consumed by the modular multimedia tasks which are being executed by the digital signal processor. Cycles per second management file 571 continually provides an indication of the total available cycles per second that may be used for other modular multimedia software tasks, which may be loaded to the digital signal processor for execution. Bus bandwidth management file 573 continually monitors the availability of data buses in the digital signal processor and provides a current indication of the bus capacity of the digital signal processor allowing a determination of whether additional modular multimedia tasks may be loaded to the digital signal processor for execution. IPB management file 577 continually monitors the allocation and availability of interrupt vectors.

As is graphically depicted in FIG. 24, the preferred digital signal processor includes a dedicated interrupt register, which allows for sixteen different interrupt vectors to be employed by the various modular multimedia tasks being executed by the digital signal processor. If sixteen modular multimedia software tasks are concurrently being executed by the digital signal processor, each of which requires an interrupt vector, no additional modular multimedia software tasks may be loaded to the digital signal processor that require the use of an interrupt vector. Of course, additional modular multimedia software tasks may be loaded to the digital signal processor for execution, provided that these tasks do not require the use of an interrupt vector.

Referring again to FIGS. 31 and 22, resource manager 455 is consulted to determine if loading of the task or module is possible, in view of the current resource allocation and availability in terms of hardware availability, instruction memory availability, data memory availability, cycles per second availability, bus bandwidth availability, direct memory access availability, and interrupt vector availability. If a particular modular multimedia software task is called by the multimedia application software for loading to the digital signal processor, it must not exceed the available resources or the digital signal processor. For example, if the multimedia end devices, which are operated by a particular modular multimedia software task, are available and sufficient instruction and data memory space is available, but sufficient digital signal processing cycles per second are not available, the task will not be loaded to the digital signal processor.

For an alternative example, if a particular modular multimedia software task is requested to be loaded to the digital signal processor, but all sixteen interrupt vectors are currently being used by other modular multimedia software tasks, which are being executed by the digital signal processor, the loading operation is not allowed. If loading is determined to be allowed, the task or module is sent to DSP link editor 453 in block 601 for "fix-up" operation which at module fix-up block 553, task fix-up block 555 and segment (or thread) fix up block 557 to allow writing to the data and instruction memory by blocks 559 and 561. In block 603, the task or module is loaded to the DSP instruction memory and data memory.

In this manner, a single digital signal processor may be loaded with a variety of modular multimedia software tasks, with regard only to the availability of digital signal processor resources. As a consequence of this feature, the modular multimedia software task need not be configured, modified, or otherwise arranged to account for the presence or execution of other modular multimedia software tasks. This provides an open architecture allowing end users to write completely independent multimedia applications which can be simultaneously loaded and executed by a single digital signal processor. This open architecture and modularity in design also allows for multiple digital signal processors to be "networked" together to share the execution of a plurality of modular multimedia tasks. As is shown in FIG. 32, N digital signal processors may be in communication with a single DSP manager. As is shown, digital signal processor 611, digital signal processor 613, digital signal processor 615, and digital signal processor 617 may operate in parallel to execute a plurality of modular multimedia software tasks.

when multiple digital signal processors are employed with a single DSP manager, such as DSP manager 71, the DSP manager will attempt to load tasks to a particular one of the digital signal processors. If a digital signal processor is not available for loading of the particular module or task, the DSP manager 71 will attempt to load to the next digital signal processor. If this digital signal processor does not have sufficient resources, the digital signal processor will attempt to load to still another digital signal processor. This process repeats until an available digital signal processor is located which has sufficient resources to accept the task or module which is required for loading by the DSP manager 71. This also provides a modularity in design which allows for numerous digital signal processors to be added to an existing system to increase its capacity for handling multimedia applications.

Figure 33:
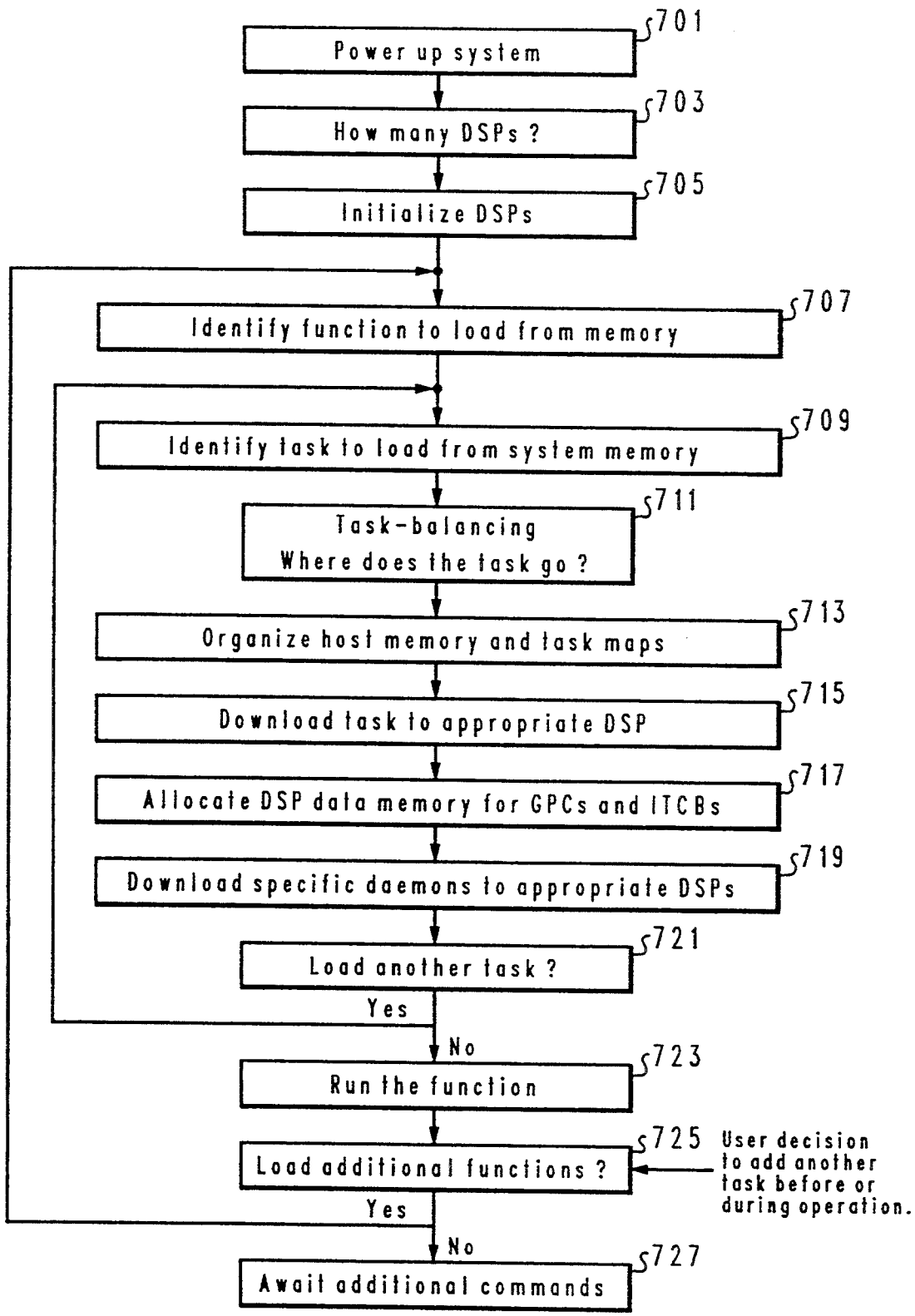
FIG. 33 is a flowchart representation of a process for initializing and adding tasks to a data processing system including multiple DSPs.

Referring now to FIG. 33 a process for loading tasks is presented, the system is powered up in block 701. Thereafter, in block 703 the number of DSPs are determined. The process first determines how many DSPs are available in the system so it can plot out what resources it has to work with. Since each DSP has its own I/O address range on the bus, it is easy to query each address to see if the DSP is present. In block 705, the DSPs are initialized. This process is well known and merely involves resetting all register values and clearing all memory as a prelude to loading commands and tasks. Next, functions to load from memory are identified in block 707. The application program, through its API (application program interface), will tell the DSP manager to load a function on the DSPs. "Functions" are made up of several "tasks". Then, in block 709, the task to load from system memory is identified. Since functions are made up of several tasks, the application identifies the first task of a given function that needs to be loaded into the DSPs. In block 711, task balancing is performed to determine where the task is to go. The linkage requirements between tasks (number and size of data communication module (DCM)) and whether tasks can be distributed (based upon their timing requirements), the availability and attachment location of various I/O interfaces, amount of DSP instruction and data memory remaining, amount of MIPS (millions of instructions per second) still available on each DSP, the communication method, and what resources are available on the system may be taken into account in accordance with a preferred embodiment of the present invention. "MIPS" is a measure of processing power.

Inter-DSP communication can be accomplished by several methods depending on the multi-DSP architecture chosen. Different resource values are found based on whether serial ports, a localized interconnect bus, or shared memories are used as the method for the DSPs to talk with each other. Each of these different methods has its own transmission characteristics and operating schemes, so the overall algorithm can vary based upon which system is employed. A unique aspect of this invention is that as system or subsystem characteristics change with various loads, the distribution of tasks may change, always providing an optimal locating of tasks. Task balancing is described in more detail in the flowchart illustrated in FIG. 34 below.

Next, in block 713, the host memory and task maps are organized. In this block, the memory maps are constructed by the DSP manager indicating where each task will store and use information. Each task has been predefined by the application writer with known values for MIPS, memory requirements, interrupts to be used, and channels in accordance with a preferred embodiment of the present invention. In block 715, the task is downloaded to the appropriate DSP. Based upon where the task balancing process in FIG. 34 below says to put this task, it is downloaded into the instruction and data memories of the DSP that will perform the work. Then, DSP data memory for DCMs and ITCBs are allocated in block 717. Next, in block 719, specific daemons are downloaded to appropriate DSPs. Daemons are employed to provide communication between DSPs across the communication's channel. The daemons also update pointers for the DCMs, which are described above. In this block, memory space for DCMs so that other data will not be written over it. By this point, the instruction program has been loaded, intercommunication daemons have been characterized and loaded with locations, and the memory has been allocated in maps. The system is now ready to operate. Thereafter, in block 721 a determination of whether to load another task is made. The process continues to loop back to block 709 until all tasks are loaded. After all tasks have been loaded, the function is run in block 723. Since functions are made up of multiple tasks, it is appropriate to see if any other tasks need to be loaded before running the function. In block 725, a determination of whether additional functions are to be loaded is made. The process returns to block 707 until no additional functions are to be loaded: User input is checked, in block 725, to determine whether the user has decided to add another function before or during operation. When no additional functions are to be loaded, the process awaits additional commands in block 727.

Figure 34:
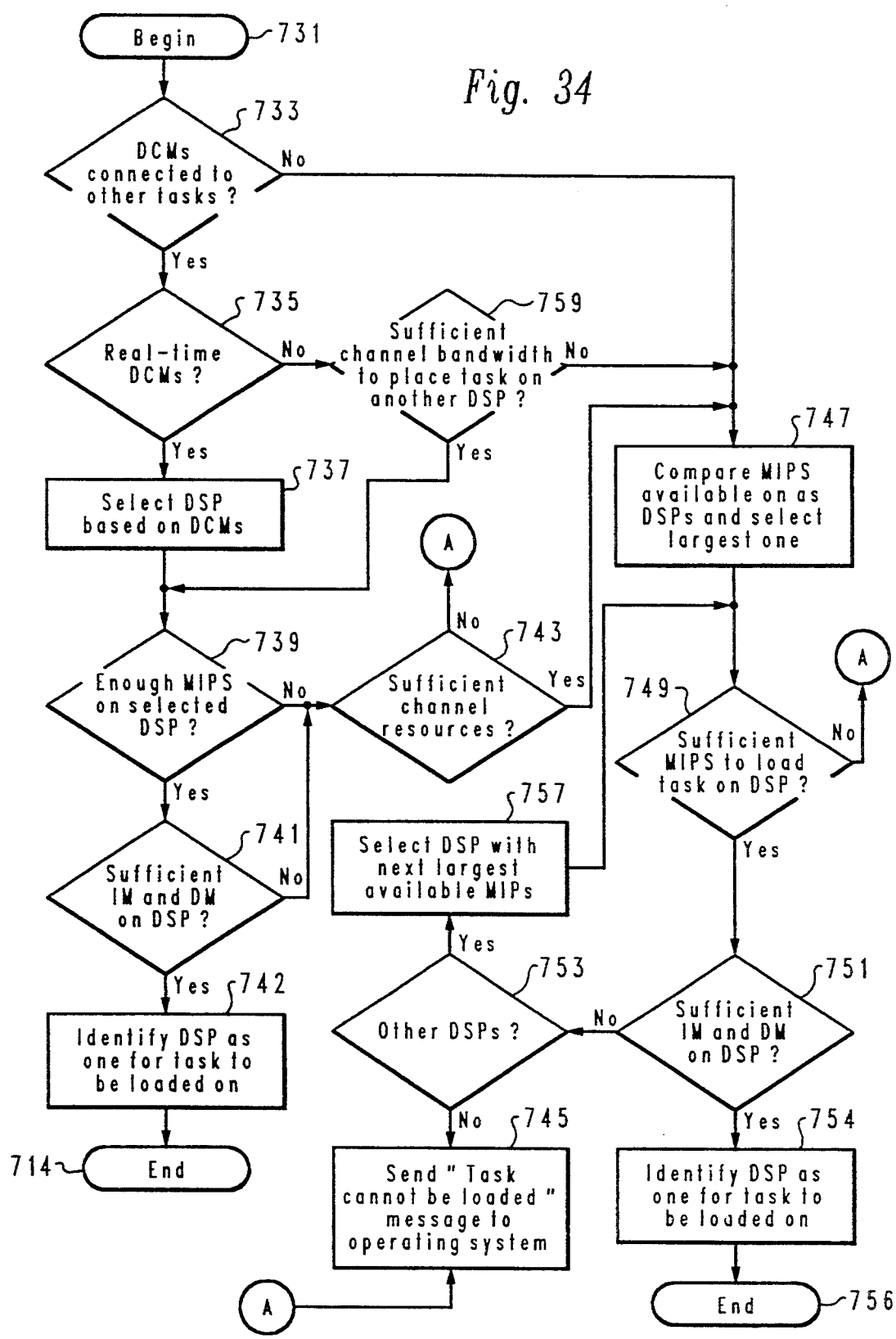
FIG. 34 is a flowchart representation of a process for task balancing.

Referring now to FIG. 34, a flowchart of a process for task balancing DSPs connected to each other by a "local bus," also called a "localized interconnect bus" is shown. In block 731, the process of task balancing begins. The DSP manager will have identified functions and their constituent tasks called for by the application program. At this point, characteristics of the tasks such as MIPS, instruction and data memory requirements and types and sizes of DCMs will be considered. In block 733, a determination of whether DCMs are connected to other tasks is made. Before tasks can be assigned to other DSPs, it is important to determine if the DSPs have DCMs connected to tasks that make up the same function as the task to be loaded that are already located on a given DSP. If they do not have data that must be shared with other tasks, then the task may be assigned to any DSP. If there are DCMs connected to other tasks, more information must be determined before placing the task on a specific DSP.

If DCMs are connected to other tasks, a determination of whether these DCMs are real-time DCMs is made in block 735. Real-time connections imply that tasks must communicate quickly and efficiently with each other and have only minor communications delays. If the DCMs that are being established are not real-time, then a check is made as to whether the communications channel (i.e., a local bus interconnecting DSPs) can handle this additional communication successfully without interrupting other activity on the channel. This determination is made in a small subroutine running in the DSP manager that knows what tasks are already loaded on what DSPs, how much communication traffic must occur on the local bus, and the native capability of the channel itself. If the DCMs are real-time DCMs, a DSP is selected in block 737, based on the DCMs located in the DSPs. The process selects a DSP containing a DCM connected to a task that is a part of the same function as the task to be loaded.

Next, a determination of whether enough MIPS are on the DSP having this DCM connection in block 739. The processor power measured in MIPS, may be determined in a number of different ways. Mwave DSP's are available from International Business Machines Corporation and from Texas Instruments, Inc. and contain a register from which data on available MIPS may be obtained. Alternatively, a daemon may be run on each DSP as the lowest priority program or task. The amount of time that this daemon runs may be employed to indicate the MIPS or processing power available. Data from these daemons may be requested by the DSP manager sending a request, resulting in the data request being scheduled for processing by the DSP. Because a very large task or a collection of tasks already may have been located on one DSP, insufficient processing power and there insufficient processing cycles may be available to load another task, even if this might be done from a communications standpoint. This step is therefore necessary to check for that possibility. If enough MIPS are available on the DSP having this particular DCM connection, a determination of whether sufficient instruction and data memory is present on the DSP is made in block 741. If enough instruction and data memory are present on the DSP, the process identifies this DSP as the one for the task in block 712. The process then terminates in block 714.

Referring back to block 739 and 741, if sufficient MIPS or sufficient instruction and data memory are not present, a determination of whether sufficient channel resources are available to handle additional data flow is made in block 743. At this point, since the task cannot be loaded on the DSP originally selected, a check is made to see if the inter-DSP channel can support the communications requirements of a new DCM. If insufficient channel resources are available, a message stating that the task cannot be loaded is sent to the operating system in block 745. Referring back to block 743, if sufficient channel resources are available, the process compares the MIPS on all DSPs and picks the DSP with the largest amount MIPS available in block 747. This block is executed because no DCMs requiring connection exist or because sufficient channel resources exist to handle any inter-DSP communications. At this point, we compare all the ISPs to see which has the most available MIPS left, selecting the one with the largest remaining available MIPS. In block 749, a determination of whether enough MIPS are available to load the task on this DSP is made. If enough MIPS are present, a determination of whether sufficient instruction and data memory is present on this DSP in block 751. If the instruction and data memory is sufficient, the process identifies this DSP as the one for the task in block 754 and terminates in block 756. Referring again to block 751, if an insufficient amount of MIPS are available or an insufficient amount of instruction and data memory is present on the DSP, the process determines whether other DSPs are present in block 753. Referring back to block 749, if an insufficient amount of MIPS is available, the process proceeds to block 745 and sends a message stating that the task cannot be loaded.

If other DSPs are not present, a message is sent stating that the task cannot be loaded to the operating system in block 745. The presence of other DSPs results in selecting the DSP with the next largest available MIPS in block 757. Thereafter, the process returns to block 749. Referring again to block 735, if no real-time DCMs exist, the process then determines whether sufficient channel bandwidth exists if the task is placed on another DSP in block 759. If the DCMs being connected are not real-time and there is sufficient channel bandwidth to handle the communications between the DSPs and all other traffic, then we enter a section of the code hat determines which ISP is best for running the task. If there is not sufficient channel bandwidth, a check is made to see if the task can be loaded on the DSP that already has the task to which this DCM connects. If sufficient channel bandwidth does not exist, the process proceeds to block 739 as described above. The presence of sufficient channel bandwidth results in the process preceding to block 747 as described previously. Referring again to block 733, if DCMs are not connected to other tasks the process proceeds to block 747 as described above.

Figure 35:
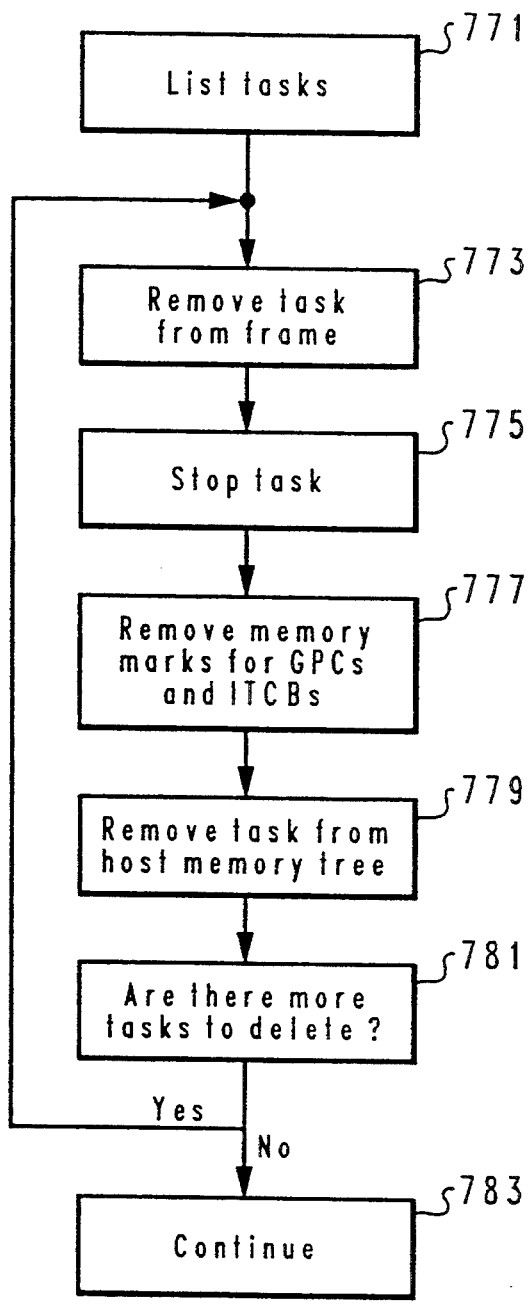
FIG. 35 is a flowchart representation of a process for removing tasks constituting functions previously loaded and running.

With reference now to FIG. 35, a flowchart of a process for removing functions previously loaded and running is illustrated. In block 771, tasks are listed. To remove a task, which tasks are operating, what memory is allocated to them, what DCMs exist, and which DSPs they are located on must be listed. In other words, the specifics of the task about to be removed must be known. A task from the list is removed from the frame in block 773 within DSP Operating System, the task must be removed from the frame by instructing the frame manager (a subsection of the original DSP Manager) to ignore it. The task will now no longer get processed when this frame's activities are run. This action would be the same for a single or multiple DSP environment. Thereafter in block 775 the task is stopped and then in block 777, memory marks for the DCMs and ITCBs are removed. The starting and ending points and intermediate locations in memory associated with the affected DCMs must be removed from the data memory, thereby freeing up these locations for other activities. Next, in block 779 the task is removed from the host memory tree. Once the data memory spaces have been freed up, the instruction spaces associated with the task are also deallocated. This feature allows DSP manager to monitor and dynamically maintain the workload of each of the DSPs. In block 781 a determination of whether more tasks are present on the list is made. Since several tasks per function usually exist, there will be several tasks to remove at a time. Other functions continue even while tasks are being eliminated. The process continues to return to block 773 until all of the tasks have been deleted. The process then stops in block 783. When tasks are loaded, the process depicted in blocks 707–727 in FIG. 33 are followed.

The process depicted in FIGS. 33–34 are incorporated in DSP manager 71 in accordance with a preferred embodiment of the present invention. The present invention may be implemented using any suitable host processor such as an IBM PS/2 computer or an IBM RISC SYSTEM/6000 computer, both products of International Business Machines Corporation, located in Armonk, N.Y. "RISC SYSTEM/6000" and "PS/2" are registered trademarks of International Business Machines Corporation. Digital signal processors such as the digital signal processor found in Mwave may be employed. Mwave is a family of boards for processing multi-media data streams using a single digital signal processor. Mwave is a trademark of International Business Machines Corporation and is distributed by International Business Machines Corporation and Texas Instruments, Inc. The DSP manager currently available for Mwave may be modified to manage multiple DSPs using the Mwave Development Tool kit and the User's Guide available from Intermetrics' Inc., located in Cambridge Mass.

While the invention has been particularly shown and described with reference to a preferred embodiment, it will be understood by those skilled in the art that various changes in form and detail may be made therein without departing from the spirit and scope of the invention.

What is claimed is:

1. A data processing system for managing execution of functions by a plurality of digital signal processors within the data processing system, wherein each function is comprised of at least one task, the data processing system comprising:
   a central processing unit for data processing operations;
   the plurality of digital signal processors connected to said central processing unit, wherein the digital signal processors are connected to each other by a communications channel;
   a digital signal processor manager including:
      first identification means for identifying processor resources present for the digital signal processors;
      second identification means for identifying a task to be loaded on the digital signal processors in response to an indication that a function is to be loaded on the digital signal processors, wherein the identified task constitutes part of such function;
      third identification means for identifying the task to be removed from the digital signal processors, in response to an indication that the function is to be removed, wherein the identified task constitutes part of such function;
      selection means, responsive the first identification means and to the second identification means for selecting a digital signal processors having sufficient resources to support execution of the identified task;
      loading means, responsive to selection of the digital signal processor by the selection means, for loading the task to be loaded on the selected digital signal processor without interrupting execution of any tasks constituting another function executing on the digital signal processors; and
      removal means, responsive to the third identification means identifying the task to be removed, for removing the identified task from the digital signal processor without interrupting execution of any tasks constituting another function executing on the digital signal processors.

2. The data processing system of claim 1, wherein said removal means comprises:
   means for removing the identified task to be removed from a frame;
   means for halting execution of the identified task to be removed;
   means for removing memory marks for each data communication module associated with the identified task to be removed; and
   means for removing the identified task to be removed from a memory tree.

3. A data processing system for managing execution of tasks by digital signal processors within said data processing system comprising:

a central processing unit for data processing operations;

the plurality of digital signal processors connected to said central processing unit, wherein the digital signal processors are connected to each other by a communications channel;

a digital signal processor manager including:

first identification means, responsive to an identification of a function to be executed by the digital signal processors, for identifying a task for loading, wherein the task constitutes part of the function;

means for loading the task identified by the first identification means;

second identification means for identifying whether a data communication module connected to the loaded task constituting part of the function is present;

first determination means, responsive to identifying the presence of the connected data communication module is a real-time data communication module;

second determination means, responsive to the presence of the real-time data communication module, for determining whether sufficient processor resources are present for the digital signal processor containing the real-time data communication module to support the identified task;

addition means, responsive to the presence of sufficient processors resources for said digital signal processor containing the real-time data communication module, for adding the identified task to the digital signal processor;

third determination means, responsive to either an absence of sufficient processors resources for said digital signal processor containing the real-time data communications module or an absence of the real-time data communication module, for determining whether the communications channel has sufficient communications resources to support an additional data communication module;

selection means, responsive to either the presence of sufficient communications resources to support the additional data communication module or the absence of any data communication modules, for selecting the digital signal processor having the greatest amount of processor resources capable of supporting the identified task; and means, responsive to the selection means, for loading the identified task on the selected digital signal processor, wherein tasks constituting the function may be loaded on digital signal processors without interrupting execution of tasks comprising another function executing on the digital signal processors.

4. The data processing system of claim 3, further comprising:

fourth identification means for identifying a task constituting a part of a function executing on a digital signal processor, for removal from the digital signal processor; and removal means for removing the identified task from the digital signal processor without interrupting execution of tasks constituting another function.

5. The data processing system of claim 4, wherein the data processing system includes a host memory tree and wherein said removal means comprises:

means for removing the identified task from a frame including the identified task;

termination means for terminating execution of the identified task;

means for removing memory marks to data communication modules; and means for removing the identified task from the host memory tree.

6. A method in a data processing system for managing execution of functions by a plurality of digital signal processors within the data processing system, wherein each function is comprised of at least one task, the data processing system including a central processing unit for data processing operations connected to the plurality of digital signal processors, wherein the digital signal processors are connected to each other by a communications channel, the method comprising the data processing system implemented steps of:

identifying processor resources present for the digital signal processors;

identifying a task to be loaded on the digital signal processors in response to an indication that a function is to be loaded on the digital signal processors, wherein the identified task constitutes part of the function to be loaded;

identifying the task to be removed from the digital signal processors, in response to an indication that the function is to be removed, wherein the identified task constitutes part of the function to be removed;

selecting a digital signal processor having sufficient resources to support execution of the identified task in response to identifying processor resources and the step of identifying the task to be added;

loading the task to be added to the selected digital signal processor without interrupting execution of any tasks comprising another function executing on the digital signal processors in response to selection of the digital signal processor by the selecting step; and removing the identified task from the digital signal processor without interrupting execution of any tasks comprising another function executing on the digital signal processor in response to identifying their task to be removed.

7. A data processing system for managing execution of functions by a plurality of digital signal processors within the data processing system, wherein each function includes at least one task, the data processing system comprising:

a central processing unit for data processing operations;

the plurality of digital signal processors connected to the central processing unit;

a plurality of data communications modules, wherein each data communication module is associated with at least one digital signal processor within the plurality of digital signal processors;

a digital signal processor manager including:

first identification means for identifying a task to be loaded on the digital signal processors, wherein the task is part of a function;

first identification means, responsive to the first identification means, for identifying a digital signal processor with sufficient processor resources to process the task, wherein the characteristics of the data communication modules associated with the digital signal processors are evaluated in identifying the digital signal processor, wherein the second identification means comprises:

first determination means for determining whether any of the data communication modules are connected to the other tasks;

second determination means, responsive to data communication modules being connected to other tasks executing on the digital signal processors, for determining whether the data communication modules connected to other tasks are real-time data communication modules;

connection means, responsive to the presence of the real-time data communications modules, for selecting the digital signal processor containing the data communication module that is connected to at least one task that is part of the same function as the task that is to be loaded, wherein the selected digital signal processor and the data communication module in the selected digital signal processor contain sufficient resources to support the tasks; and loading means to load the task on the identified digital signal processor.

8. The data processing system of claim 7, further comprising removal means for removing the task loaded on the digital signal processor without interrupting execution of another function executing on the digital signal processors.

* * * * *